(12) United States Patent
Watanabe et al.

(10) Patent No.: US 7,527,777 B2
(45) Date of Patent: May 5, 2009

(54) ZEOLITE, PROCESS FOR PRODUCING THE SAME, ADSORBENT COMPRISING THE ZEOLITE, HEAT UTILIZATION SYSTEM, ADSORPTION HEAT PUMP, COLD/HEAT STORAGE SYSTEM, AND AIR-CONDITIONING APPARATUS FOR HUMIDITY REGULATION

(75) Inventors: Hiromu Watanabe, Kanagawa (JP); Takahiko Takewaki, Kanagawa (JP); Masanori Yamazaki, Kanagawa (JP); Hiroyuki Kakiuchi, Mie (JP); Kouji Inagaki, Aichi (JP); Atsushi Kosaka, Aichi (JP); Norikazu Hosokawa, Aichi (JP)

(73) Assignee: Mitsubishi Chemical Corporation, Tokyo (JP)

( * ) Notice: Subject to any disclaimer, the term of this patent is extended or adjusted under 35 U.S.C. 154(b) by 504 days.

(21) Appl. No.: 11/311,562

(22) Filed: Dec. 20, 2005

(65) Prior Publication Data
US 2006/0245994 A1  Nov. 2, 2006

Related U.S. Application Data

(63) Continuation of application No. PCT/JP04/08930, filed on Jun. 18, 2004.

(30) Foreign Application Priority Data

Jun. 20, 2003 (JP) ............................ 2003-176318
Jun. 20, 2003 (JP) ............................ 2003-176319

(51) Int. Cl.
*C01B 37/04* (2006.01)
*C01B 37/06* (2006.01)
*C01B 37/08* (2006.01)
*F25B 15/00* (2006.01)
*F28D 20/00* (2006.01)
*F28F 23/00* (2006.01)
*F28F 21/00* (2006.01)

(52) U.S. Cl. ............... 423/305; 423/306; 423/DIG. 30; 502/414; 62/271; 62/324.5; 62/476; 165/10; 165/186

(58) Field of Classification Search ................. 423/305, 423/306, DIG. 30, 700, 701, 702, 703, 704, 423/705, 706, 708; 62/271, 324.5, 476; 165/10, 165/186; 502/414
See application file for complete search history.

(56) References Cited

U.S. PATENT DOCUMENTS

| 4,440,871 | A |   | 4/1984 | Lok et al. |
| 4,554,143 | A |   | 11/1985 | Messina et al. |
| 5,185,310 | A | * | 2/1993 | Degnan et al. ............... 502/214 |
| 6,395,674 | B1 |   | 5/2002 | Fung et al. |
| 6,503,863 | B2 |   | 1/2003 | Fung et al. |
| 6,508,860 | B1 | * | 1/2003 | Kulkarni et al. ................ 95/51 |
| 2004/0089001 | A1 |   | 5/2004 | Kakiuchi et al. |
| 2004/0093876 | A1 |   | 5/2004 | Inagaki et al. |
| 2006/0130652 | A1 |   | 6/2006 | Takewaki et al. |
| 2008/0170986 | A1 | * | 7/2008 | Kitamura et al. ............ 423/700 |

FOREIGN PATENT DOCUMENTS

| EP | 1 363 085 | 11/2003 |
| EP | 1 391 238 | 2/2004 |
| JP | 2003-501241 | 1/2003 |
| JP | 2003-114067 | 4/2003 |

OTHER PUBLICATIONS

U.S. Appl. No. 11/311,562, filed Dec. 20, 2005, Watanabe, et al.
Arturo J. Hernandez-Maldonado et al.; "Partially Calcined Gismondine Type Sillcoaluminophosphate SAPO-43: Isopropylamine Elmination and Separation of Carbon Dioxide, Hydrogen Sulfide, and Water"; Langmuir 2003, vol. 19, pp. 2193-2200.

* cited by examiner

*Primary Examiner*—David M Brunsman
(74) *Attorney, Agent, or Firm*—Oblon, Spivak, McClelland, Maier & Neustadt, P.C.

(57) ABSTRACT

Subjects for the invention are to provide a zeolite reduced in performance deterioration in repetitions of use or during long-term use and a process for producing the same and to provide an adsorbent comprising the zeolite and a heat utilization system or the like employing the adsorbent.

The invention relates to a zeolite which has a framework density of from 10 T/nm$^3$ to 16 T/nm$^3$ and a carbon content of from 1% by weight to 6% by weight and satisfies the following (1) or (2):
(1) the zeolite is an aluminophosphate which has a nitrogen content of from 0.5% by weight to 12% by weight and in which the aluminum may be partly replaced by Me;
(2) the zeolite is a silicoaluminophosphate in which the aluminum may be partly replaced by Me and which, when burned to a carbon content lower than 0.3% by weight, retains the framework structure possessed by the silicoaluminophosphate before the burning:
(provided that Me in (1) and (2) above is at least one element selected from the elements in Groups 2A, 7A, 8, 1B, and 2B of the periodic table).

30 Claims, 31 Drawing Sheets

ZEOLITE, PROCESS FOR PRODUCING THE SAME, ADSORBENT COMPRISING THE ZEOLITE, HEAT UTILIZATION SYSTEM, ADSORPTION HEAT PUMP, COLD/HEAT STORAGE SYSTEM, AND AIR-CONDITIONING APPARATUS FOR HUMIDITY REGULATION

This application is a continuation of PCT/JP04/08930, filed Jun. 18, 2004.

FIELD OF THE INVENTION

The present invention relates to a specific zeolite, a process for producing the same, an adsorbent comprising the zeolite, a heat utilization system, an adsorption heat pump, a cold/heat storage system, and an air-conditioning apparatus for humidity regulation.

BACKGROUND ART

Zeolites are extensively used as adsorbents, catalysts for acid reactions, oxidation reactions, etc., separation materials, optical materials such as quantum dots and quantum wires, fine semiconductor particles serving as a magnetic material, and host materials for a fluorescent substance, dye, etc. The zeolites include crystalline silicates, crystalline aluminophosphates, and the like according to International Zeolite Association (hereinafter referred to as IZA).

A zeolite is usually produced by using raw materials for the zeolite and a structure-directing agent (referred to also as organic template) to conduct hydrothermal synthesis and then removing the organic template by a technique such as burning or extraction. In general, zeolites from which the organic template has been removed as much as possible are put as industrially useful zeolites to use as catalysts, adsorbents, etc. The reason why the organic template is removed as much as possible is as follows. In the zeolite which has been obtained by, e.g., hydrothermal synthesis and from which the organic template has not been removed (hereinafter referred to as zeolite precursor), the spaces in the pores are occupied by the organic template to prevent a substrate for reaction or a substance to be adsorbed from coming into the pores. This zeolite cannot hence function as a catalyst or adsorbent. Consequently, the zeolites which are industrially useful are usually ones obtained by removing the organic template from zeolite precursors as much as possible.

A process for producing, in particular, a silicoaluminophosphate containing silicon as a heteroatom, among zeolites, is described in patent document 1 shown below. This process is a method in which when an organic template is removed from a zeolite precursor for a silicoaluminophosphate, the zeolite precursor is heated in a stream of air to decompose and remove the organic template (burning method). The document includes a statement to the effect that SAPO-5 (framework density (FD): 17.3 T/nm$^3$) having a carbon content of 6.9% by weight before burning was produced. However, the SAPO-5 obtained here has a relatively high framework density and our investigations revealed that it has an insufficient adsorption when used as an adsorbent.

Patent document 2 shown below teaches that in the case of a zeolite whose pore structure is partly occupied by either an organic template or a product of organic-template decomposition, the catalytic activity thereof does not decrease during storage or transportation because the adsorption of atmospheric moisture is prevented. Examples given therein include one in which carbon atoms remain in an amount of 8.20% by weight or larger. On the other hand, the document teaches that when the zeolite is to be used as a catalyst, it is subjected to a burning or combustion treatment in an oxygen-containing atmosphere as an activation treatment to completely remove the organic template or the like from the pore structure of the zeolite.

A process for producing, in particular, an iron aluminophosphate containing iron as a heteroatom, among zeolites, is described in patent document 3 shown below. This process is a method in which when an organic template is removed from a zeolite precursor for an iron aluminophosphate, the zeolite precursor is heated in a stream of air or stream of nitrogen to decompose and remove the organic template (burning method).

On the other hand, the present applicant previously proposed zeolites suitable for use in a heat utilization system which have a framework density (FD) of 10-18 T/nm$^3$ and give an adsorption isotherm showing specific adsorptive properties. More specifically, an iron aluminophosphate, a silicoaluminophosphate, and an iron silicoaluminophosphate each having those properties were proposed (patent document 4 shown below).

Furthermore, in non-patent document 1 shown below, there is a report that a silicoaluminophosphate (SAPO-43) having a GIS structure containing carbon atoms and nitrogen atoms remaining in amounts of from 3.99% by weight to 6.09% by weight and from 4.83% by weight to 6.09% by weight, respectively, shows the ability to selectively adsorb $CO_2$, $H_2O$, $H_2S$, etc. However, it is pointed out therein that this zeolite from which the organic template has been completely removed is intrinsically unstable and that destruction of the crystal structure proceeds with the removal of the organic template and the complete removal of the organic template almost completely deprives the zeolite of its adsorbing ability. When this zeolite was prepared so that the organic template remained to enable the zeolite to retain its structure, the adsorption capacity of the zeolite obtained was as low as 8% by weight in the case of water adsorption.

[Patent Document 1]
  U.S. Pat. No. 4,440,871

[Patent Document 2]
  U.S. Pat. No. 6,395,674

[Patent Document 3]
  U.S. Pat. No. 4,554,143

[Patent Document 4]
  EP 1391238

[Non-Patent Document 1]
  R. T. Yang et al., *Langmuir*, 2003, 19, 2193-2200

DISCLOSURE OF THE INVENTION

The zeolites according to related-art techniques described above are (1) zeolites in which the organic template or a substance derived therefrom remains in a relatively large amount or from which the template or substance has been removed as much as possible; or (2) zeolites which are unable to be stably present after the complete removal of the organic template and from which the organic template has been removed to such a degree that the crystal structure is not completely destroyed; or (3) zeolites which have a relatively high framework density, i.e., a relatively small pore volume. Consequently, the related-art zeolites, when used as adsorbents, have insufficient adsorption capacity or are ones which have a sufficient adsorption but have insufficient durability in repetitions of use as adsorbents.

The present inventors, under those circumstances, found that there are cases where even a zeolite which is stable after the complete removal of the organic template therefrom comes to suffer particle reduction to powder or crystal structure destruction with the progress of use and to undergo a resultant decrease in adsorbing ability when the organic template has been completely removed from the pores, although this zeolite has high initial adsorption capacity or high initial catalytic activity. They have further found that this problem is conspicuous in zeolites having a relatively low framework density (relatively large pore volume). On the other hand, it was found that the zeolites in which the organic template partly remains in the pores in an amount not less than a given content have a problem that these zeolites in such state are insufficient, from the beginning, in adsorption capacity, etc., although the presence of the organic template is effective in preventing catalytic activity from decreasing during storage due to atmospheric moisture, etc.

The invention has been achieved in order to overcome the problems described above. An object thereof is to provide a zeolite reduced in performance deterioration in repetitions of use or during long-term use and a process for producing the same. In particular, the object is to provide: a zeolite which, when used as an adsorbent, has sufficiently high adsorption capacity and which suffers neither zeolite particle reduction to powder nor crystal structure destruction with repetitions of use and, hence, does not undergo a resultant decrease in adsorption capacity; and a process for producing this zeolite. Another object is to provide an adsorbent comprising the zeolite and a heat utilization system, adsorption heat pump, and cold/heat storage system each employing the adsorbent.

As a result of intensive investigations made by the inventors on the problems described above, it has been found that the problems are eliminated by a zeolite which has a framework density and carbon content in respective specific ranges and has specific elements in the framework structure and which is either an aluminophosphate having a nitrogen content in a specific range or a silicoaluminophosphate retaining its structure through burning.

More particularly, the problems described above were found to be eliminated by (1) a zeolite which is an aluminophosphate which has a framework density of from 10 T/nm$^3$ to 16 T/nm$^3$ and may contain Me (provided that Me is at least one element selected from the elements in Groups 2A, 7A, 8, 1B, and 2B of the periodic table) and in which the amount of the residual organic template or a residual substance derived therefrom has been controlled and the nitrogen content and carbon content in the zeolite have been thus controlled so as to be specific amounts or (2) a zeolite which is a silicoaluminophosphate which has a framework density of from 10 T/nm$^3$ to 16 T/nm$^3$ and may contain Me (provided that Me is at least one element selected from the elements in Groups 2A, 7A, 8, 1B, and 2B of the periodic table) and in which the amount of the residual organic template or a residual substance derived therefrom has been controlled and the carbon content in the silicoaluminophosphate has been thus controlled so as to be a specific amount.

The inventors have further found that an adsorbent comprising the zeolite has excellent durability. Furthermore, the inventors have found that this adsorbent is effective when used in a heat utilization system or a cold/heat storage system. Specifically, the adsorbent was found to be effectively usable as an adsorbent for a cold/heat storage system, adsorption heat pump, an air-conditioning apparatus for dehumidification or humidification, etc.

The zeolite of the invention, which eliminates the problems described above, is characterized by being a zeolite which has a framework density of from 10 T/nm$^3$ to 16 T/nm$^3$ and a carbon content of from 1% by weight to 6% by weight and satisfies the following (1) or (2):

(1) the zeolite is an aluminophosphate which has a nitrogen content of from 0.5% by weight to 12% by weight and in which the aluminum may be partly replaced by Me;

(2) the zeolite is a silicoaluminophosphate in which the aluminum may be partly replaced by Me and which, when burned to a carbon content lower than 0.3% by weight, retains the framework structure possessed by the silicoaluminophosphate before the burning:

(provided that Me in (1) and (2) above is at least one element selected from the elements in Groups 2A, 7A, 8, 1B, and 2B of the periodic table).

The zeolite of the invention has an excellent effect that the zeolite, when used as, e.g., an adsorbent, has high adsorption capacity and suffers neither the crystal structure destruction caused by repetitions of use nor a resultant decrease in adsorption capacity.

The process for zeolite production, which eliminates the problems described above, is a process for producing the zeolite described above and is characterized in that at least compounds of the metallic elements serving as components of the zeolite are subjected to hydrothermal synthesis in the presence of at least one structure-directing agent and the zeolite precursor obtained is burned in an atmosphere having an oxygen concentration of 20 vol % or lower.

According to this production process, the zeolite of the invention, which brings about the effect described above, can be stably produced.

The adsorbent of the invention, which eliminates the problems described above, is characterized by comprising the zeolite of the invention described above.

According to this invention of adsorbent, the adsorbent itself also has excellent durability because the zeolite constituting this adsorbent has such preferred properties that it suffers neither the crystal structure destruction caused by repetitions of use nor a resultant decrease in adsorption capacity. Consequently, this adsorbent can be advantageously used in a heat utilization system, adsorption heat pump, cold/heat storage system, or air-conditioning apparatus for humidity regulation.

The invention, which eliminates the problems described above, provides: a heat utilization system which employs the adsorbent described above and in which the heat of adsorption generated by the adsorption of an adsorbable substance onto the adsorbent and/or the latent heat of vaporization of the adsorbate is utilized; and an adsorption heat pump, cold/heat storage system, and air-conditioning apparatus for humidity regulation each employing the adsorbent described above.

According to this invention, these systems have excellent durability because they employ the highly durable adsorbent comprising the zeolite of the invention described above.

Figure 1:
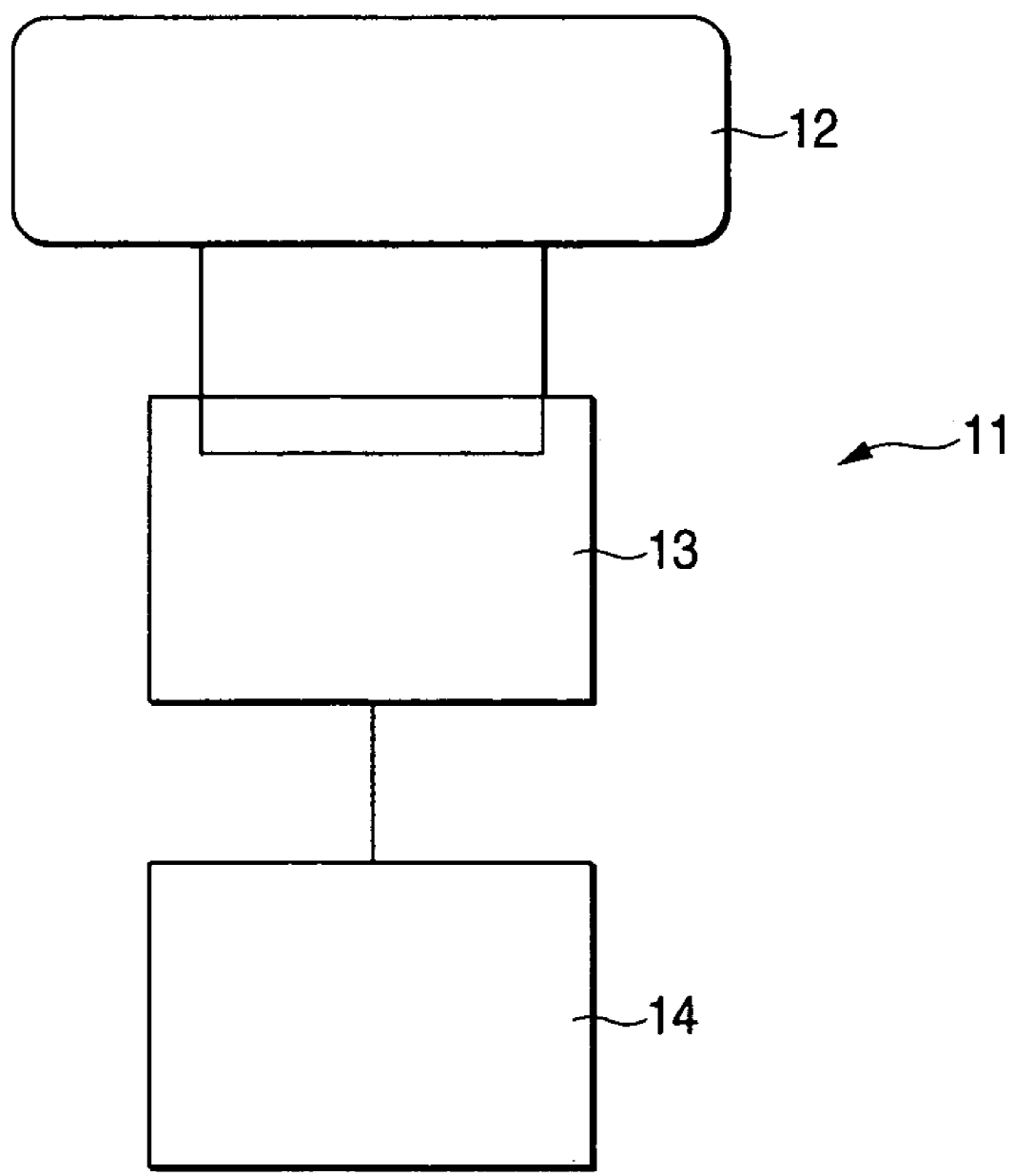
FIG. 1 is a diagrammatic view illustrating one embodiment of the cold/heat storage system of the invention.

The reference numerals in the drawings have the following meanings: 11 denotes a cold/heat storage system, 12, 26, and 27 a circulating-water feeder, 13, 22, and 23 an adsorption/desorption device, 14 an evaporator/condenser, 21 an adsorption heat pump, 24 an evaporator, 25 a condenser, 28, 29, 30, and 31 a valve, 61 an air-conditioning apparatus for dehumidification, 62 air, 63 an adsorbent regeneration device, 70 a desiccant air-conditioner, 71 a raw-air passage, 72 a regeneration air passage, 73 a desiccant rotor, 74 and 75 a sensible-heat exchanger, 76 a heat supply device, 77 a humidifier, 78 a space to be air-conditioned, and 79 the outside.

BEST MODE FOR CARRYING OUT THE INVENTION

The zeolite of the invention, process for producing the same, adsorbent comprising the zeolite, heat utilization system, adsorption heat pump, and cold/heat storage system will be explained below in order.

The zeolite according to the invention is an aluminophosphate type zeolite which is an aluminophosphate or silicoaluminophosphate in which the aluminum may be partly replaced by Me (provided that Me is at least one element selected from the elements in Groups 2A, 7A, 8, 1B, and 2B of the periodic table; this at least one element is hereinafter referred to as Me). The aluminophosphate or silicoaluminophosphate in which aluminum may be replaced by Me tends to attain a large adsorption difference when the relative vapor pressure changes only slightly in a range of relatively low relative vapor pressures. In this point, the aluminophosphate or silicoaluminophosphate is especially suitable for use as an adsorbent. Details of this aluminophosphate or silicoaluminophosphate will be given later.

The zeolite according to the invention has a framework density of from 10 T/nm$^3$ to 16 T/nm$^3$. Too low framework densities result in an unstable zeolite structure, while too high framework densities result in a reduced adsorption. The framework density thereof is more preferably 12 T/nm$^3$ or higher, even more preferably 13 T/nm$^3$ or higher. On the other hand, the framework density thereof is more preferably 15 T/nm$^3$ or lower. Symbol T herein indicates the atoms which constitute the zeolite framework and are not oxygen atoms, and T/nm$^3$ is a unit indicating the number of T atoms present per nm$^3$ (framework density). When the framework density of the zeolite is within that range, the effect of improving the unsusceptibility of the zeolite to performance deterioration in repetitions of use is remarkably produced especially by controlling the content of carbon atoms or the contents of carbon atoms and nitrogen atoms as will be described later.

The zeolite of the invention has a structure belonging to crystalline silicates, crystalline aluminophosphate, or the like according to the classification as prescribed by International Zeolite Association (IZA). However, especially from the standpoints of the durability and adsorptive properties required of adsorbents as will be described later, the framework structure of the zeolite usually is a structure selected from AEI, AFR, AFS, AFT, AFX, ATS, CHA, ERI, LEV, LTA, and VFI which are code designations defined by IZA. Preferred of these from the standpoints of adsorptive properties and structure stability is a structure selected from AEI, CHA, and LEV. Especially preferred is CHA.

Furthermore, from the standpoints of the durability and adsorptive properties required of adsorbents, the zeolite of the invention is (A) the aluminophosphate described below which may be substituted by specific heteroatoms or (B) the silicoaluminophosphate described below which may be substituted by specific heteroatoms.

(A) Aluminophosphate which may be Substituted by Specific Heteroatoms:

This aluminophosphate is an aluminophosphate in which the aluminum may be partly replaced by one or more heteroatoms (which are represented herein by Me), i.e., an (Me-)aluminophosphate. Hereinafter, an aluminophosphate which may contain Me is often referred to as "(Me-)aluminophosphate".

In the (Me-)aluminophosphate, it is preferred that the molar ratios of the Me, Al, and P which are components of the framework structure of the aluminophosphate should satisfy the following expressions 1-1 to 1-3. It is more preferred in this case that the molar ratio of Me should satisfy the following expression 1-1'.

$$0 \leq x \leq 0.3 \qquad \text{1-1}$$

(x represents the molar ratio of Me to the sum of Me, Al, and P)

$$0.2 \leq y \leq 0.6 \qquad \text{1-2}$$

(y represents the molar ratio of Al to the sum of Me, Al, and P)

$$0.3 \leq z \leq 0.6 \qquad \text{1-3}$$

(z represents the molar ratio of P to the sum of Me, Al, and P)

$$0.001 \leq x \leq 0.3 \qquad \text{1-1'}$$

(x represents the molar ratio of Me to the sum of Me, Al, and P)

Too large values of x, which indicates the molar ratio of Me, tend to result in impurity inclusion. On the other hand, even when x is 0, the effects of the invention are produced. However, in case where the lower limit thereof is close to 0, this aluminophosphate tend to have a reduced adsorption in a low-adsorbate-pressure region when used as an adsorbent or to be difficult to synthesize. Consequently, the lower limit of x is preferably 0.001 as shown in expression 1-1'. On the other hand, in case where y, which indicates the molar ratio of Al, and z, which indicates the molar ratio of P, are outside the ranges shown above, this aluminophosphate is difficult to synthesize.

The molar ratios of Me, Al, and P more preferably satisfy the following expressions 1-4 to 1-6. This constitution facilitates the synthesis of the (Me-)aluminophosphate and inhibits impurity inclusion to enable desired adsorptive properties to be more easily obtained.

$$0.01 \leq x \leq 0.3 \qquad \text{1-4}$$

(x represents the molar ratio of Me to the sum of Me, Al, and P)

$$0.3 \leq y \leq 0.5 \qquad \text{1-5}$$

(y represents the molar ratio of Al to the sum of Me, Al, and P)

$$0.4 \leq z \leq 0.5 \qquad \text{1-6}$$

(z represents the molar ratio of P to the sum of Me, Al, and P)

Me is not particularly limited as long as it is at least one element selected from the elements in Groups 2A, 7A, 8, 1B, and 2B of the periodic table, and may comprise two or more of these elements. Preferred examples of Me are Mg, which is an element belonging to the third period in the periodic table, and Ca, Mn, Fe, Co, Ni, Cu, and Zn, which are elements belonging to the fourth period. Preferred of these are Mn, Fe, Co, Ni, Cu, Zn, and Mg, which each in the divalent state have an ionic radius of from 0.3 Å to 0.8 Å. More preferred are Fe, Co, Cu, Zn, and Mg, which each in a divalent and tetra-coordinated state have an ionic radius of from 0.4 Å to 0.7 Å.

From the standpoints of the ease of synthesis and adsorptive properties, Me preferably is one or two elements selected from Fe, Co, Mg, and Zn among those elements. Especially preferably, Me is Fe. Incidentally, 1 nm is a unit which can be converted to 10 Å.

(B) Silicoaluminophosphate which may be Substituted by Specific Heteroatoms:

This silicoaluminophosphate is a silicoaluminophosphate in which the aluminum may be partly replaced by one or more heteroatoms (Me), i.e., an (Me-)silicoaluminophosphate. Hereinafter, a silicoaluminophosphate which may contain Me is often referred to as "(Me-)silicoaluminophosphate".

It is preferred that the molar ratios of the Me, Al, P, and Si which are components of the framework structure of the (Me-)silicoaluminophosphate should satisfy the following expressions 2-1 to 2-4:

$$0 \leq x \leq 0.3 \qquad \text{2-1}$$

(x represents the molar ratio of Me to the sum of Me, Al, P, and Si)

$$0.2 \leq y \leq 0.6 \qquad \text{2-2}$$

(y represents the molar ratio of Al to the sum of Me, Al, P, and Si)

$$0.3 \leq z \leq 0.6 \qquad \text{2-3}$$

(z represents the molar ratio of P to the sum of Me, Al, P, and Si)

$$0.001 \leq w \leq 0.3 \qquad \text{2-4}$$

(w represents the molar ratio of Si to the sum of Me, Al, P, and Si)

With respect to the molar ratios of the elements, too large values of x, which indicates the molar ratio of Me, tend to result in difficulties in synthesizing the carbon-containing silicoaluminophosphate. The value of x may be 0; in this case, the silicoaluminophosphate does not contain Me.

However, the presence of Me contained facilitates the control of adsorptive properties (relationship between relative humidity and adsorption) in the case of using the zeolite of the invention as an adsorbent. It is therefore preferred that x should satisfy the following expression.

$$0.01 \leq x \leq 0.3 \qquad \text{2'-1}$$

(x represents the molar ratio of Me to the sum of Me, Al, P, and Si)

In case where y, which indicates the molar ratio of Al, is smaller than that range, the synthesis of this silicoaluminophosphate tends to be difficult as in the case shown above. On the other hand, values thereof larger than that range tend to result in impurity inclusion. In case where z, which indicates the molar ratio of P, is smaller than that range, the synthesis of this silicoaluminophosphate tends to be difficult as in the case shown above. On the other hand, values thereof larger than that range tend to result in impurity inclusion. Furthermore, in case where w, which indicates the molar ratio of Si, is smaller than that range, the synthesis of this silicoaluminophosphate tends to be difficult as in the case shown above. On the other hand, values thereof larger than that range tend to result in difficulties in obtaining desired adsorptive properties.

The molar ratios of Me, Al, P, and Si more preferably satisfy the following expressions 2-5 to 2-8. This constitution facilities the synthesis of the carbon-containing silicoaluminophosphate of the invention and inhibits impurity inclusion to enable desired adsorptive properties to be more easily obtained.

$$0 \leq x \leq 0.3 \qquad 2\text{-}5$$

(x represents the molar ratio of Me to the sum of Me, Al, P, and Si)

$$0.3 \leq y \leq 0.5 \qquad 2\text{-}6$$

(y represents the molar ratio of Al to the sum of Me, Al, P, and Si)

$$0.4 \leq z \leq 0.5 \qquad 2\text{-}7$$

(z represents the molar ratio of P to the sum of Me, Al, P, and Si)

$$0.01 \leq w \leq 0.25 \qquad 2\text{-}8$$

(w represents the molar ratio of Si to the sum of Me, Al, P, and Si)

Incidentally, examples of Me and preferred examples of Me are the same as those shown above.

The (Me-)aluminophosphate and (Me-)silicoaluminophosphate described above may contain, besides the ingredients constituting the framework structure, one having a cation species capable of undergoing ion-exchange with another cation. Examples of such cation species include a proton, alkali elements such as Li, Na, and K, alkaline earth elements such as Mg and Ca, rare earth elements such as La and Ce, and transition metal elements such as Fe, Co, and Ni. Preferred of these are a proton, alkali elements, and alkaline earth elements.

Although the zeolite of the invention is either the (Me-)aluminophosphate or (Me-)silicoaluminophosphate described above, these aluminophosphates have a carbon atom content of from 1% by weight to 6% by weight.

In case where this requirement is not satisfied, use of the zeolite as, e.g., an adsorbent leads to crystal structure destruction in repetitions of use and a resultant decrease in adsorption capacity.

The (Me-)aluminophosphate and the (Me-)silicoaluminophosphate will be separately explained below.

In the case where the zeolite of the invention is the (Me-)aluminophosphate, it contains nitrogen in an amount of from 0.5% by weight to 12% by weight and further contains carbon in an amount of from 1% by weight to 6% by weight, as stated above. The (Me-)aluminophosphate containing nitrogen and carbon in amounts within those ranges has an excellent effect that this aluminophosphate, when used as, e.g., an adsorbent, suffers neither crystal structure destruction in repetitions of use nor a resultant decrease in adsorption capacity. In particular, this zeolite has an effect that it is less apt to suffer crystal structure destruction and has improved durability and, hence, it can be advantageously used in various practical applications. Examples of the practical applications include the heat utilization system, adsorption heat pump, and cold/heat storage system which will be described later.

In case where the nitrogen content and carbon content thereof are too high, this zeolite, when used especially as an adsorbent, has a reduced adsorption and insufficient adsorbent performances. On the other hand, in case where the nitrogen content and carbon content thereof are too low, this zeolite, when used especially as an adsorbent, may have a problem concerning durability in repetitions of use.

The nitrogen content thereof is preferably 0.5% by weight or higher, especially preferably 0.8% by weight or higher, most preferably 1.0% by weight or higher. The nitrogen content is more preferably 5% by weight or lower, especially preferably 3% by weight or lower. On the other hand, the carbon content thereof is more preferably 1.5% by weight or higher, especially preferably 2% by weight or higher. The carbon content is more preferably 6% by weight or lower, especially preferably 5% by weight or lower.

The reasons why the zeolite containing nitrogen and carbon in amounts within those ranges has improved durability have not been fully elucidated. However, it is thought that this zeolite changes little in crystal structure and lattice constant and in the state of bonds upon adsorption/desorption and this is attributable to the durability improvement.

In the (Me-)aluminophosphate of the invention, the weight ratio of carbon to nitrogen (C/N weight ratio) is preferably from 0.8 to 6.5, and is more preferably from 1.0 to 4, especially to 3.5. When the C/N weight ratio is within that range, this zeolite tends to have high durability and high adsorption capacity. On the other hand, C/N weight ratios lower than 0.8 tend to result in reduced durability.

In the case where the (Me-)aluminophosphate contains Me, the molar ratio of nitrogen to Me (N/Me ratio) is preferably from 0.1 to 10. The N/Me ratio is more preferably 0.2 or higher, especially preferably 0.5 or higher. On the other hand, the N/Me ratio is preferably 5 or lower, especially preferably 2 or lower. In case where the N/Me ratio exceeds the upper limit of that range, this zeolite tends to have a reduced adsorption. N/Me ratios lower than the lower limit of that range tend to result in reduced durability.

On the other hand, in the case where the zeolite of the invention is the (Me-)silicoaluminophosphate, it contains carbon in an amount of from 0.8% by weight to 6% by weight as stated above. The (Me-)silicoaluminophosphate containing carbon in an amount within that range has an excellent effect that this silicoaluminophosphate, when used as, e.g., an adsorbent, has high adsorption capacity and excellent hydrothermal stability and suffers neither crystal structure destruction in repetitions of use nor a resultant decrease in adsorption capacity. In particular, this zeolite has an effect that it is less apt to suffer crystal structure destruction and has improved durability and, hence, it can be advantageously used in various practical applications. Examples of the practical applications include the heat utilization system, adsorption heat pump, and cold/heat storage system which will be described later.

In case where the carbon content thereof is too high, this zeolite, when used especially as an adsorbent, has a reduced adsorption and insufficient adsorbent performances. On the other hand, in case where the carbon content thereof is too low, this zeolite, when used especially as an adsorbent, may have problems concerning durability in exposure to high temperatures in the presence of water vapor (this durability is referred to as "hydrothermal stability"; the same applies hereinafter) and durability in repetitions of adsorption/desorption. The carbon content thereof is more preferably 1.8% by weight or higher, especially preferably 2% by weight or higher. The carbon content is more preferably 5% by weight or lower.

The reasons why the (Me-)silicoaluminophosphate containing carbon in an amount within that range has improved durability have not been fully elucidated. However, it is thought that this (Me-)silicoaluminophosphate changes little in crystal structure and lattice constant and in the state of bonds upon adsorption/desorption and this is attributable to the durability improvement.

Incidentally, unlike the (Me-)aluminophosphate described hereinabove, this (Me-) silicoaluminophosphate need not contain nitrogen as long as the carbon content thereof is within the range shown above. This is because this (Me-) silicoaluminophosphate has an aluminophosphate framework structure containing silicon atoms therein. However, it may contain nitrogen. Although the influence of nitrogen content, when nitrogen is contained, on the hydrothermal stability is slight, too large nitrogen amounts result in reduced adsorbing ability. Because of this, in the case where nitrogen is contained, the content thereof is generally preferably 2% by weight or lower, more preferably 1.5% by weight or lower.

The zeolite according to the invention preferably is one in which the proportion of those parts in the pore structure which enable an adsorbable substance (often referred to as adsorbate) to go therein and go out therefrom (that proportion means the pore utilization factor 1 defined by the following expression 3 or the pore utilization factor 2 defined by the following expression 4) is from 0.6 to 0.99. This pore utilization factor is more preferably 0.7 or higher, especially preferably 0.8 or higher. On the other hand, this poor utilization factor is more preferably 0.95 or lower, especially preferably 0.93 or lower. In the invention, the pore utilization factor may be either that defined as pore utilization factor 1 represented by expression 3 or that defined as pore utilization factor 2 represented by expression 4. To satisfy either of these suffices.

$$\text{Pore utilization factor } 1 = Q1/Qs \qquad 3$$

In expression 3, Qs is the water vapor adsorption in the case where the structure-directing agent has been completely removed, and Q1 is the water vapor adsorption of the zeolite according to the invention, provided that these water vapor adsorptions represent water vapor adsorption capacity per unit weight as measured at a relative vapor pressure of 0.5 and room temperature (25° C.)

$$\text{Pore utilization factor } 2 = W1/Ws \qquad 4$$

In expression 4, Ws is the effective water adsorption in the case where the structure-directing agent has been completely removed, and W1 is the effective water adsorption of the zeolite according to the invention. The term effective water adsorption herein means a value obtained by placing a sample in a 25° C. water-vapor-saturated atmosphere for 1 day to cause it to adsorb to saturation, heating this sample at a rate of 10° C./min in a dry air stream, and calculating the proportion of the weight of water desorbed in the range of from 25° C. to 100° C. to the sample weight as measured before the heating.

The zeolite of the invention preferably is one which has a water vapor adsorption, as determined from a 25° C. adsorption isotherm, of preferably 10% by weight or larger, especially 15% by weight or larger, more preferably 20% by weight or larger. Although the upper limit thereof preferably is higher, it is generally about 40% by weight.

In the case where the zeolite according to the invention is an (Me-)silicoaluminophosphate, this zeolite, when burned to a carbon content lower than 0.3% by weight, retains the framework structure possessed before the burning. In case where an (Me-)silicoaluminophosphate does not retain its original framework structure through burning, this zeolite, when repeatedly used as, e.g., an adsorbent, is highly apt to suffer crystal structure destruction due to its framework structure and the adsorptive properties thereof rapidly decrease.

The term "the zeolite, when burned to a carbon content lower than 0.3% by weight, retains the framework structure possessed before the burning" as used herein means that the framework structure inherent in this (Me-)silicoaluminophosphate is retained. When the following (1) or (2) is satisfied, the intrinsic framework structure is regarded as retained. Preferred is the case in which both of the following (1) and (2) are satisfied. An explanation is given below on (1) and (2).

(1) When the ideal water vapor adsorption, on the assumption that the ideal framework structure is maintained, is expressed as Qi and the water vapor adsorption (25° C.; relative vapor pressure, 0.5) after burning to a carbon content lower than 0.3% by weight is expressed as Qc, then Qc/Qi is 0.4 or larger, provided that Qi is determined according to the following (1-1) or (1-2). Incidentally, a structure framework herein means a code defined by IZA; framework structures which are expressed as the same code even though different in the elements constituting the framework are regarded as the same.

(1-1) In the case where the framework structure of the zeolite in a hydrated state has been analyzed, the proportion of the water contained to the formula weight of the hydrated crystal is taken as Qi.

(1-2) In the case where the framework structure of the zeolite in a hydrated state has not been analyzed, reference is made to D. W. Breck, ZEOLITE MOLECULAR SIEVES: STRUCTURE, CHEMISTRY, AND USE, A WILEY-INTERSCIENCE PUBLICATION, 1974, pp. 48-50 and Table 2.4, and the void fraction for a zeolite having the structure is taken as Qi.

(2) In X-ray powder diffraction patterns, at least one of the three peaks with a high intensity ratio which are attributable to the crystal structure and are among the peaks observed before burning has, even after both of the carbon content and nitrogen content are reduced to below 0.3% by weight through burning, a peak height which is at least 50% of the peak height before the burning. Peak intensity measurements are made using the same sample holder and the same sample weight.

From the standpoint of measurement accuracy, peak intensity measurements are conducted by the following method (A) or (B).

(A) Method in which no internal standard substance is used: Measurement is made under the same conditions, and the absolute values of peak intensities for test samples are compared. It is preferred that when the same sample is examined before and after the measurement of peak intensities for a test sample, the change in the absolute value of a peak intensity be 10% or less.

(B) Method in which an internal standard substance is used: An internal standard substance is mixed in a certain weight ratio, and the ratio of a peak intensity for each test sample to a peak intensity for the internal standard substance (peak intensity ratio) is determined to compare the peak intensity ratios for the test samples.

More specifically, examples of such methods include the following techniques.

(a) Using the same apparatus, test samples sufficiently pulverized with a mortar or the like by human power are examined in the same sample amount under the same conditions. In this case, it is desirable that the examinations of the samples to be compared in intensity be conducted at respective times which are as close as possible to each other. In addition, cares known to persons who make general XRD analyses should be taken to keep the state of the X-ray source as constant as possible. The same sample is examined before and after the measurement for comparison to ascertain that the change in diffraction intensity is 10% or less.

(b) In the case where it is impossible to use the same apparatus or where the same apparatus is used but there is a possibility that the state of the X-ray source might have changed considerably, the following procedure is conducted. The same internal standard substance is added to test samples in a given weight ratio, and each resultant mixture is analyzed by XRD after having been sufficiently mixed by means of a mortar or the like. A peak intensity comparison between the samples is conducted based on the ratio between the intensity of a diffraction peak attributable to the internal standard substance and the intensity of a diffraction peak attributable to the zeolite. The internal standard substance is selected based on knowledges known to persons skilled in the art, such as, e.g., not to have a diffraction peak in the position of the zeolite-attributed diffraction peak to be used for intensity comparison.

Incidentally, the index in which the carbon content is reduced to below 0.3% by weight through burning is an index indicating the state in which the organic template used for (Me-)silicoaluminophosphate production has been removed. It is a value determined by a detection limit.

Burning conditions in the case of reducing the carbon content to below 0.3% by weight through burning include, for example, burning in an oxygen-containing atmosphere at 450° C. or higher for 2 hours. In the case where the zeolite of the invention is an (Me-)aluminophosphate, it is preferred that when both of the carbon content and the nitrogen content are reduced to below 0.3% by weight in the same manner as for the (Me-)silicoaluminophosphate, then the framework structure before the burning be maintained.

The zeolite of the invention preferably is one which, when subjected to a cycle durability test in the manner shown below, retains its crystal structure possessed before the test.

Cycle Durability Test: The zeolite is held in a vacuum vessel kept at 90° C. and is repeatedly subjected 500 times to an operation in which the zeolite is exposed to a vacuum and a 90° C. water-vapor-saturated atmosphere for 90 seconds each.

The retention of the crystal structure means that when the zeolite is examined by XRD using the same apparatus, same examination conditions, same sample holder, and same sample weight, then the highest peak intensity after the test is at least 50% of the highest peak intensity before the test, provided that a peak intensity means a peak height and is a value obtained by subtracting the count for the background from the count for the peak top.

Furthermore, the zeolite of the invention preferably is one which, when subjected to a cycle durability test in the same manner as described above, has a water vapor adsorption after the test, as determined at 25° C. and a relative vapor pressure of 0.5, of at least 80% of the water vapor adsorption thereof as determined before the test.

Moreover, the zeolite of the invention, when heated from 200° C. to 350° C., has a weight loss (g1) of preferably from 0% by weight to 3% by weight. Smaller values of the weight loss (g1) are preferred. The upper limit of the weight loss is preferably 2% by weight, more preferably 1.5% by weight. Too large values of the weight loss (g1) tend to result in insufficient thermal stability.

On the other hand, when the zeolite of the invention is heated from 350° C. to 700° C., the resultant weight loss (g2) is preferably from 2% by weight to 9.5% by weight in the case of the (Me-)aluminophosphate and is preferably from 2% by weight to 6% by weight in the case of the (Me-)silicoaluminophosphate. The reason why the weight loss (g2) of the (Me-)aluminophosphate and that of the (Me-) silicoaluminophosphate differ in upper limit may be that these zeolites differ in properties depending on whether the framework structure contains silicon or not.

The weight loss (g2) is preferably 2.5% by weight or larger, more preferably 3% by weight or larger, when the zeolite of the invention is either the (Me-)aluminophosphate or the (Me-)silicoaluminophosphate. Too small values of the weight loss (g2) tend to result in poor durability.

On the other hand, the weight loss (g2) of the (Me-)aluminophosphate is preferably 9% by weight or smaller, and the weight loss (g2) of the (Me-)silicoaluminophosphate is more preferably 5.5% by weight or smaller. In case where the weight loss (g2) thereof is too large, this zeolite, when used as an adsorbent, tends to have an insufficient adsorption.

Incidentally, the weight losses are calculated using the following equations, wherein the weight at 200° C., weight at 350° C., and weight at 700° C. are expressed as w1, w2, and w3, respectively.

$$\text{Weight loss }(g1)=(w1-w2)/w1\times 100$$

$$\text{Weight loss }(g2)=(w2-w3)/w1\times 100$$

(Process for Producing Zeolite of the Invention)

A process for producing a zeolite of the invention will be explained next.

The process for producing a zeolite according the invention is a process for producing a zeolite according to the invention which has compositional and structural features described above. In this process, the target zeolite is produced by subjecting at least compounds of the metallic elements serving as components of the zeolite to hydrothermal synthesis in the presence of at least one structure-directing agent and burning the resultant zeolite precursor in an atmosphere having an oxygen concentration of 20 vol % or lower. In the case where the zeolite is an (Me-) aluminophosphate, this zeolite is produced preferably through burning in an atmosphere having an oxygen concentration of 0.1 vol % or higher.

First, constituent raw materials for producing a zeolite according to the invention will be explained. In the case where the zeolite is an (Me-)aluminophosphate, the constituent raw materials to be used include an aluminum source, an Me source (especially preferably an iron source), a phosphorus source, and an organic template as a structure-directing agent.

In the case where the zeolite is an (Me-)silicoaluminophosphate, use is made of an aluminum source, an Me source (especially preferably an iron source), a phosphorus source, a silicon source, and an organic template as a structure-directing agent.

These raw materials are mixed together and then subjected to hydrothermal synthesis, whereby a zeolite precursor is obtained.

Aluminum Source:

The aluminum source is not particularly limited. In general, use is made of pseudoboehmite, an aluminum alkoxide such as aluminum isopropoxide or aluminum triethoxide, aluminum hydroxide, alumina sol, sodium aluminate, or the like. Of these, pseudoboehmite is preferably used from the standpoints of handleability and reactivity.

Me Source:

The Me source, which is optionally used, also is not particularly limited. In general, use is made of a salt of an inorganic acid, such as a sulfuric acid salt, nitric acid salt, phosphoric acid salt, chloride, or bromide, a salt of an organic acid, such as an acetic acid salt, oxalic acid salt, or citric acid salt, an organometallic compound such as a pentacarbonyl compound or ferrocene, or the like.

Of these, an inorganic acid salt or an organic acid salt is preferably used from the standpoint of solubility in water. In some cases, a colloidal oxide may be used. Preferred Me sources are ones in which the Me has a valence of 2. With respect to the kind of Me, it is as described hereinabove.

Phosphorus Source:

Phosphoric acid is generally used as the phosphorus source. However, aluminum phosphate may be used.

Silicon Source:

As the silicon source may be used silica sol, fumed silica, or an organosilicon compound such as ethyl silicate. From the standpoint of handleability, silica sol or fumed silica is preferably used among these.

Organic Template:

As the organic template, which serves as a structure-directing agent in hydrothermal synthesis, can be used an amine, an imine, or a quaternary ammonium salt. It is, however, preferred to use at least one compound selected from the group consisting of (1) alicyclic heterocyclic compounds containing nitrogen as a heteroatom, (2) amines having one or more cycloalkyl groups, and (3) amines having one or more alkyl groups. These compounds are easily available and inexpensive and further have an effect that the (Me-)aluminophosphate produced therewith is easy to handle and is less apt to suffer structure destruction.

Those amines preferably used as the organic template are explained below in detail.

Alicyclic Heterocyclic Compounds Containing Nitrogen as Heteroatom:

The alicyclic heterocyclic compounds containing nitrogen as a heteroatom are generally 5- to 7-membered ring compounds, preferably 6-membered ring compounds. The number of heteroatoms contained in the heterocycle is generally up to 3, preferably up to 2. The kinds of the heteroatoms which may be contained are not particularly limited as long as nitrogen is included. However, from the standpoint of the ease of synthesis, a preferred heterocyclic compound is one containing oxygen besides nitrogen. Although the positions of the heteroatoms are not particularly limited, a heterocyclic compound containing no heteroatoms located adjacently to each other is preferred from the standpoint of the ease of synthesis. The molecular weights of the heterocyclic compounds are 250 or lower, and are preferably 200 or lower, more preferably 150 or lower, from the standpoint of the ease of synthesis.

Examples of such alicyclic heterocyclic compounds containing nitrogen as a heteroatom include morpholine, N-methylmorpholine, piperidine, piperazine, N,N'-dimethylpiperazine, 1,4-diazabicyclo[2,2,2]octane, N-methylpiperidine, 3-methylpiperidine, quinuclidine, pyrrolidine, N-methylpyrrolidone, and hexamethyleneimine. Preferred of these from the standpoint of the ease of synthesis are morpholine, hexamethyleneimine, and piperidine. Especially preferred is morpholine.

Amine Having One or More Cycloalkyl Groups:

In the amines having one or more cycloalkyl groups, the number of the cycloalkyl groups is preferably up to 2, more preferably 1, per amine molecule. The number of carbon atoms of each cycloalkyl group is generally 5-7, preferably 6. The number of the cycloalkyl rings is not particularly limited, but it generally preferably is 1. An amine compound having a cycloalkyl group bonded to the nitrogen atom of the compound is preferred from the standpoint of the ease of synthesis. The molecular weights of the amines are 250 or lower, and are preferably 200 or lower, more preferably 150 or lower, from the standpoint of the ease of synthesis.

Examples of such amines having one or more cycloalkyl groups include cyclohexylamine, dicyclohexylamine, N-methylcyclohexylamine, N,N-dimethylcyclohexylamine, and cyclopentylamine. Especially preferred is cyclohexylamine.

Amines Having One or More Alkyl Groups:

In the amines having one or more alkyl groups, the alkyl groups may be present in any number per amine molecule. However, the number thereof is preferably 3. The number of carbon atoms in each alkyl group is preferably 4 or smaller, and the total number of carbon atoms in all alkyl groups per molecule is preferably 10 or smaller. The molecular weights of the amines are 250 or lower, and are preferably 200 or lower, more preferably 150 or lower, from the standpoint of the ease of synthesis.

Examples of such amines having one or more alkyl groups include di-n-propylamine, tri-n-propylamine, triisopropylamine, triethylamine, triethanolamine, N,N-diethylethanolamine, N,N-dimethylethanolamine, N-methyldiethanolamine, N-methylethanolamine, di-n-butylamine, neopentylamine, di-n-pentylamine, isopropylamine, t-butylamine, ethylenediamine, diisopropylethylamine, and N-methyl-n-butylamine. Preferred from the standpoint of the ease of synthesis are di-n-propylamine, tri-n-propylamine, triisopropylamine, triethylamine, di-n-butylamine, isopropylamine, t-butylamine, ethylenediamine, diisopropylethylamine, and N-methyl-n-butylamine. More preferred are N,N-diethylethanolamine, N,N-dimethylethanolamine, and triethylamine. Most preferred are N,N-diethylethanolamine and triethylamine.

Those preferred compounds, i.e., (1) alicyclic heterocyclic compounds containing nitrogen as a heteroatom, (2) amines having one or more cycloalkyl groups, and (3) amines having one or more alkyl groups, may be used alone or in combination of two or more thereof. In the case where one of those amines is used, it preferably is morpholine, among (1) the alicyclic heterocyclic compounds containing nitrogen as a heteroatom, or cyclohexylamine, among (2) the amines having one or more cycloalkyl groups. Especially preferred of these is morpholine.

On the other hand, for synthesizing one having a desired composition and a high purity, it is preferred to use two or more amines in combination. A preferred combination for use as organic templates is one comprising compounds selected from at least two of the groups, i.e., (1) alicyclic heterocyclic compounds containing nitrogen as a heteroatom, (2) amines having one or more cycloalkyl groups, and (3) amines having one or more alkyl groups, so as to include two compounds respectively belonging to the two groups. Use of such a combination has an advantage that a zeolite having a desired element proportion or having high crystallinity is easy to synthesize. More preferred of such combinations is one comprising two or more compounds including (1) an alicyclic heterocyclic compound containing nitrogen as a heteroatom, because a zeolite having a desired element proportion or having high crystallinity is easy to synthesize. A specific example of such preferred combination comprises two or more of morpholine, triethylamine or N,N-diethylethanolamine, and cyclohexylamine. More preferred is a combination comprising at least two such compounds including morpholine.

In mixing organic templates selected respectively from those groups, the proportions thereof should be suitably selected according to conditions. The molar ratio between the two organic templates to be mixed may be in the range of from 1:20 to 20:1, and is preferably from 1:10 to 10:1 from the standpoint of easily synthesizing a zeolite having a desired element proportion or high crystallinity. Other organic templates may be contained. In this case, however, the molar ratio thereof is generally preferably 20% or lower, more preferably 10% or lower. Those organic templates are inexpensive and have advantages that they are easy to handle and reduced in corrosiveness, etc. as compared with organic templates heretofore in use (e.g., tetraethylammonium hydroxide), etc.

In the process for zeolite production of the invention, the use of two or more organic templates in combination in the production and a selection of conditions for the production can bring about the following effects: (i) the rate of crystallization during zeolite synthesis can be improved; (ii) the formation of impurities can be inhibited to thereby easily produce a zeolite having a desired structure; and (iii) a zeolite which has a stable structure less apt to be destroyed can be produced.

In the process for zeolite production of the invention, it is preferred to use organic templates comprising a combination of two or more compounds selected from the (1) to (3) described above. This process has an advantage that due to the synergistic effect of these organic templates, those effects (i) to (iii) can be obtained unlike processes using only one single organic template.

The hydrothermal synthesis in the process for zeolite production according to the invention will be explained next. The following is an explanation on the case where Me is incorporated.

First, an aqueous gel is prepared by mixing constituent raw materials which comprise an Me source, aluminum source, phosphoric acid source, organic template, and water or comprise these ingredients and a silicon source in the case where the zeolite is a silicoaluminophosphate. The sequence of mixing the constituent raw materials is not limited, and may be suitably selected according to the conditions to be employed. In general, however, the phosphoric acid source and the aluminum source are first mixed with water optionally together with the silicon source, and the Me source and organic template are mixed therewith.

The composition of the aqueous gel influences the ease of target-product synthesis. When the amounts of the aluminum source, Me source, and phosphoric acid source are expressed in terms of molar ratio of oxides, then the value of MeO/$Al_2O_3$ is generally larger than 0 and not larger than 1.0, preferably 0.02 or larger and not larger than 0.9, more preferably not larger than 0.8. The $P_2O_5/Al_2O_3$ ratio, which influences the ease of target-product synthesis, is generally 0.6 or larger, preferably 0.8 or larger, more preferably 1 or larger, and is generally 1.8 or smaller, preferably 1.7 or smaller, more preferably 1.6 or smaller.

In the case where the zeolite is a silicoaluminophosphate, the $SiO_2/Al_2O_3$ ratio is such that $0.0001 \leq SiO_2/Al_2O_3 \leq 2$. From the standpoint of the ease of synthesis, that ratio is preferably such that $0.005 \leq SiO_2/Al_2O_3 \leq 1.8$, more preferably such that $0.05 \leq SiO_2/Al_2O_3 \leq 1.5$.

The total amount of the organic templates influences the ease of target-product synthesis and profitability. The molar ratio of the organic templates to $P_2O_5$ (organic templates/$P_2O_5$) is generally 0.2 or larger, preferably 0.5 or larger, more preferably 1 or larger, and is generally 4 or smaller, preferably 3 or smaller, more preferably 2.5 or smaller. Furthermore, the proportions of two or more organic templates to be mixed influence the ease of target-product synthesis and should be suitably selected according to conditions. However, in the case of using, e.g., morpholine and triethylamine as stated above, the morpholine/triethylamine molar ratio may be from 0.03 to 20, preferably from 0.05 to 10, more preferably from 0.1 to 9, most preferably from 0.2 to 4.

In mixing organic templates selected from at least two of the groups so as to include two compounds respectively belonging to the two groups, the sequence of template mixing is not particularly limited. Use may be made of a method in which the organic templates are prepared and then mixed with other materials or a method in which the organic templates are mixed respectively with other materials and a mixture of these is then prepared.

With respect to the proportion of water, the lower limit thereof in terms of molar ratio to $Al_2O_3$ (water/$Al_2O_3$) is 3 or larger, and is preferably 5 or larger, more preferably 10 or larger, from the standpoint of the ease of synthesis. The upper limit of the proportion of water in terms of the molar ratio (water/$Al_2O_3$) is 200 or smaller, and is preferably 150 or smaller, more preferably 120 or smaller, from the standpoints of the ease of synthesis and high productivity.

The pH of the aqueous gel is 4-10, and is preferably 5-9, more preferably 5.5-7.5, from the standpoint of the ease of synthesis. The pH thereof is regulated by regulating the amount of the organic templates to be added or by adding an acid, e.g., hydrochloric acid or sulfuric acid. An ingredient other than those described above may be caused to coexist in the aqueous gel in order to improve the solubility of raw materials or in the expectation that it may function as, e.g., a mineralizer. Examples of such an ingredient include hydroxides or salts of alkali metals or alkaline earth metals and hydrophilic organic solvents such as alcohols. The proportion of the coexistent ingredient influences the ease of target-product synthesis.

In the case of a hydroxide or salt of an alkali metal or alkaline earth metal, the proportion thereof in terms of molar ratio to $Al_2O_3$ (coexistent ingredient/$Al_2O_3$) is generally 0.2 or smaller, preferably 0.1 or smaller. In the case of a hydrophilic organic solvent such as an alcohol, the molar ratio thereof to water is generally 0.5 or smaller, preferably 0.3 or smaller.

The aqueous gel prepared under those conditions is placed in a pressure vessel and is kept at a given temperature with stirring or in a stationary state and with self-pressurization or pressurization with a gas which does not inhibit crystallization, whereby hydrothermal synthesis is conducted.

The reaction temperature in the hydrothermal synthesis, which influences the ease of target-product synthesis, is generally 100° C. or higher, preferably 120° C. or higher, more preferably 130° C. or higher, and is generally 300° C. or lower, preferably 250° C. or lower, more preferably 180° C. or lower.

The reaction time, which influences the ease of target-product synthesis, is generally 2 hours or longer, preferably 3 hours or longer, more preferably 5 hours or longer, and is generally 30 days or shorter, preferably 10 days or shorter, more preferably 4 days or shorter. The reaction temperature may be constant throughout this reaction period or may be stepwise changed.

After the hydrothermal synthesis, the product is separated. Although methods for separating the product are not particularly limited, the product is usually separated by filtration, decantation, etc. The product separated is washed with water and dried at a temperature of from room temperature (25° C.) to 150° C. Thus, a zeolite precursor containing organic templates can be separated as a product.

Next, the burning step in the process for zeolite production according to the invention will be explained.

The burning step is a process in which the zeolite precursor which has been hydrothermally synthesized and separated in the manner described above is heat-treated under given conditions in a stream of nitrogen-diluted air or the like or under vacuum. As a result, a zeolite of the invention is produced.

In this burning step, burning conditions are regulated so as to control the removal of the nitrogen-containing organic templates to thereby produce a zeolite at least containing a given amount of carbon or at least containing given amounts of nitrogen and carbon. Use may be made of a method in which after the organic templates are completely removed by burning, a nitrogen-containing compound, e.g., an organic compound such as an organic amine, e.g., methylamine or ethylamine, is adsorbed onto the walls of pores to thereby produce a zeolite containing given amounts of nitrogen and carbon. In the zeolite thus produced, nitrogen-containing organic-template molecules may remain while retaining their structures. It is, however, preferred that the organic templates have undergone a chemical reaction and remain so as to have a structure in which the carbon or hydrogen has been removed at least partly.

In the case where a nitrogen-containing compound is caused to remain in the zeolite, this nitrogen-containing compound preferably is one which has a higher nitrogen content relative to carbon than the organic templates used. For example, the nitrogen content thereof in terms of the C/N weight ratio is preferably about from 1.0 to 3.5. Whether an organic template remains or not can be ascertained by an analysis such as, e.g., CHN elemental analysis or thermogravimetric mass spectrometry (TG-MASS).

The burning temperature is generally from 200° C. to 800° C., and is preferably 250° C. or higher, more preferably 280° C. or higher, especially 300° C. or higher. On the other hand, the burning temperature is preferably 700° C. or lower, more preferably 500° C. or lower. When the zeolite is an Me-silicoaluminophosphate, the burning temperature is especially preferably 450° C. or lower. When the zeolite is an Me-aluminophosphate, the burning temperature is especially preferably 440° C. or lower. The selection of a burning temperature from the preferred temperature range has an effect that the carbon and nitrogen contents are easy to regulate. With respect to the burning time, the holding period at a maximum temperature may be from 1 minute to 15 hours and is preferably from 2 minutes to 10 hours, more preferably from 5 minutes to 8 hours. The pressure during the burning may be either a reduced pressure or elevated pressure. In general, however, the burning is conducted at or around atmospheric pressure.

The burning may generally be conducted in a gas not containing oxygen or in an inert gas containing oxygen. In the case where the zeolite is an Me-aluminophosphate, it is preferred to conduct the burning in an inert gas containing oxygen. In the gas containing oxygen, the lower limit of the oxygen concentration may be 0.1 vol. % and is preferably 0.5 vol % or higher, more preferably 1 vol. % or higher, even more preferably 2 vol % or higher. On the other hand, the upper limit of the concentration of oxygen contained may be 20 vol % and is preferably 15 vol % or lower, more preferably 10 vol % or lower. When a gas containing oxygen is used and the oxygen concentration in the gas is regulated so as to be within that range, this produces an effect that heat generation from the organic templates during burning is inhibited to thereby facilitate the control of the burning.

It is also possible to use a method in which the zeolite precursor is burned in a stream of an inert gas, e.g., nitrogen, and then burned in a stream of an oxygen-containing gas, in order to avoid the abrupt heat generation accompanying the oxidative decomposition of the organic templates. In this case, the organic templates are partly removed during the burning in an inert gas and, hence, heat generation in the second-stage burning, which is conducted in an oxygen-containing gas, can be inhibited. Consequently, control during the burning is easy as in the case described above. Gases usable in the burning atmosphere besides oxygen are inert gases such as nitrogen, argon, and helium. In some cases, water vapor or a nitrogen oxide may be mixed in an amount up to 10% by volume.

It is preferred that in determining burning conditions for obtaining a zeolite according to the invention, the susceptibility to pyrolysis of the zeolite precursor be examined beforehand and that burning be conducted at a relatively low temperature close to the temperature at which the precursor begins to be pyrolyzed. It is therefore preferred from the standpoint of durability improvement that a relatively low temperature in that temperature range be employed and burning be conducted in the presence of a gas having a relatively low oxygen content.

Examples of methods for producing a zeolite having the properties according to the invention include selections from the conditions described above according to the kinds and proportions of constituent elements in the desired Me-aluminophosphate and Me-silicoaluminophosphate, framework density thereof, etc. In particular, the target product tends to be obtained when the preferred structure-directing agent is used and conditions are selected so as to include a burning temperature of 300-450° C., a burning time of 2-8 hours, and an inert gas atmosphere or an inert gas atmosphere containing oxygen in a proportion within the preferred range shown above.

In the case where the zeolite is an Me-aluminophosphate, examples of preferred burning conditions include burning in an inert gas atmosphere containing 3-7 vol % oxygen and reaction conditions of 300-440° C. and 4-8 hours. In the case where the zeolite is an Me-silicoaluminophosphate, examples of preferred burning conditions include burning in an inert gas and reaction conditions of 300-450° C. and 4-8 hours.

Furthermore, in the case where Me is contained as an essential constituent element, the target product tends to be obtained when burning is conducted in an inert gas atmosphere containing oxygen in a proportion within the preferred range shown above, in particular, when burning is conducted at a relatively low temperature in the burning temperature range shown above, e.g., at 300-400° C., in an inert gas atmosphere containing oxygen in a proportion within the preferred range shown above.

The burning gas may be passed through a burning apparatus or burning may be conducted without passing the gas. In the case of passing the gas, the space velocity (GHSV: gasous hourly space velocity) relative to the zeolite precursor to be burned is preferably within a given range. The space velocity (GHSV) thereof is preferably from 10 $hr^{-1}$ to 10,000 $hr^{-1}$, more preferably from 20 $hr^{-1}$ to 3,000 $hr^{-1}$. Too low GHSV's result in slow removal of the organic templates, while too high GHSV's are economically undesirable because the flow rate of the gas necessary for burning is too high. As the burning apparatus can be used any desired heating apparatus such as, e.g., a muffle furnace, tubular furnace, or kiln. Burning may be conducted in the fixed-bed or fluidized-bed mode. Incidentally, GHSV herein is expressed as "(volume of gas passed)/(volume of zeolite precursor)" per unit time period.

By the process described above, a zeolite according to the invention is produced which contains a given amount of carbon or given amounts of carbon and nitrogen.

(Use of Zeolite of the Invention)

The zeolite according to the invention can be extensively used as an adsorbent, catalyst for acid reactions, oxidation reactions, etc., separation material, optical material such as quantum dots or quantum wires, fine semiconductor particles serving as a magnetic material, or a host for fluorescent substances, dyes, etc. In particular, the zeolite is suitable for use as an adsorbent because it is less apt to suffer crystal structure destruction in repetitions of use and deteriorates little in adsorptive properties.

(Use as Adsorbent)

Since the zeolite according to the invention has excellent durability, such as unsusceptibility to structure destruction, it is advantageously used as an adsorbent to be repeatedly used.

It is especially preferred to use the zeolite as an adsorbent for a heat utilization system. For example, it is suitable for use as an adsorbent for a heat utilization system in which the heat of adsorption generated by the adsorption of an adsorbable substance onto an adsorbent and/or the latent heat of vaporization of the adsorbate, which generates upon vaporization of the adsorbate, is utilized. The term heat utilization system herein means a system in which the heat energy recovered as the heat of adsorption is utilized as a heat source for heating another substance and/or the heat energy (cold) recovered as the latent heat of vaporization is utilized as a heat source for cooling another substance. Examples thereof include a cold/heat storage system, adsorption heat pump, and air-conditioning apparatus for humidity regulation, i.e., for dehumidification/humidification.

The zeolite of the invention itself has adsorbing ability. However, for use in the heat utilization system, the zeolite preferably has the following adsorptive properties: it gives at 25° C. an adsorption isotherm which has a relative-vapor-pressure region in which when the relative vapor pressure changes by 0.15 in the range of from 0.01 to 0.5, then the resultant change in the adsorption of the adsorbable substance (e.g., water) is 0.1 g/g or larger. Namely, a relatively hydrophilic one capable of desorption at relative vapor pressures not lower than 0.01 and of adsorption at relative vapor pressures not higher than 0.5 is suitable. Some heat utilization systems can utilize a heat source having a temperature as high as 150° C. or above and a sufficiently low relative humidity can be used for desorption. In the case of adsorption, however, it is difficult to heighten the relative humidity necessary for adsorption to beyond 0.5 because the humidity is influenced by ambient conditions including ambient temperature.

The operating vapor-pressure range for a heat utilization system is determined by the desorption-side relative vapor pressure ($\Phi 1a$) and the adsorption-side relative vapor pressure ($\Phi 2a$). Using the following equations 5 and 6, $\Phi 1a$ and $\Phi 2a$ can be calculated. The range from $\Phi 1a$ to $\Phi 2a$ is the relative-vapor-pressure range in which the system can be operated.

Desorption-side relative vapor pressure ($\Phi 1a$)=[equilibrium vapor pressure (Tlow1)]/[equilibrium vapor pressure (Thigh)]  5

Adsorption-side relative vapor pressure ($\Phi 2a$)=[equilibrium vapor pressure (Tcool)]/[equilibrium vapor pressure (Tlow2)]  6

The equilibrium vapor pressure (Tlow1), equilibrium vapor pressure (Thigh), equilibrium vapor pressure (Tcool), and equilibrium vapor pressure (Tlow2) mean the equilibrium vapor pressures respectively at temperatures of Tlow1, Thigh, Tcool, and Tlow2.

In the equations, Thigh (high-temperature heat source temperature) is the temperature of the heat medium to be used for heating in desorbing the adsorbate from the adsorbent and regenerating the adsorbent; Tlow 1 (low-temperature heat source temperature) is the temperature of the adsorbable substance in the condenser; Tlow 2 (low-temperature heat source temperature) is the temperature of the heat medium to be used for cooling in subjecting the regenerated adsorbent to adsorption; and Tcool (cold generation temperature) is the temperature of the adsorbable substance in the evaporator, i.e., the temperature of the cold generated. Incidentally, each equilibrium vapor pressure can be determined from the temperature using an equilibrium vapor pressure curve for the adsorbable substance.

In the adsorption process in the heat utilization system described above, the lower the low-temperature heat source temperature Tlow2, the higher the relative humidity necessary for adsorption and the wider the range of relative humidities usable. Virtually, however, it is difficult to completely remove the heat of adsorption generated by the adsorption of an adsorbable substance onto the adsorbent. In addition, the adsorption is influenced by environmental factors including ambient temperature. Consequently, it is usually difficult to regulate the low-temperature heat source temperature Tlow2 to 20° C. or lower. Namely, in the case where the adsorbable substance is water, when a cold generation temperature Tcool of, e.g., 10° C. is to be obtained using a low-temperature heat source temperature Tlow2 of 20° C., then operation in an operating relative-water-vapor-pressure range higher than a relative humidity of 0.52 is unsuitable for the heat utilization system.

On the other hand, in the desorption process in the heat utilization system described above, the higher the high-temperature heat source temperature Thigh, the lower the relative humidity necessary for desorption and the wider the range of relative humidities usable. Incidentally, some systems can obtain a high-temperature heat source having a temperature Thigh of 100° C. or higher, in some cases, 120° C. or higher or a temperature close to 200° C. In this case, even though the low-temperature heat source temperature Tlow1 increases to, e.g., 50° C. due to a trouble in heat removal, an influence of an environmental factor, etc., the relative humidity is about 0.01 when the high-temperature heat source temperature Thigh is 200° C.

Consequently, it is preferred that the zeolite according to the invention which has such adsorptive properties that the adsorption changes in a relative-humidity range of from 0.01 to 0.5 be used as an adsorbent in the heat utilization system of the invention.

The property of undergoing a change in the adsorption of an adsorbable substance of 0.1 g/g or larger when the relative vapor pressure changes by 0.15 means that the adsorption of the adsorbable substance (e.g., water) abruptly changes with a relatively small change in relative vapor pressure in that relative-vapor-pressure range. This change in adsorption means that a large change in adsorption is obtained in a relatively narrow relative-vapor-pressure range. Consequently, the amount of an adsorbable substance necessary for obtaining the same adsorption under the same conditions can be reduced and the heat utilization system can be operated even when the difference in temperature between the cooling heat source and the heating heat source is small.

In using the zeolite of the invention as an adsorbent, it may be used in the form of a forming object. In the case of molding the zeolite, care should be taken to prevent, as much as possible, the adsorptive properties of the zeolite of the invention from decreasing. A molded object can be formed from a mixture prepared by mixing the zeolite of the invention with other optional ingredients such as a binder, e.g., a known binder for adsorbents, an adsorptive substance other than the zeolite of the invention, and the like. Examples of the binder include inorganic binders such as alumina, silica, and clay. The mixture is granulated by stirring granulation, spray granulation, or the like or by isostatic forming (CIP) to obtain a molded object. The molded object may be crushed according to need.

The proportion of the zeolite of the invention in the adsorbent may be 60% by weight or higher, preferably 70% by weight or higher, and may be 100%, in which case the zeolite of the invention is used as the only constituent material of the adsorbent.

(Applicant to Cold/Heat Storage System)

Next, an embodiment in which an adsorbent comprising the zeolite of the invention or containing the zeolite of the invention is applied to a cold/heat storage system is explained.

FIG. 1 is a diagrammatic view illustrating one embodiment of the cold/heat storage system of the invention. This cold/heat storage system 11 of the invention includes an adsorption type cold/heat storage apparatus comprising a circulating-water feeder 12, an adsorption/desorption device 13, and an evaporator/condenser 14 as major components. The adsorption/desorption device 13 contains an adsorbent and is a device to which an adsorbable substance (e.g., water) is supplied from the evaporator/condenser 14 and from which the adsorbable substance is supplied to the evaporator/condenser 14. The evaporator/condenser 14 is a device comprising both of: an evaporator for evaporating the adsorbate and supplying it to the adsorption/desorption device 13; and a condenser for condensing the adsorbable substance supplied from the adsorption/desorption device 13. The circulating-water feeder 12 is a device which supplies high-temperature water A or low-temperature water B to the adsorption/desorption device 13.

This cold/heat storage system 11 is a system having: a constitution for supplying waste heat (circulating water in the circulating-water feeder 12) to the adsorbent (inside of the adsorption/desorption device 13) to desorb the adsorbate (e.g., water) from the adsorbent (constitution a); and a constitution in which the heat (heat of adsorption) generated by the adsorption onto the adsorbent of the adsorbable substance supplied from the evaporator/condenser 14 is supplied to an appliance required to be operated in the heating mode (constitution b-1) and/or a constitution in which the latent heat of adsorbate vaporization generated by the adsorption onto the adsorbent of the adsorbate supplied from the evaporator/condenser 14 is supplied to the cooling medium circulating through a refrigerating machine for cooling (constitution b-2).

In the adsorption type cold/heat storage apparatus utilizing the functions of an adsorbent, the ability of the adsorbent to adsorb/desorb an adsorbable substance is utilized as an operating source. Although water, ethanol, acetone, or the like can be used as the adsorbable substance in the adsorption type cold/heat storage apparatus, water is most preferred of these from the standpoints of safety, cost, and quantity of latent heat of vaporization. This adsorbable substance is adsorbed as water vapor onto the adsorbent.

The adsorbent consisting of the zeolite of the invention or the adsorbent containing the zeolite have mechanical properties including excellent structure strength and adsorptive properties during repetitions of use, as stated above. This adsorbent can hence be advantageously used as an adsorbent for the cold/heat storage system. In particular, the adsorbent having such adsorptive properties that a large change in adsorption is obtained in a relatively narrow relative-vapor-pressure range is especially preferred because it is effective in reducing the adsorbent amount necessary for obtaining the same adsorption under the same conditions. In addition, it has an advantage that the cold/heat storage apparatus can be operated even when the difference in temperature between the cooling heat source and the heating heat source is small.

(Application of Adsorption Heat Pump)

An embodiment in which an adsorbent comprising or containing the zeolite of the invention is applied to an adsorption heat pump is explained next.

Figure 2:
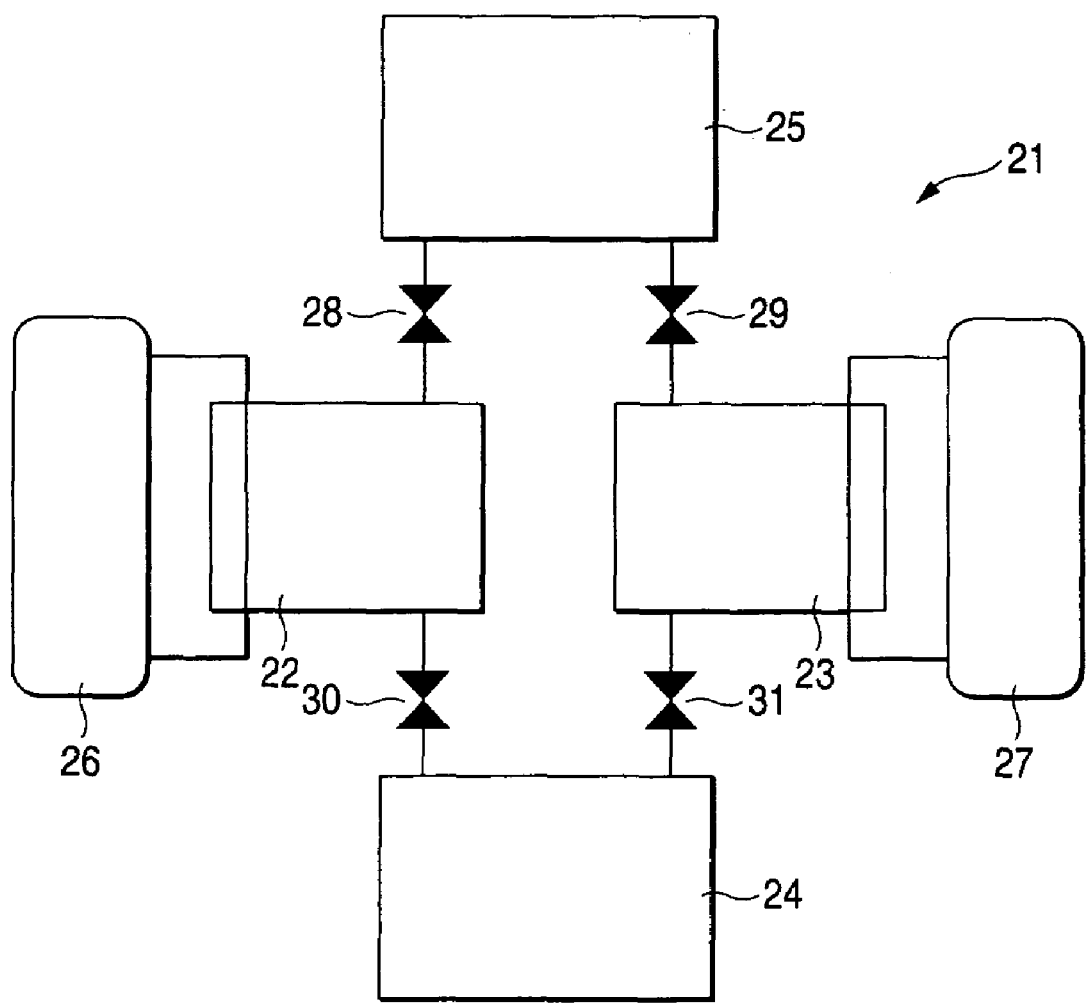
FIG. 2 is a diagrammatic view illustrating one embodiment of the adsorption heat pump of the invention.

FIG. 2 is a diagrammatic view illustrating one embodiment of the adsorption heat pump of the invention. This adsorption heat pump 21 of the invention is constituted mainly of an adsorbable substance, an adsorbent for adsorbing/desorbing the adsorbable substance, adsorption/desorption devices 22 and 23 which are packed with the adsorbent and from which the heat generated by the adsorption/desorption of the adsorbable substance is transferred to a heat medium, an evaporator 24 through which the cold obtained by the vaporization of the adsorbate is taken out, and a condenser 25 through which the heat obtained by the condensation of the adsorbable substance is released outward. High-temperature water or low-temperature water is supplied to the adsorption/desorption devices 22 and 23 from circulating-water feeders 26 and 27. Valves 28 to 31 have been disposed between the adsorption/desorption devices 22 and 23 and each of the vaporizer 24 and the condenser 25.

The adsorption heat pump works, for example, on the following principle. (1) In the case where the valves 29 and 30 are open, low-temperature water is supplied to the adsorption/desorption device 22 from the circulating-water feeder 26, and high-temperature water is supplied to the adsorption/desorption device 23 from the circulating-water feeder 27, then (i) in the adsorption/desorption device 22, the adsorbent adsorbs the adsorbable substance (e.g., water) supplied from the evaporator 24 and warm water is obtained due to the heat of adsorption generated by the adsorption, and (ii) in the adsorption/desorption device 23, the adsorbate is desorbed from the adsorbent and cold water is obtained due to the latent heat of vaporization generated by the desorption. On the other hand, (2) in the case where the valves 28 and 31 are open, high-temperature water is supplied to the adsorption/desorption device 22 from the circulating-water feeder 26, and low-temperature water is supplied to the adsorption/desorption device 23 from the circulating-water feeder 27, then (i) in the adsorption/desorption device 22, the adsorbate is desorbed from the adsorbent and cold water is obtained due to the latent heat of vaporization generated by the desorption, and (ii) in the adsorption/desorption device 23, the adsorbent adsorbs the adsorbable substance (e.g., water) supplied from the evaporator 24 and warm water is obtained due to the heat of adsorption generated by the adsorption.

The adsorption heat pump 21 is a heat utilization system in which cold water can be always obtained by operating the valves to repeatedly conduct those two operations. Further details of such constitution and operation principle of the adsorption heat pump are given in, e.g., JP-A-2002-372332.

The adsorption heat pump of the invention is an adsorption heat pump to which an adsorbent comprising the zeolite of the invention or an adsorbent containing the zeolite has been applied. This adsorbent has mechanical properties including excellent structure strength and adsorptive properties during repetitions of use, as stated above. This adsorbent can hence be advantageously used as an adsorbent for the adsorption heat pump. In particular, the adsorbent having such adsorptive properties that a large change in adsorption is obtained in a relatively narrow relative-vapor-pressure range is especially preferred because it is effective in reducing the adsorbent amount necessary for obtaining the same adsorption under the same conditions. In addition, it has an advantage that the adsorption heat pump can be operated even when the difference in temperature between the cooling heat source and the heating heat source is small.

(Application to Air-Conditioning Apparatus for Dehumidification)

Next, an embodiment in which an adsorbent comprising or containing the zeolite of the invention is applied to an air-conditioning apparatus for dehumidification is explained.

Figure 3:
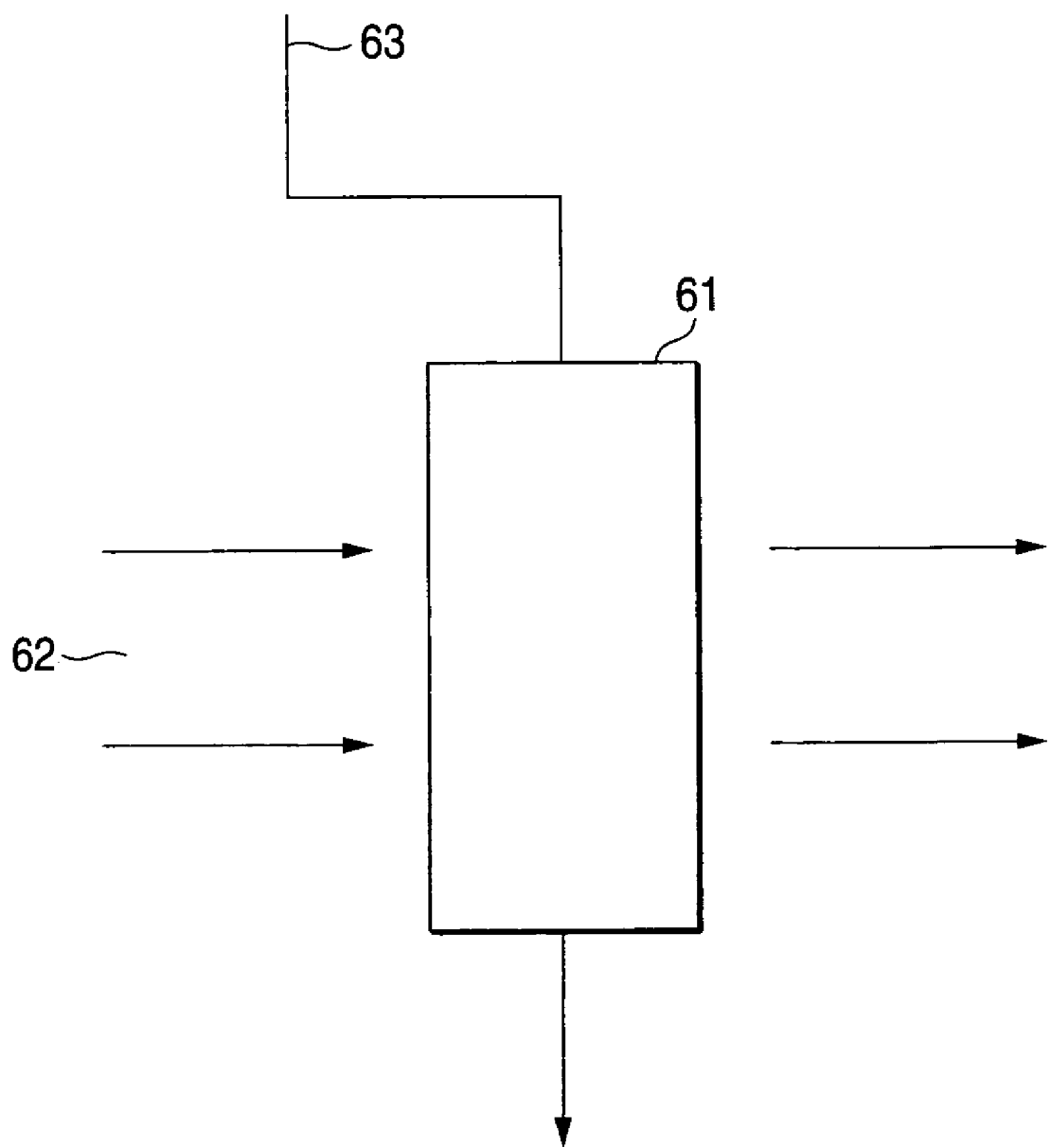
FIG. 3 is a diagrammatic view illustrating one embodiment of the air-conditioning apparatus for dehumidification of the invention.

FIG. 3 is a diagrammatic view illustrating one embodiment of the air-conditioning apparatus for dehumidification of the invention. This air-conditioning apparatus for dehumidification 61 of the invention is an apparatus comprising an adsorbent capable of the adsorption/desorption of an adsorbable substance (e.g., water), an adsorption/desorption device 61 containing the adsorbent, and a device 63 for regenerating the adsorbent. This air-conditioning apparatus for dehumidification 61 may be optionally equipped with an air passage (not shown) for passing air 62 whose humidity is to be regulated (referred to also as air to be humidity-regulated) or a device (not shown) for forcibly discharging the air which has been humidity-regulated.

The adsorption/desorption device 61 is not limited as long as it has a shape which enables the adsorbent to come into sufficient contact with the air to be humidity-regulated 62. Examples of the shape include a rotor shape having a honeycomb structure.

The device 63 for regenerating the adsorbent is as follows. (i) In the case of dehumification, the device 63 may be a heat supply device capable of supplying heat of about 80° C. necessary for adsorbent regeneration to the adsorption/desorption device 61. (ii) In the case where heat is generated within the apparatus by means of, e.g., electrical heating, the device 63 may be a device comprising a heat source, e.g., a heater or a heating coil, and a blower for sufficiently transferring the heat to the adsorption/desorption device 61. (iii) In the case where a heat source is obtained from outside the apparatus, the device 63 may be a device, e.g., a piping, for supplying a high-temperature gas from the heat source. The external heat source in this case is not limited as in the adsorption heat pump, and examples thereof include cogeneration apparatus, such as a gas engine and gas turbine, and fuel cells. Furthermore, (iv) in the case of humidification, the device 63 may be a passage through which high-humidity air for re-moistening passes.

One example of methods of humidity regulation with an air-conditioning apparatus for dehumidification is explained below by reference to FIG. 4. However, the humidity regulation methods should not be construed as being limited to the following example.

Figure 4:
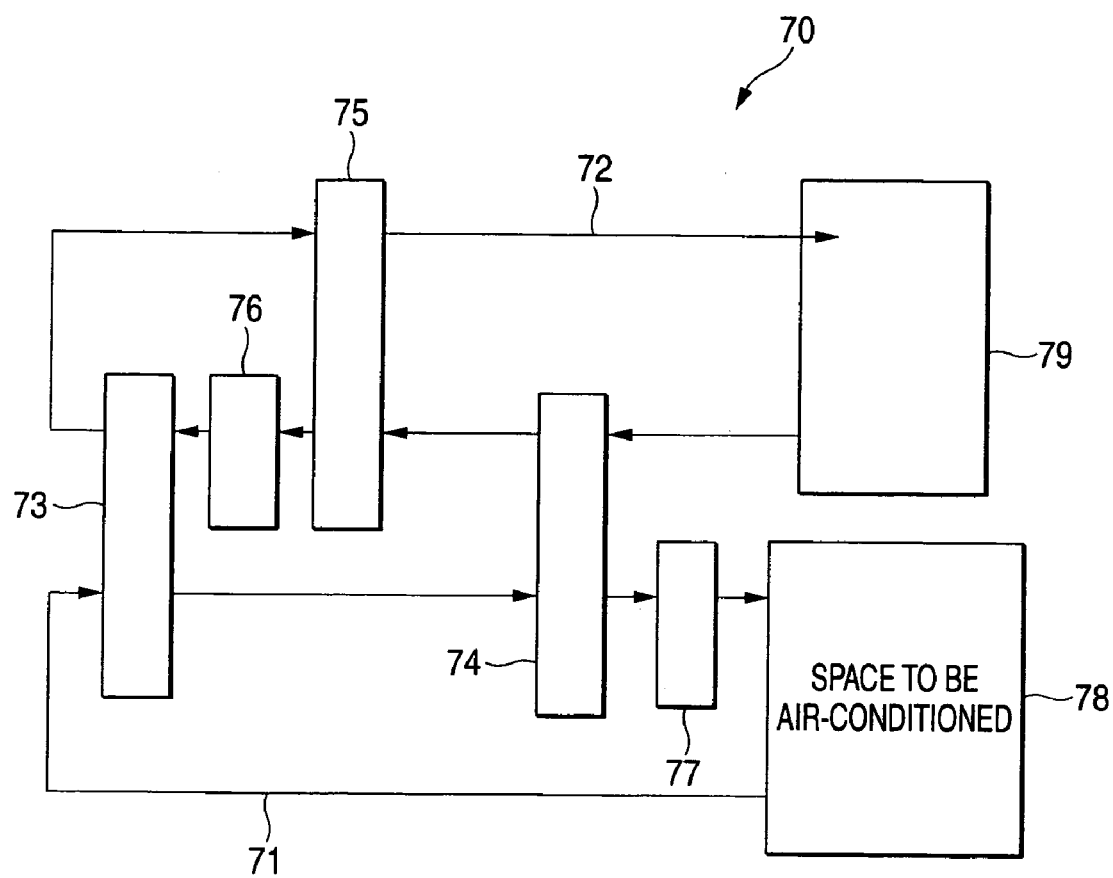
FIG. 4 is a diagrammatic view illustrating one example of desiccant air-conditioners, which are air-conditioning apparatus for dehumidification.

FIG. 4 is a diagrammatic view illustrating one example of desiccant air-conditioners, which are air-conditioning apparatus for dehumidification. This desiccant air-conditioner 70 comprises, as major components, a raw-air passage 71, a regeneration air passage 72, a desiccant rotor 73 having an adsorbent adherent thereto, two sensible-heat exchangers 74 and 75, a heat supply device 76 for supplying heat from a heat source, and a humidifier 77. Raw air is dehumidified with the desiccant rotor 73 and increases in temperature due to the heat of water adsorption onto the desiccant. The raw air is thereafter cooled in the first sensible-heat exchanger 74 through heat exchange with regeneration air, subsequently humidified with the humidifier 77, and then supplied to a space 78 to be air-conditioned. On the other hand, regeneration air is introduced from the outside space, increases in temperature in the first sensible-heat exchanger 74 through heat exchange with raw air, and is then heated with the heat supply device 76. This regeneration air, which is in the state of having a reduced relative humidity, passes through the desiccant rotor 73 to desorb water from the desiccant rotor 73 to regenerate it. That heat of the regeneration air after the regeneration which corresponds to the sensible heat is recovered by heat exchange in the second sensible-heat exchanger 75 with regeneration air which has not been heated. Thereafter, the regeneration air is discharged to the outside 79.

An adsorbent comprising the zeolite of the invention or an adsorbent containing the zeolite can be advantageously applied as an adsorbent to this air-conditioning apparatus for dehumidification, because this adsorbent has mechanical properties including excellent strength and adsorptive properties during repetitions of use, as stated above.

Furthermore, it is also possible to conduct humidification, for example, by a method in which the air which has been used for regeneration by desorbing water from the adsorbent is supplied into the room according to the principle described above.

(Applications and Adsorptive Properties)

Heat utilization systems in which the zeolite of the invention is used as an adsorbent are systems in which the heat energy recovered as the heat of adsorption is utilized as a heat source for heating another substance and/or the heat energy (cold) recovered as the latent heat of vaporization is utilized as a heat source for cooling another substance. Examples thereof include cold/heat storage systems, adsorption heat pumps, and air-conditioning apparatus for dehumidification or humidification as stated above.

In such heat utilization systems, an adsorbable substance (e.g., water) is adsorbed as a vapor onto the adsorbent. This adsorbent preferably is a material which undergoes a large change in the adsorption of the adsorbable substance in a narrow relative-vapor-pressure range. This adsorptive property varies slightly depending on applications in which the adsorbent is used.

First, preferred adsorptive properties in the case of applying the adsorbent of the invention to adsorption heat pumps are explained.

The adsorbent to be applied to adsorption heat pumps desirably is one in which the zeolite of the invention contained in the adsorbent gives at 25° C. an adsorption isotherm which has a relative-vapor-pressure region in which when the relative vapor pressure changes by 0.15 in the range of from 0.05 to 0.30, then the resultant change in the adsorption of water as an adsorbable substance is 0.1 g/g or larger. In this zeolite, the change in the adsorption of water as an adsorbable substance is preferably 0.12 g/g or larger, more preferably 0.15 g/g or larger, even more preferably 0.18 g/g or larger.

The reasons why such adsorptive properties are preferred are explained below with respect to the case in which an adsorption heat pump is operated using waste heat having a relatively low temperature of 100° C. or below generated from gas engine cogeneration or from a solid polymer type fuel cell or automotive engine. In the following explanation, an operating vapor-pressure range in the case of using water as an adsorbable substance is used.

In the case where an adsorption heat pump is operated using waste heat having a relatively low temperature of 100° C. or below generated from gas engine cogeneration or from a solid polymer type fuel cell or automotive engine, when the high-temperature heat source temperature and the low-temperature heat source temperature are, for example, 80° C. and 30° C., respectively, then the operating vapor-pressure range ($\Phi 1a$-$\Phi 2a$) is 0.09-0.29. Likewise, when the high-temperature heat source temperature and the low-temperature heat source temperature are 60° C. and 30° C., respectively, then the operating relative-water-vapor-pressure range (Φ1a-Φ2a) is 0.21-0.29. Furthermore, a calculation made based on a statement given in JP-A-2000-140625 for the case where waste heat from an automotive engine is used to operate an adsorption heat pump shows that when the high-temperature heat source temperature and the low-temperature heat source temperature are about 90° C. and 30° C., respectively, then the operating relative-water-vapor-pressure range (Φ1a-Φ2a) is 0.06-0.29.

It can be understood from these that the operating relative-water-vapor-pressure range (Φ1a-Φ2a) in the case of operating an adsorption heat pump using the waste heat is preferably 0.05-0.30, more preferably 0.06-0.29. Consequently, in the case where an adsorbent is regenerated by reducing the relative water vapor pressure by heating, it is preferred to employ an adsorbent having such adsorptive properties that desorption is completed at a relative water vapor pressure not lower than 0.05, preferably not lower than 0.06. On the other hand, from the standpoint of adsorption, it is preferred to employ an adsorbent having such adsorptive properties that a sufficient adsorption is obtained at a relative water vapor pressure not higher than 0.30, preferably not higher than 0.29.

To sum up, a material showing a large change in adsorption in the operating humidity range to be applied is preferred and, in general, a material showing a large change in adsorption as described above in a relative-water-vapor-pressure range of 0.05-0.30, preferably 0.06-0.29, is preferred.

An adsorbent having the adsorptive properties described above may be selected from adsorbents comprising or containing the zeolite of the invention. However, it is preferred to select an aluminophosphate containing at least one Me element selected especially from Fe, Ni, Co, Mg, and Zn or a silicoaluminophosphate containing at least one Me element selected especially from Fe, Ni, Co, Mg, and Zn. Especially preferred of these is one in which Me is Fe. With respect to the framework structure, it preferably is a structure selected from AEI, CHA, and LEV. In the case where the zeolite of the invention is an aluminophosphate, it is desirable that the proportion of the Me metal contained be from 0.01 to 0.15, preferably from 0.02 to 0.1, in terms of the molar ratio of Me to all elements constituting the framework structure other than oxygen ((Me)/(Me+Al+P)). In the case where the zeolite of the invention is a silicoaluminophosphate, it is desirable that the proportion of the Me metal contained be from 0.01 to 0.15, preferably from 0.02 to 0.1, in terms of the molar ratio of "Me+Si" to all elements constituting the framework structure other than oxygen ((Me+Si)/(Me+Si+Al+P)).

Next, preferred adsorptive properties in the case of applying the adsorbent of the invention to cold/heat storage systems are explained.

The adsorbent to be applied to cold/heat storage systems desirably is one in which the zeolite of the invention contained in the adsorbent gives at 55° C. an adsorption isotherm in which the adsorption of the adsorbate at a relative vapor pressure of 0.02 is 0.15 g/g or smaller and the adsorption of the adsorbate at a relative vapor pressure of 0.1 is 0.10 g/g or larger and which has a relative-vapor-pressure region in which when the relative vapor pressure changes by 0.05 in the range of from 0.02 to 0.1, then the resultant change in the adsorption of the adsorbable substance is 0.05 g/g or larger. More desirably, the zeolite gives at 55° C. an adsorption isotherm in which the adsorption of the adsorbate at a relative vapor pressure of 0.02 is 0.12 g/g or smaller and the adsorption of the adsorbate at a relative vapor pressure of 0.1 is 0.13 g/g or larger and which has a relative-vapor-pressure region in which when the relative vapor pressure changes by 0.05 in the range of from 0.02 to 0.1, then the resultant change in the adsorption of the adsorbable substance is 0.05 g/g or larger, especially 0.08 g/g or larger. Especially desirable is one in which the adsorption of the adsorbate at a relative vapor pressure of 0.02 is 0.04 g/g or smaller and the adsorption of the adsorbate at a relative vapor pressure of 0.1 is 0.15 g/g or larger and which has a relative-vapor-pressure region in which when the relative vapor pressure changes by 0.05 in the range of from 0.02 to 0.1, then the resultant change in the adsorption of the adsorbable substance is 0.10 g/g or larger.

The reasons why such adsorptive properties are preferred are explained below with respect to a cold/heat storage system to be mounted on a motor vehicle.

In a cold/heat storage system to be mounted on a motor vehicle, the adsorption/desorption device is heated to about 90° C. with hot water at about 90° C. heated with waste heat, and the adsorbent in the heated adsorption/desorption device releases the adsorbate. The cooling medium circulating through the cooler is cooled by the latent heat of vaporization generated by this desorption, whereby the condenser is cooled to about 10° C. In this operation, the relative vapor pressure between those devices is about 0.02. Consequently, it is preferred that the adsorption of the adsorbate at a relative vapor pressure of 0.02 be small. In the case where the temperature of the adsorption/desorption device becomes a low temperature not higher than 90° C. (e.g., about 60-85° C.) or the temperature of the condenser becomes a temperature higher than 10° C. (e.g., about 15-30° C.), the relative vapor pressure between these is higher than 0.02. In this case, it is therefore necessary to attain sufficient desorption at such a relative vapor pressure higher than 0.02. Consequently, it is preferred that the adsorption of the adsorbate under the conditions of a relative vapor pressure of 0.02 should be smaller.

In motor vehicles and the like, there are cases where the temperature of the adsorption/desorption device becomes about 45-60° C. due to the cooling water cooled with the radiator and the temperature of the evaporator becomes about 10° C. due to the heat exchanger. In this case, the relative vapor pressure between the adsorption/desorption device and the evaporator is about 0.10 and, hence, the adsorbent preferably is one which has a large adsorption of the adsorbate at a relative vapor pressure of 0.10. Namely, it is preferred to employ an adsorbent which shows a large change in adsorption in that operating humidity range.

An adsorbent having the adsorptive properties described above may be selected from adsorbents comprising or containing the zeolite of the invention. However, it is desirable to select (a) an (Me-)aluminophosphate which is an iron aluminophosphate wherein Me is Fe or (b) an (Me-)silicoaluminophosphate which is an iron silicoaluminophosphate wherein Me is Fe. With respect to the framework structure, it preferably is a CHA structure. In the case of (a) above, it is desirable that the proportion of the Me metal contained be from 0.03 to 0.25, preferably from 0.04 to 0.20, in terms of the molar ratio of Me to all elements constituting the framework structure other than oxygen ((Me)/(Me+Al+P)). In the case of (b) above, it is desirable that the proportion of the Me metal contained be from 0.03 to 0.25, preferably from 0.04 to 0.20, in terms of the molar ratio of "Me+Si" to all elements constituting the framework structure other than oxygen ((Me+Si)/(Me+Si+Al+P)).

The relationship between a heat utilization system and adsorptive properties was explained above using an adsorption heat pump and a cold/heat storage system as examples of the system. When a zeolite having the preferred adsorptive properties described above is selected and an adsorbent comprising this zeolite is used, then not only adsorbent durability attributable to the performance of the zeolite of the invention is obtained but also an adsorption process and a desorption process occur at lower relative vapor pressures and at higher relative vapor pressures, respectively, as compared with the case of using adsorbents heretofore in use. As a result, only a slight change in relative humidity brings about a change in the adsorption of this adsorbable substance. Because of this, the adsorbent according to the invention can be advantageously applied to adsorption heat pumps to be mounted on motor vehicles, which generate waste heat in large quantities and have a problem that use of the air-conditioner results in a further decrease in mileage, and to cold/heat storage systems.

As described above, the zeolite of the invention and the adsorbent comprising the same, when used especially as an adsorbent repeatedly subjected to the adsorption/desorption of an adsorbable substance, have such preferred properties that their adsorbing ability deteriorates little during repetitions of use. Consequently, the zeolite or adsorbent has a useful effect that it withstands use under such severe conditions that the adsorption of an adsorbable substance onto the adsorbent and the desorption thereof from the adsorbent are repeated several hundreds of thousands of times or more, as in a heat utilization system in which the heat of adsorption generated by the adsorption of an adsorbable substance onto an adsorbent and/or the latent heat of vaporization generated by the vaporization of the adsorbate is utilized, such as, e.g., a cold/heat storage system, adsorption heat pump, or air-conditioning apparatus for dehumidification.

EXAMPLES

The invention will be explained below in more detail by reference to Examples and Comparative Examples. The invention should not be construed as being limited by the following Examples in any way.

The zeolites of the following Examples 1-1 to 1-3 and Examples 2-1 to 2-3 each are a zeolite which, when burned to a carbon content lower than 0.3% by weight, retains the framework structure possessed by the zeolite before the burning.

In the Examples and Comparative Examples, property examinations were conducted under the following conditions.

(Conditions for X-Ray Powder Diffractometry (XRD))
  X-ray source: Cu—$K_\alpha$ line ($\lambda$=1.54 Å)
  Set output: 40 kV, 30 mA
  Optical conditions for measurement:
  Divergence slit: 1°
  Scattering slit: 1°
  Receiving slit: 0.2 mm
  Position of diffraction peak: 2θ (diffraction angle)
  Range of measurement: 2θ=4-50°
  Sample: About 100 mg of a sample pulverized with an agate mortar by human power was used. Sample holders having the same shape were used and the sample was packed therein in an almost constant amount.

(CN Analysis)
Analysis was made with PERKIN ELMER 2400 Series II CHNS/O Analyzer.

(Elemental Analysis)
A sample was burned in an air stream at 550° C. for 6 hours, dissolved in hydrochloric acid, and then subjected to compositional analysis by the ICP method.

(Weight Lose Measurement)
A sample was subjected to thermogravimetric analysis in an air stream of 10 mL/min under the conditions of a heating rate of 10° C./min and a sample amount of about 10 mg. From the weights at 200° C., 350° C., and 700° C., the weight loss (g1) and the weight loss (g2) were determined in the manner described hereinabove.

(Adsorptive Property (25° C.))
The adsorption of water vapor at 25° C. was measured with a water vapor adsorption measuring apparatus (Belsorb 18, manufactured by Bel Japan Inc.).
  Temperature of thermostatic air chamber: 50° C.
  Adsorption temperature: 25° C.
  Initial introduction pressure: 3.0 torr
  Number of introduction pressure set points: 0
  Saturated vapor pressure: 23.755 torr
  Equilibrium time: 500 sec
  Sample: subjected to 5-hour evacuation treatment at 120° C. before the measurement.

(Adsorptive Property (55° C.))
The adsorption of water vapor at 55° C. was measured with a water vapor adsorption measuring apparatus (Belsorb 18, manufactured by Bel Japan Inc.).
  Temperature of thermostatic air chamber: 60° C.
  Adsorption temperature: 55° C.
  Initial introduction pressure: 3.0 torr
  Number of introduction pressure set points: 0
  Saturated vapor pressure: 118.11 torr
  Equilibrium time: 500 sec
  Sample: subjected to 5-hour evacuation treatment at 120° C. before the measurement.

(Measurement of Effective Water Adsorption)
Using a thermogravimetric analyzer (TGA-50, manufactured by Shimadzu Corp.), about 10 mg of a sample which had been allowed to stand for 1 day in a water-vapor-saturated atmosphere of room temperature (25° C.) in a vacuum desiccator was heated from room temperature (25° C.) to 250° C. at a heating rate of 10° C./min in a dry air stream of 10 mL/min. The proportion, in terms of % by weight, of the amount of water desorbed during heating from room temperature (25° C.) to 100° C. to the weight of the sample which had adsorbed in the water-vapor-saturated atmosphere at room temperature (25° C.) was taken as the effective water adsorption.

(Durability Test 1)
About 0.5 g of a sample was placed in a glass vessel having an inner diameter of about 20 mm (inner diameter of the opening, about 15 mm) and a height of about 40 mm. This vessel was put in an oven which was capable of temperature programming and had been installed in an atmosphere kept at 25° C. and a humidity of 60%. A temperature cycle in the oven which consisted of holding at 40° C. for 20 minutes, subsequent heating to 100° C. at 2° C./min, holding at 100° C. for 20 minutes, and subsequent cooling to 40° C. at 2° C./min was repeatedly conducted 100 times.

(Durability Test 2)
A sample was held in a vacuum vessel kept at 90° C. and repeatedly subjected 500 times to an operation in which the sample was exposed to a vacuum and a 90° C. water-vapor-saturated atmosphere for 90 seconds each.

(Durability Test 3: Hydrothermal Test)
Pure water was placed in an amount of 0.2 g on the bottom of a stainless-steel autoclave (capacity, about 100 mL (inner diameter, 42 mm)) lined with Teflon (trademark). A sample was placed in an amount of 0.2 g on a sample dish (outer diameter, 40 mm) made of Teflon (trademark) and having legs with a length of about 20 mm, in order to prevent the sample from coming into contact with the liquid water during the test. This sample dish was placed in the autoclave, which was then closed. This autoclave was held for 24 hours in a thermostatic drying oven kept at 100° C., subsequently taken out thereof, and allowed to cool to room temperature (25° C.)

Example 1-1

Hydrothermal synthesis and burning were conducted to produce a nitrogen-containing zeolite in the following manner.

First, 11.53 g of 85% phosphoric acid was added to 28.05 g of water. Thereto was gradually added 5.44 g of pseudo-boehmite (containing 25% water; manufactured by Condea) The resultant mixture was stirred. This mixture is referred to as liquid A. Separately from liquid A, a liquid was prepared by mixing 5.56 g of ferrous sulfate heptahydrate, 4.35 g of morpholine, 5.06 g of triethylamine, and 29 g of water. This liquid was gradually added to liquid A and the resultant mixture was stirred for 3 hours to obtain a gel-form starting reactant material having the following composition.

$0.4FeSO_4:0.8Al_2O_3:P_2O_5:1.0$ morpholie: 1.0 triethylamine:$70H_2O$

The starting reactant material obtained was introduced into a 200-cc stainless-steel autoclave equipped with a Teflon (trademark) inner cylinder. The starting material was reacted at 180° C. in a stationary state for 1 day. After the reaction, the reaction mixture was cooled and the supernatant was removed by decantation to recover the precipitate. This precipitate was washed with water three times, recovered by filtration, and then dried at 120° C. to obtain a zeolite precursor.

This zeolite precursor was identified by X-ray powder diffractometry (XRD). As a result, the precursor was found to have a pure CHA structure.

Figure 5:
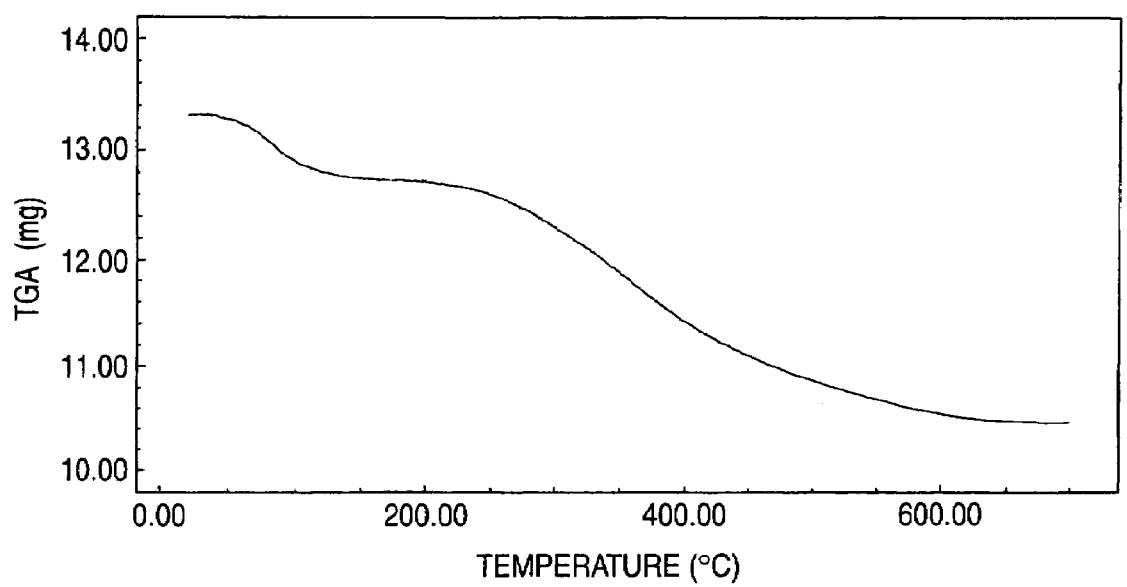
FIG. 5 shows the results of thermogravimetric analysis of the zeolite precursor obtained in Example 1-1.

A portion (13 mg) of the zeolite precursor dried was subjected to thermogravimetric analysis. In the thermogravimetric analysis, a thermogravimetric analyzer (TGA-50, manufactured by Shimadzu Corp.) was used to heat the precursor from room temperature (25° C.) to 700° C. at 10° C./min while passing helium-diluted air (oxygen concentration, 7 vol %) at 30 mL/min. The results thereof are shown in FIG. 5.

Figure 6:
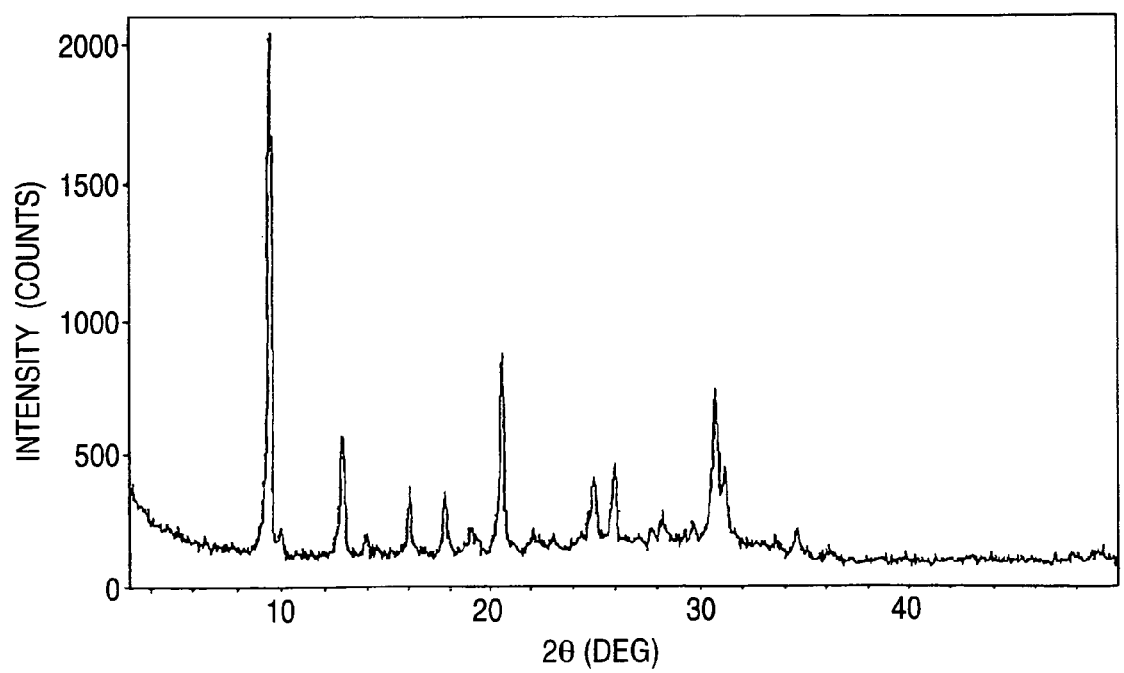
FIG. 6 is an XRD pattern for the burned product obtained in Example 1-1 which had not undergone Durability Test 1.

Subsequently, a 3-g portion was taken from the zeolite precursor obtained, and placed in a vertical quartz tube for burning. While a mixed gas (oxygen concentration, 7 vol %) comprising 175 mL/min air and 325 mL/min nitrogen was being passed, the precursor was heated to 350° C. at 0.35° C./min and then held as it was at 350° C. (this temperature is a temperature around the decomposition temperature determined by thermogravimetric analysis as shown in FIG. 5) to thereby conduct burning for 6 hours. Thus, a burned product was obtained which was a nitrogen-containing zeolite. This burned product was identified by XRD. The diffraction pattern obtained is shown in FIG. 6. The burned product was found to have a pure CHA structure (FD, 14.5 T/nm³).

Figure 7:
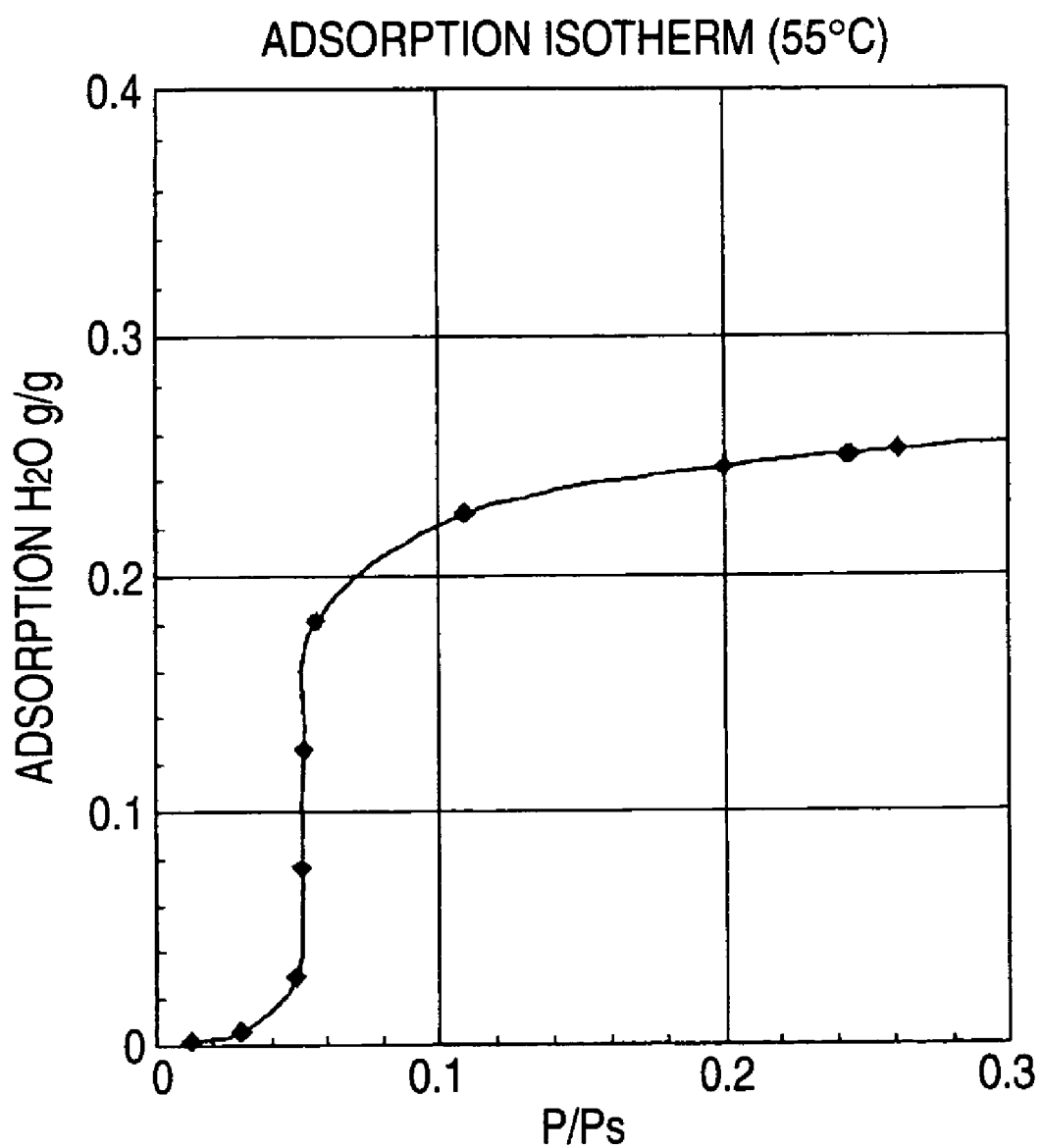
FIG. 7 is a water vapor adsorption isotherm at 55° C. of the burned product obtained in Example 1-1.

CN analysis of the burned product revealed that the carbon and nitrogen contents were 2.3% by weight and 1.1% by weight, respectively, and the C/N weight ratio was 2.12. As a result of elemental analysis, the proportion (molar ratio) of each of the components Al, P, and Fe to the sum of these was found to be as follows: Al, 37.8 mol %; P, 50 mol %; Fe, 12.2 mol %. The water vapor adsorption (25° C.) was 27% by weight. As a result of an adsorptive property (55° C.) examination of the burned product, the adsorption isotherm shown in FIG. 7 was obtained. The pore utilization factor determined using equation 3 given hereinabove was 0.9. The burned product, after Durability Test 1, had a water vapor adsorption of 27% by weight as measured at 25° C. and a relative vapor pressure P/Ps of 0.5, and no decrease was observed.

Figure 8:
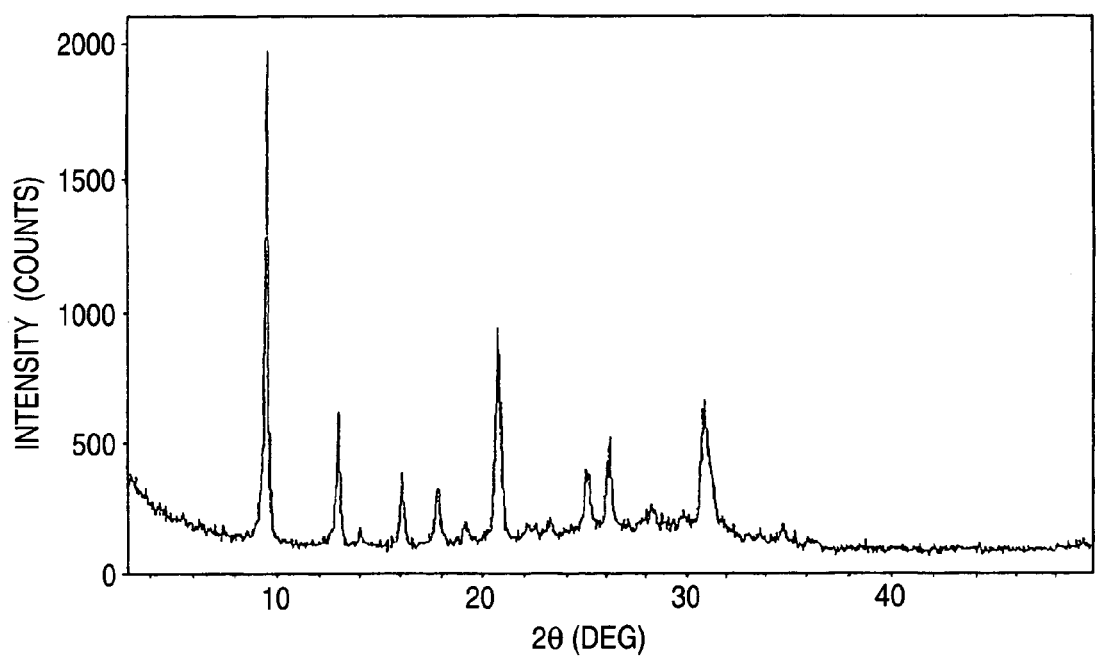
FIG. 8 is an XRD pattern for the burned product obtained in Example 1-1 which had undergone Durability Test 1.
Figure 9:
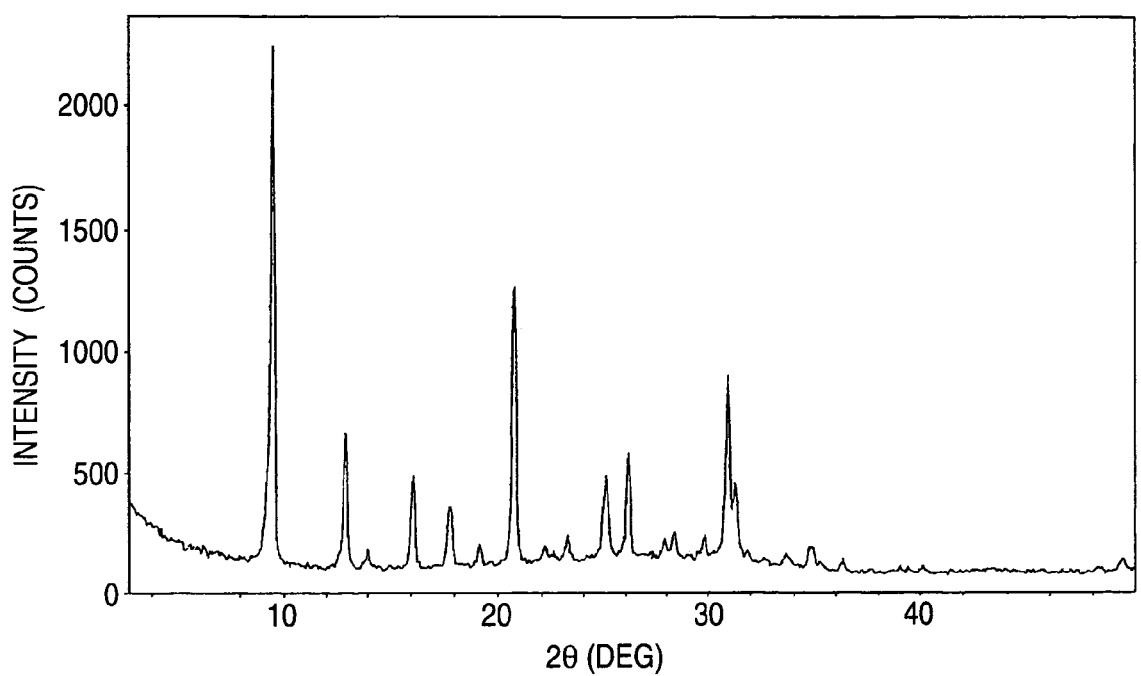
FIG. 9 is an XRD pattern for the burned product obtained in Example 1-1 which had undergone Durability Test 2.

FIG. 8 shows an XRD pattern for the burned product after Durability Test 1. A CHA structure was ascertained and no significant decrease in crystallinity was observed. In the XRD analysis, almost the same sample weight was used before and after the repetitions. Particles of the burned product were examined before and after Durability Test 1. As a result, no particle breakage was observed. FIG. 9 shows an XRD pattern for the burned product after Durability Test 2, and a CHA structure was ascertained. The burned product, after Durability Test 2, had a water vapor adsorption of 27% by weight as measured at 25° C. and a relative vapor pressure of 0.5. The burned product was further examined for the weight loss (g1) and weight loss (g2).

The results of these are shown in Table 1.

Example 1-2

A burned product which was a nitrogen-containing zeolite was obtained in the same manner as in Example 1-1, except that the burning temperature and the oxygen concentration in the gas passed were changed to 340° C. and 5 vol %, respectively.

The burned product obtained had a nitrogen content of 1.7% by weight, a carbon content of 3.1% by weight, and a C/N weight ratio of 1.83. From an XRD pattern obtained in the same manner as in Example 1-1, the burned product was found to have a pure CHA structure (FD, 14.5 T/nm³)

It had a water vapor adsorption (25° C.) of 27% by weight. The pore utilization factor determined using equation 3 was 0.9. Durability Test 1 was conducted and, as a result, no decrease in adsorption was observed and the crystallinity remained unchanged. The burned product was further examined for the weight loss (g1) and weight loss (g2). The results thereof are shown in Table 1.

Example 1-3

A burned product which was a nitrogen-containing zeolite was obtained in the same manner as in Example 1-1, except that the burning temperature and the oxygen concentration in the gas passed were changed to 400° C. and 0.2 vol %, respectively.

The burned product obtained had a nitrogen content of 1.7% by weight, a carbon content of 5.0% by weight, and a C/N weight ratio of 2.86. From an XRD pattern obtained in the same manner as in Example 1-1, the burned product was found to have a pure CHA structure (FD, 14.5 T/nm³). It had a water vapor adsorption (25° C.) of 23% by weight. The pore utilization factor determined using equation 3 was 0.77. Durability Test 1 was conducted and, as a result, no decrease in adsorption was observed and the crystallinity remained unchanged. The burned product was further examined for the weight loss (g1) and weight loss (g2). The results thereof are shown in Table 1.

Comparative Example 1-1

A burned product which was an iron aluminophosphate was obtained in the same manner as in Example 1-1, except that the burning temperature was changed to 550° C.

The nitrogen and carbon contents of the burned product obtained were below the detection limit (0.3% by weight).

Figure 10:
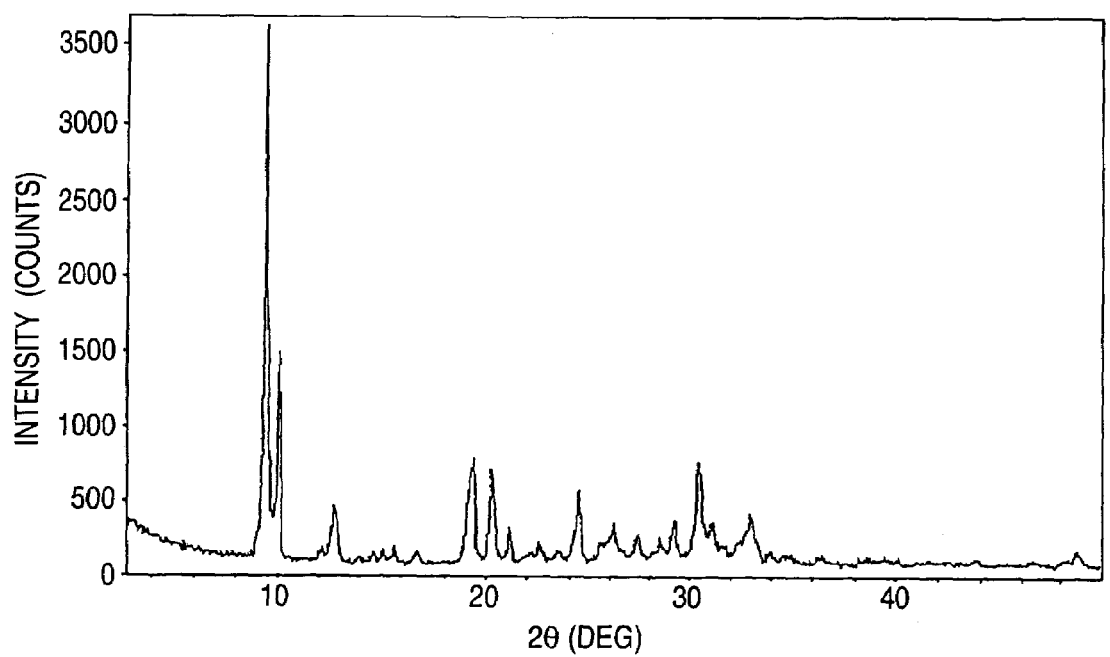
FIG. 10 is an XRD pattern for the burned product obtained in Comparative Example 1-1 which had not undergone Durability Test 1.
Figure 11:
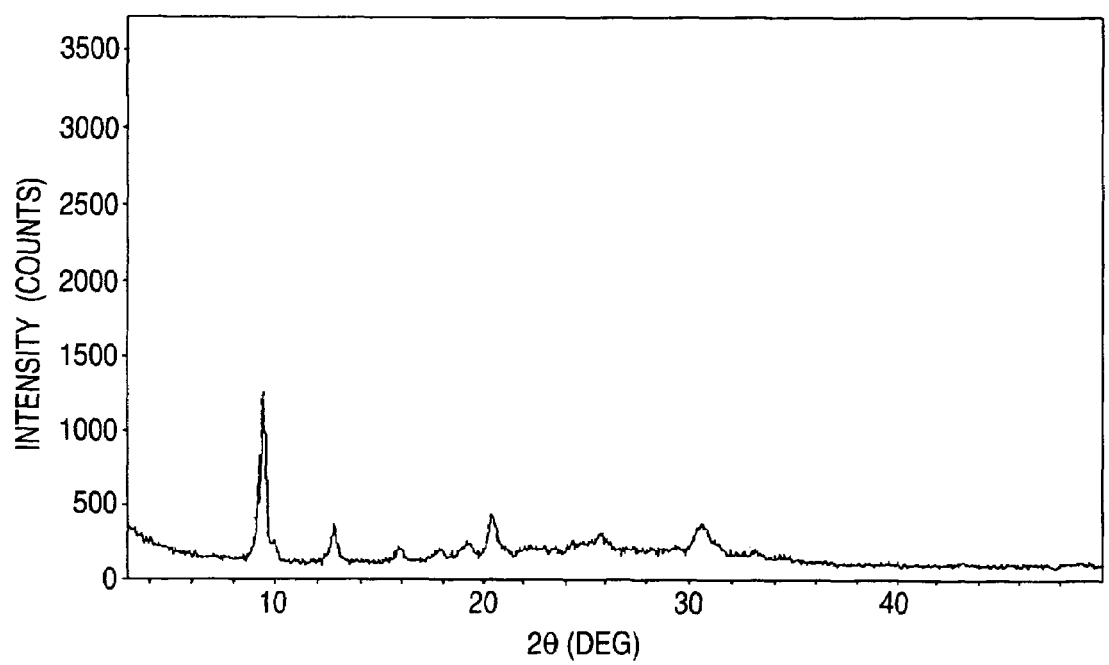
FIG. 11 is an XRD pattern for the burned product obtained in Comparative Example 1-1 which had undergone Durability Test 1.

From an XRD pattern obtained in the same manner as in Example 1-1, the burned product was found to have a pure CHA structure (FD, 14.5 T/nm$^3$). It had a water vapor adsorption (25° C.) of 30% by weight. The pore utilization factor determined using equation 3 was 1. Durability Test 1 was conducted and, as a result, the adsorption after the test had considerably decreased to 15% by weight. FIG. 10 and FIG. 11 show XRD patterns before and after Durability Test 1; a decrease in crystallinity through the test was observed. The burned product was further examined for the weight loss (g1) and weight loss (g2). The results thereof are shown in Table 1.

Comparative Example 1-2

To 26 g of water was added 11.5 g of 85% phosphoric acid. Thereto was gradually added 5.44 g of pseudoboehmite (containing 25% water; manufactured by Condea). The resultant mixture was stirred for 2 hours. Thereto was added a liquid prepared by dissolving 8.3 g of ferrous sulfate heptahydrate in 26 g of water. A liquid prepared by mixing 2.18 g of morpholine with 7.43 g of cyclohexylamine was further added thereto gradually. The resultant mixture was stirred for further 2 hours. Thus, a gel-form starting reactant material having the following composition was obtained.

0.6FeSO$_4$:0.8Al$_2$O$_3$:P$_2$O$_5$:0.5 morpholine:1.5 cyclohexylamine:60H$_2$O The starting reactant material obtained was introduced into a 0.2-L stainless-steel autoclave equipped with a Teflon (trademark) inner cylinder. The starting material was reacted at 200° C. in a stationary state for 12 hours. After the reaction, the reaction mixture was cooled and the supernatant was removed by decantation to recover the precipitate. This precipitate was washed with water three times, recovered by filtration, and then dried at 120° C. The solid obtained was burned in the same manner as in Comparative Example 1-1 to obtain a burned product which was an iron aluminophosphate.

The nitrogen and carbon contents of the burned product obtained were below the detection limit (0.3% by weight). As a result of elemental analysis, the proportion (molar ratio) of each of the components Al, P, and Fe to the sum of these was found to be as follows: Al, 36.9 mol %; P, 50 mol %; Fe, 13.1 mol %.

Figure 12:
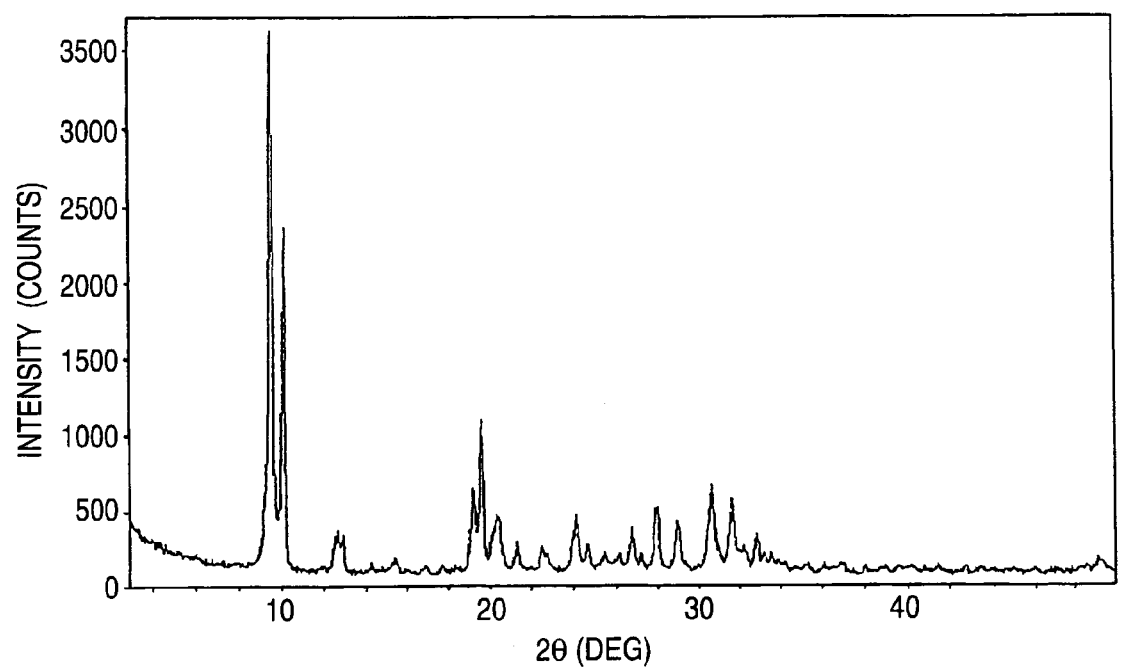
FIG. 12 is an XRD pattern for the burned product obtained in Comparative Example 1-2 which had not undergone Durability Test 1.
Figure 13:
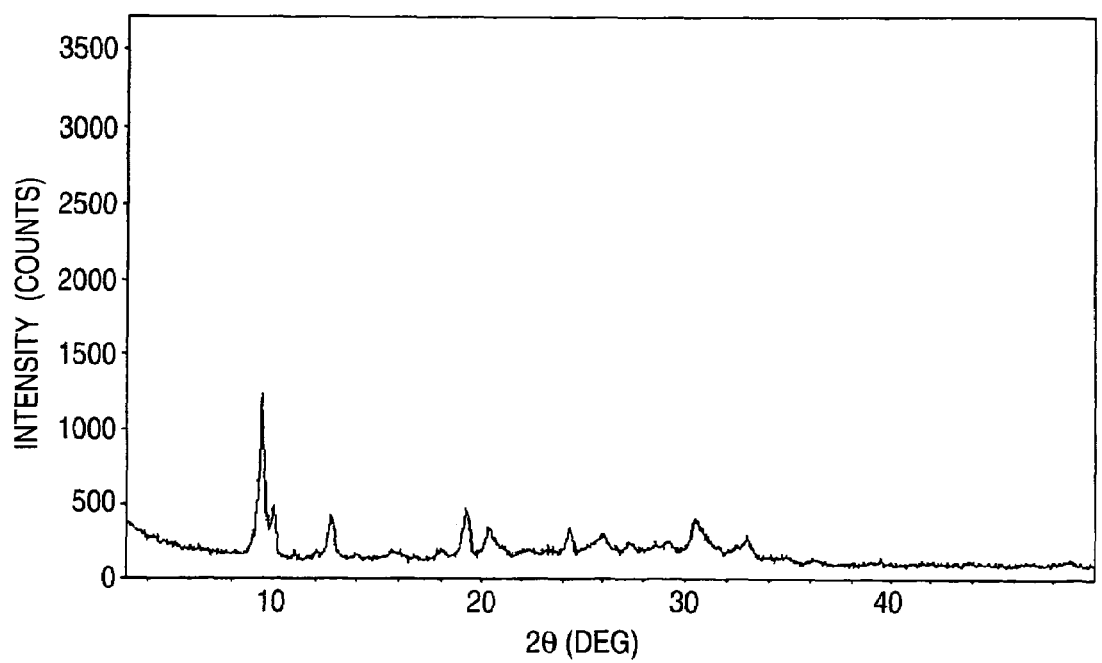
FIG. 13 is an XRD pattern for the burned product obtained in Comparative Example 1-2 which had undergone Durability Test 1.

From an XRD pattern, the burned product was found to have a pure CHA structure (FD, 14.5 T/nm$^3$). It had a water vapor adsorption (25° C.) of 30% by weight. The pore utilization factor determined using equation 3 was 1. Durability Test 1 was conducted and, as a result, the adsorption after the test had considerably decreased to 10% by weight. FIG. 12 and FIG. 13 show XRD patterns before and after the durability test; a decrease in crystallinity through the test was observed. The particles which had undergone the durability test were examined and, as a result, were found to have been completely powdered. The burned product was further examined for the weight loss (g1) and weight loss (g2). The results thereof are shown in Table 1.

Comparative Example 1-3

Hydrothermal synthesis, drying, and burning were conducted in the same manner as in Comparative Example 1-1. One gram of the solid obtained was packed into a Pyrex (trademark) tube having an inner diameter of 6 mm and treated at 300° C. for 2 hours in a helium gas stream of 500 mL/hr. The solid was allowed to cool to room temperature (25° C.) in a stream of helium. Thereafter, the gas passed was replaced by 500 mL/hr helium gas containing 10 vol % ammonia (NH$_3$), and the solid was treated therewith at room temperature (25° C.) for 2 hours. Subsequently, the gas passed was replaced by helium gas to conduct purging at room temperature (25° C.).

Figure 14:
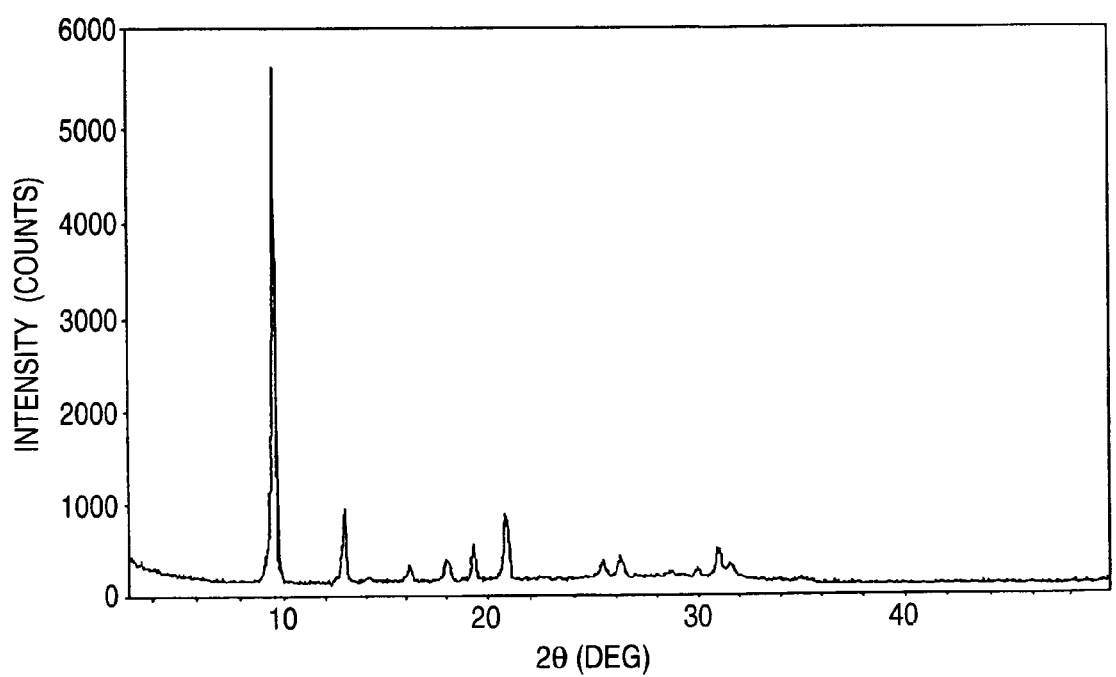
FIG. 14 is an XRD pattern for the burned product obtained in Comparative Example 1-3 which had not undergone Durability Test 2.
Figure 15:
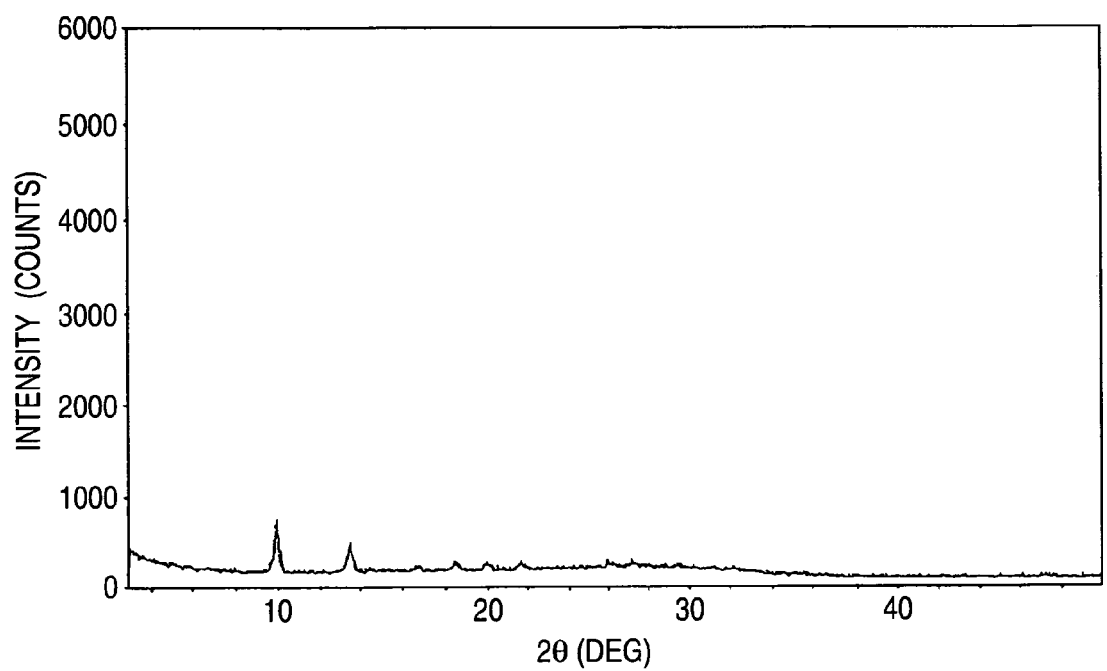
FIG. 15 is an XRD pattern for the burned product obtained in Comparative Example 1-3 which had undergone Durability Test 2.

CN analysis of the solid obtained revealed that the nitrogen content was 11.5% by weight. The carbon content was below the detection limit (0.3% by weight). After this solid was subjected to 3-hour evacuation at 80° C., it had a water vapor adsorption of 30% by weight at 25° C. and a relative vapor pressure of 0.5. The pore utilization factor determined using equation 3 was 1. FIG. 14 is an XRD pattern for the solid treated with NH$_3$, and shows that the solid had a CHA structure (FD, 14.5). FIG. 15 is an XRD pattern for the NH$_3$-treated solid which had undergone Durability Test 1; it was ascertained that the solid had become amorphous. It is apparent from these results that the pore structure of the zeolite had been almost completely destroyed and the water vapor adsorption of the zeolite had decreased considerably. The burned product was further examined for the weight loss (g1) and weight loss (g2). The results thereof are shown in Table 1.

Comparative Example 1-4

A solid was obtained in the same manner as in Example 1-1, except that the burning gas was replaced by nitrogen and the burning temperature was changed to 325° C.

CN analysis revealed that the nitrogen and carbon contents were 2.7% by weight and 10.0% by weight, respectively, showing that this solid was outside the scope of the invention. This solid had a water vapor adsorption (25° C.) of 7.1% by weight. The pore utilization factor determined using equation 3 was 0.24. It is apparent that the adsorption of this solid was poorer than the water vapor adsorption (27% by weight) of the zeolite of Example 1-1, which is within the scope of the invention. The burned product was further examined for the weight loss (g1) and weight loss (g2). The results thereof are shown in Table 1.

Comparative Example 1-5

An iron aluminophosphate having a nitrogen content lower than the lower limit of the range specified in the invention was synthesized according to the Example 11 of U.S. Pat. No. 4,554,143.

To 32 g of water was added 11.6 g of 85% phosphoric acid. Thereto was gradually added 16.4 g of aluminum isopropoxide. The resultant mixture was stirred for 3 hours. Thereto was added 5.6 g of ferrous sulfate heptahydrate. A liquid prepared by mixing 42.1 g of a 35% by weight aqueous solution of tetraethylammonium hydroxide (TEAOH) was further added thereto. The resultant mixture was stirred for further 3 hours. Thus, a gel-form starting reactant material having the following composition was obtained.

0.4FeSO$_4$:0.8Al$_2$O$_3$:P$_2$O$_5$:2.0TEAOH:68H$_2$O

The starting reactant material obtained was introduced into a 0.2-L stainless-steel autoclave equipped with a Teflon (trademark) inner cylinder. The starting material was reacted at 200° C. in a stationary state for 42 hours. After the reaction, the reaction mixture was cooled and the precipitate was recovered with a centrifugal separator. The precipitate was washed with water, recovered by filtration, and dried at 120° C. From an XRD pattern, the dried solid was found to have a CHA structure. As a result of elemental analysis, the proportion (molar ratio) of each of the components Al, P, and Fe to the sum of these was found to be as follows: Al, 44.7 mol %; P, 50 mol %; Fe, 4.3 mol %.

A portion was taken from the template-containing zeolite obtained and burned in the same manner as in Example 1-1, except that the burning temperature was changed to 450° C., the gas passed was replaced by nitrogen, and the burning time was changed to 2 hours.

XRD analysis revealed that the solid obtained through the burning had a CHA structure (FD, 14.5 T/nm$^3$). The nitrogen content of the zeolite obtained through the burning was below the detection limit (0.3% by weight) and the carbon content thereof was about 1.0% by weight, showing that this solid was outside the scope of the invention. The solid obtained had a water vapor adsorption of 20% by weight at 25° C. and a relative vapor pressure of 0.5.

The solid obtained was subjected to Durability Test 2. The water vapor adsorption of the solid after the test, as measured at 25° C. and a relative vapor pressure of 0.5, had decreased to 10% by weight, which was 50% of the adsorption value before the test. The burned product was further examined for the weight loss (g1) and weight loss (g2). The results thereof are shown in Table 1.

mark) inner cylinder. The starting material was reacted at 190° C. for 60 hours with stirring at 100 rpm. After the reaction, the reaction mixture was cooled and the supernatant was removed by decantation to recover the precipitate. This precipitate was washed with water three times, recovered by filtration, and then dried at 120° C. The solid dried (silicoaluminophosphate precursor) was subjected to elemental analysis. As a result, the proportion (molar ratio) of each of the aluminum, phosphorus, and silicon to the sum of these was found to be as follows: silicon, 7.9%; aluminum, 48.7%; phosphorus, 43.3%.

Subsequently, the solid obtained (silicoaluminophosphate precursor) was heated from room temperature (25° C.) to 350° C. at about 1° C./min in an air stream having a GHSV of about 6,000 hr$^{-1}$ and burned at 350° C. for 6 hours in the air stream to thereby obtain a burned product.

Figure 16:
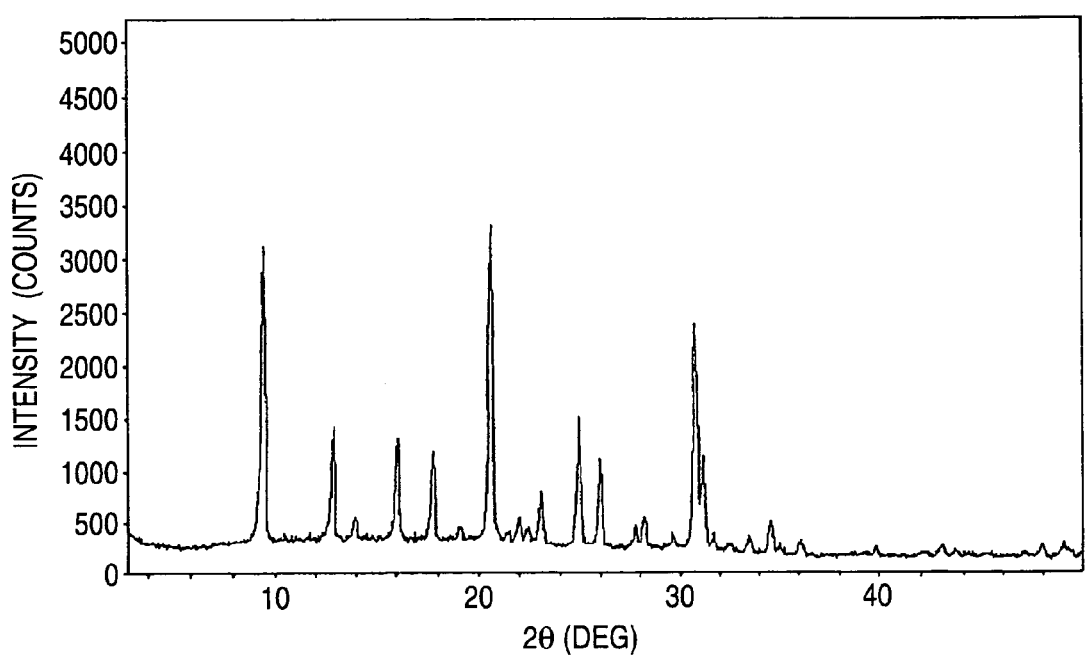
FIG. 16 is an XRD pattern for the burned product obtained in Example 2-1.

XRD analysis of the burned product gave the XRD pattern shown in FIG. 16, which indicates a CHA structure (FD, 14.5 T/nm$^3$). The pore utilization factor 2 determined using equa-

TABLE 1

|   | Weight loss (g1) wt % | Weight loss (g2) wt % | Carbon content wt % | Nitrogen content wt % | Pore utilization factor 1 | Water vapor adsorption (wt %) Before durability test | Water vapor adsorption (wt %) After durability test | XRD pattern After Durability Test 1 | Particle shape After Durability Test 1 |
|---|---|---|---|---|---|---|---|---|---|
| Example 1-1 | 0.31 | 4.84 | 2.3 | 1.1 | 0.9 | 27 | 27[a,b] | CHA structure | not reduced to powder |
| Example 1-2 | 0.33 | 6.47 | 3.1 | 1.7 | 0.9 | 27 | 27[a] | CHA structure | — |
| Example 1-3 | 0.24 | 8.68 | 5.0 | 1.7 | 0.77 | 23 | 23[a] | CHA structure | — |
| Comparative Example 1-1 | <0.1 | <0.1 | <0.3 | <0.3 | 1 | 30 | 15[a] | became amorphous | — |
| Comparative Example 1-2 | <0.1 | <0.1 | <0.3 | <0.3 | 1 | 30 | 10[a] | became amorphous | completely reduced to powder |
| Comparative Example 1-3 | 10.1 | 5.10 | <0.3 | 11.5 | 1 | 30 | — | became amorphous[a] | — |
| Comparative Example 1-4 | 6.32 | 9.94 | 10.0 | 2.7 | 0.24 | 7.1 | — | — | — |
| Comparative Example 1-5 | 0.3 | 1.5 | 1.0 | <0.3 | — | 20 | 10[b] | became amorphous | — |

(Note)
[a]Durability Test 1,
[b]Durability Test 2

Example 2-1

A carbon-containing silicoaluminophosphate was produced in the following manner.

First, 87.1 g of 85% phosphoric acid was added to 180 g of water. Thereto was gradually added 57.2 g of pseudoboehmite (containing 25% water; manufactured by Condea) The resultant mixture was stirred for 3 hours. This mixture is referred to as liquid A. Separately from liquid A, a liquid was prepared by mixing 5.04 g of fumed silica (Aerosil 200), 36.6 g of morpholine, and 240 g of water. This liquid was gradually added to liquid A. Furthermore, 47.0 g of triethylamine was added thereto and the resultant mixture was stirred for 3 hours to obtain a gel-form starting reactant material having the following composition.

0.2SiO$_2$:Al$_2$O$_3$:0.9P$_2$O$_5$:1 morpholie:1.1 triethylamine:60 H$_2$O

Figure 17:
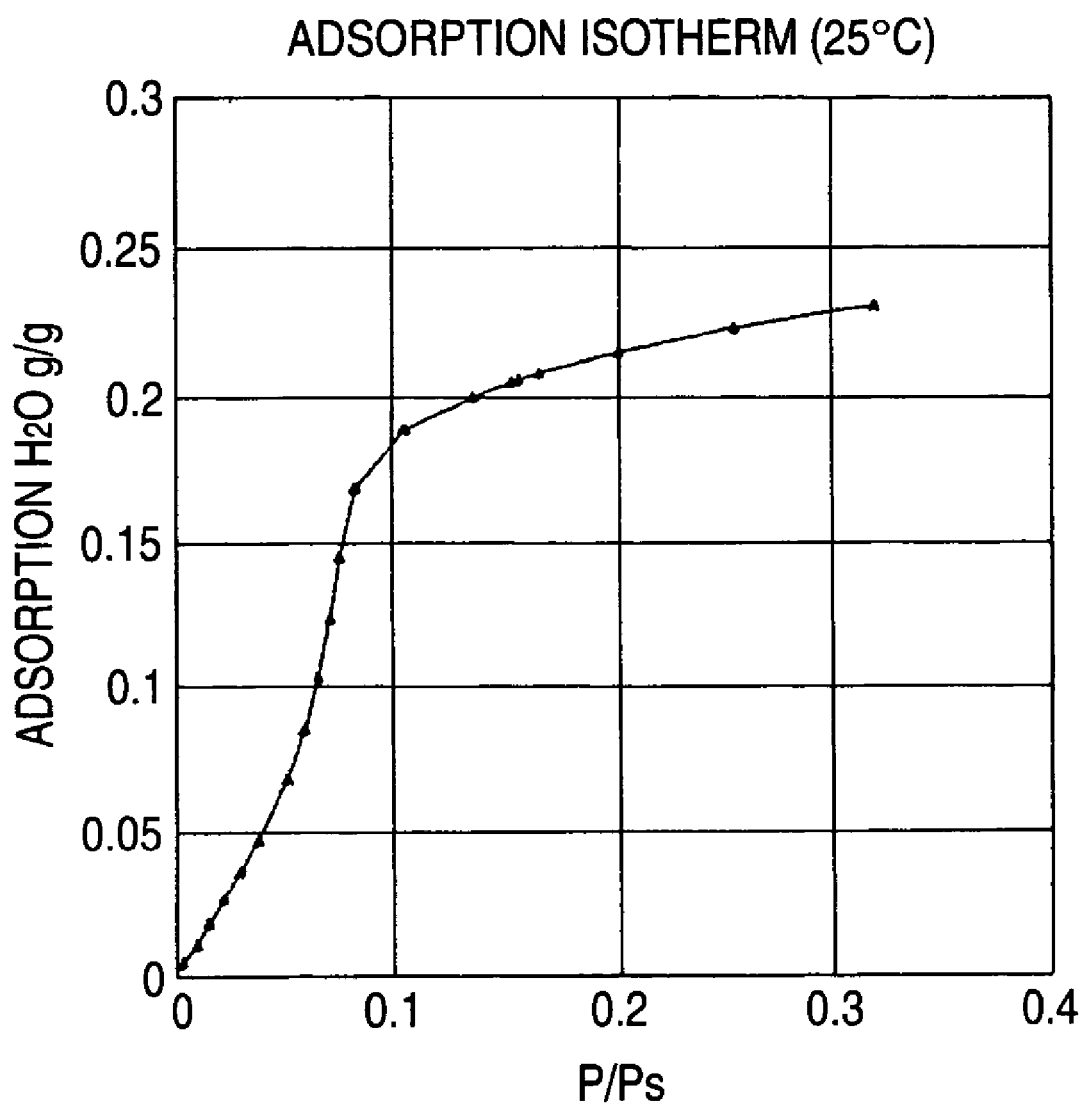
FIG. 17 is a water vapor adsorption isotherm at 25° C. of the burned product obtained in Example 2-1.

The starting reactant material obtained was introduced into a 1-L stainless-steel autoclave equipped with a Teflon (tradetion 4 given hereinabove was 0.89. As a result of an adsorptive property (25° C.) examination of the burned product, the adsorption isotherm shown in FIG. 17 was obtained. It was ascertained through CN analysis of the burned product that it contained 3.5% by weight carbon and 1.0% by weight nitrogen. The burned product was found to have an effective water adsorption of 20.4% by weight.

Figure 18:
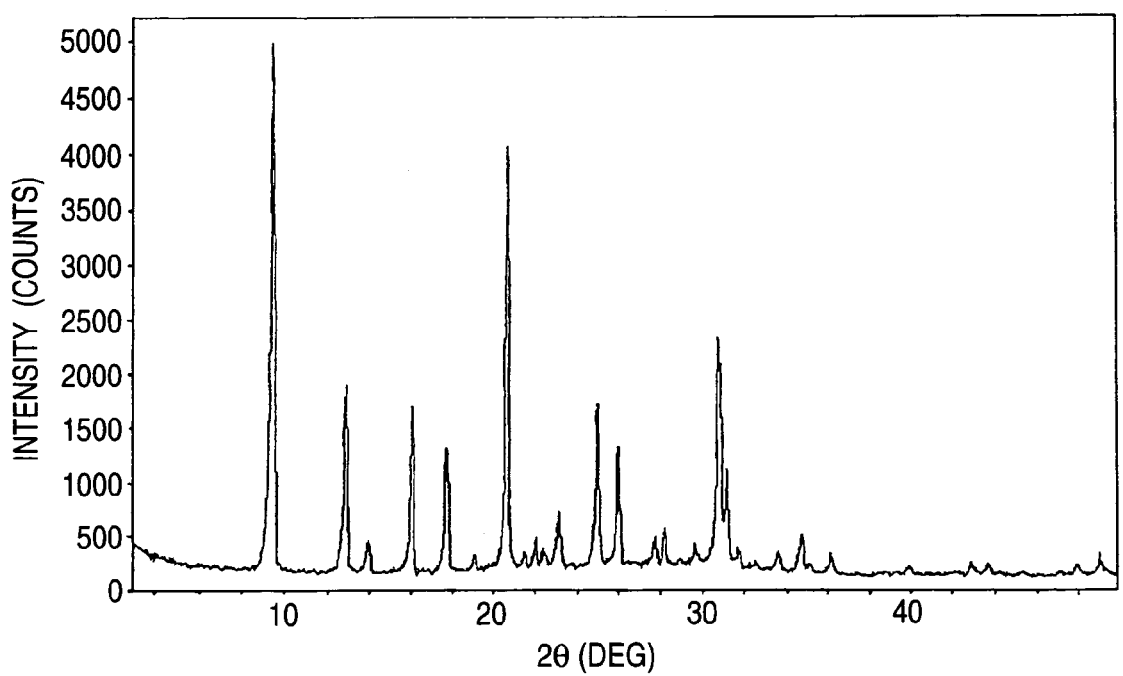
FIG. 18 is an XRD pattern for the burned product obtained in Example 2-1 which had undergone Durability Test 3.

After Durability Test 3, XRD analysis of the burned product gave the XRD pattern shown in FIG. 18, which indicates a CHA structure. The burned product after Durability Test 3 had an effective water adsorption of 18.4% by weight. The burned product was further examined for the weight loss (g1) and weight loss (g2). The results thereof are shown in Table 2. Furthermore, the burned product was subjected to Durability Test 2 and, as a result, sufficient durability was ascertained.

This burned product showed sufficient durability even in Durability Test 2 in which the number of cycle repetitions was increased to several thousands.

This burned product, when applied to an adsorption heat pump or a moisture regulation system, has durability in adsorption/desorption repeatedly conducted several hundreds of thousands of times.

Example 2-2

A carbon-containing iron silicoaluminophosphate was produced in the following manner.

First, 11.5 g of 85% phosphoric acid was added to 28.05 g of water. Thereto was gradually added 6.26 g of pseudoboehmite (containing 25% water; manufactured by Condea) The resultant mixture was stirred for 3 hours. To this mixture was added a liquid prepared by dissolving 2.78 g of ferrous sulfate heptahydrate in 29 g of water and adding 1.2 g of fumed silica (Aerosil 200) thereto. Furthermore, a liquid prepared by mixing 4.35 g morpholine with 5.64 g of triethylamine was gradually added thereto, and the resultant mixture was stirred for further 3 hours. Thus, a gel-form starting reactant mixture having the following composition was obtained.

$0.2FeSO_4:0.4SiO_2:0.92Al_2O_3: P_2O_5:1.0$ morpholine:1.0 triethylamine:60$H_2O$ The starting reactant material obtained was introduced into a 0.2-L stainless-steel autoclave equipped with a Teflon (trademark) inner cylinder. The starting material was reacted at 180° C. in a stationary state for 1 day. After the reaction, the reaction mixture was cooled and the supernatant was removed by decantation to recover the precipitate. This precipitate was washed with water three times, recovered by filtration, and then dried at 120° C. The solid dried (iron silicoaluminophosphate precursor) was subjected to elemental analysis. As a result, the proportion (molar ratio) of each of the aluminum, phosphorus, iron, and silicon to the sum of these was found to be as follows: Al, 43.9 mol %; P, 40.3 mol %; Fe, 6.1 mol %; Si, 9.7 mol %.

Figure 19:
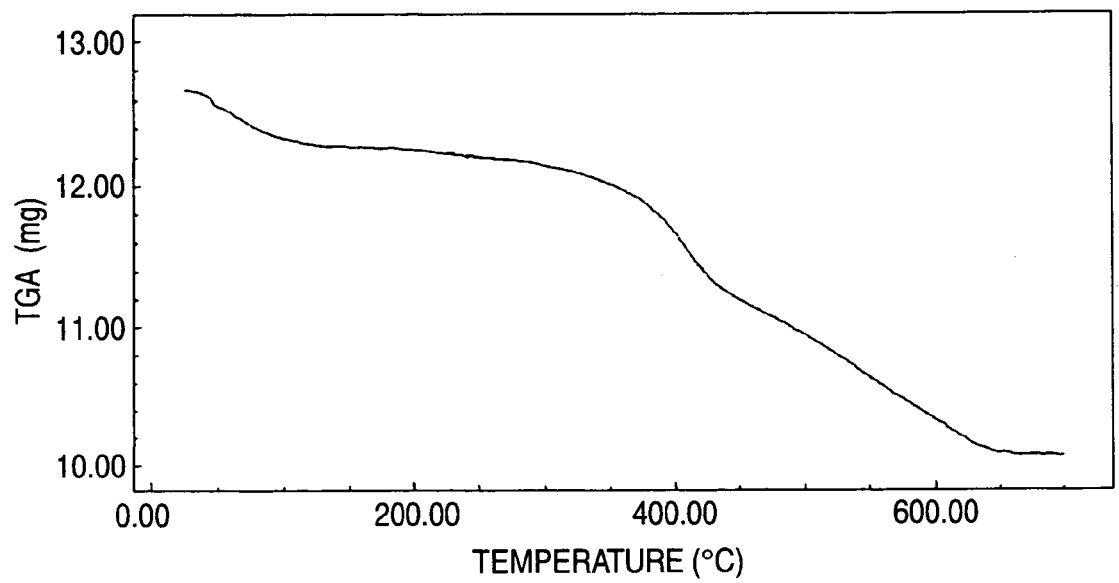
FIG. 19 shows the results of thermogravimetric analysis of the iron aluminophosphate precursor obtained in Example 2-2.

A portion (12.7 mg) of the solid dried was subjected to thermogravimetric analysis. In the thermogravimetric analysis, a thermogravimetric analyzer (TGA-50, manufactured by Shimadzu Corp.) was used to heat the solid from room temperature (25° C.) to 700° C. at 10° C./min while passing helium-diluted air (oxygen concentration, 7 vol %) at 30 mL/min. The results thereof are shown in FIG. 19.

Subsequently, while nitrogen-diluted air having an oxygen concentration of 7% was being passed at a GHSV of about 6,000 $hr^{-1}$, the solid obtained (iron silicoaluminophosphate precursor) was heated from room temperature (25° C.) to 420° C. at about 0.5° C./min and burned at 420° C. (this temperature is a temperature around the decomposition temperature determined by thermogravimetric analysis as shown in FIG. 19) for 6 hours to obtain a burned product.

Figure 20:
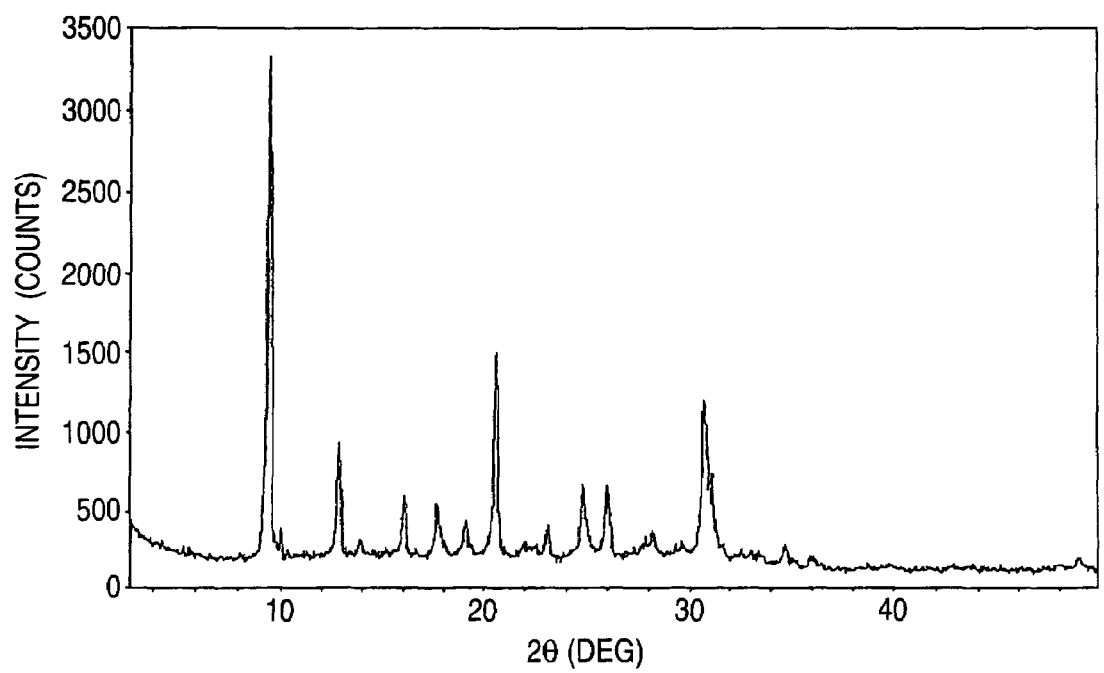
FIG. 20 is an XRD pattern for the burned product obtained in Example 2-2.
Figure 21:
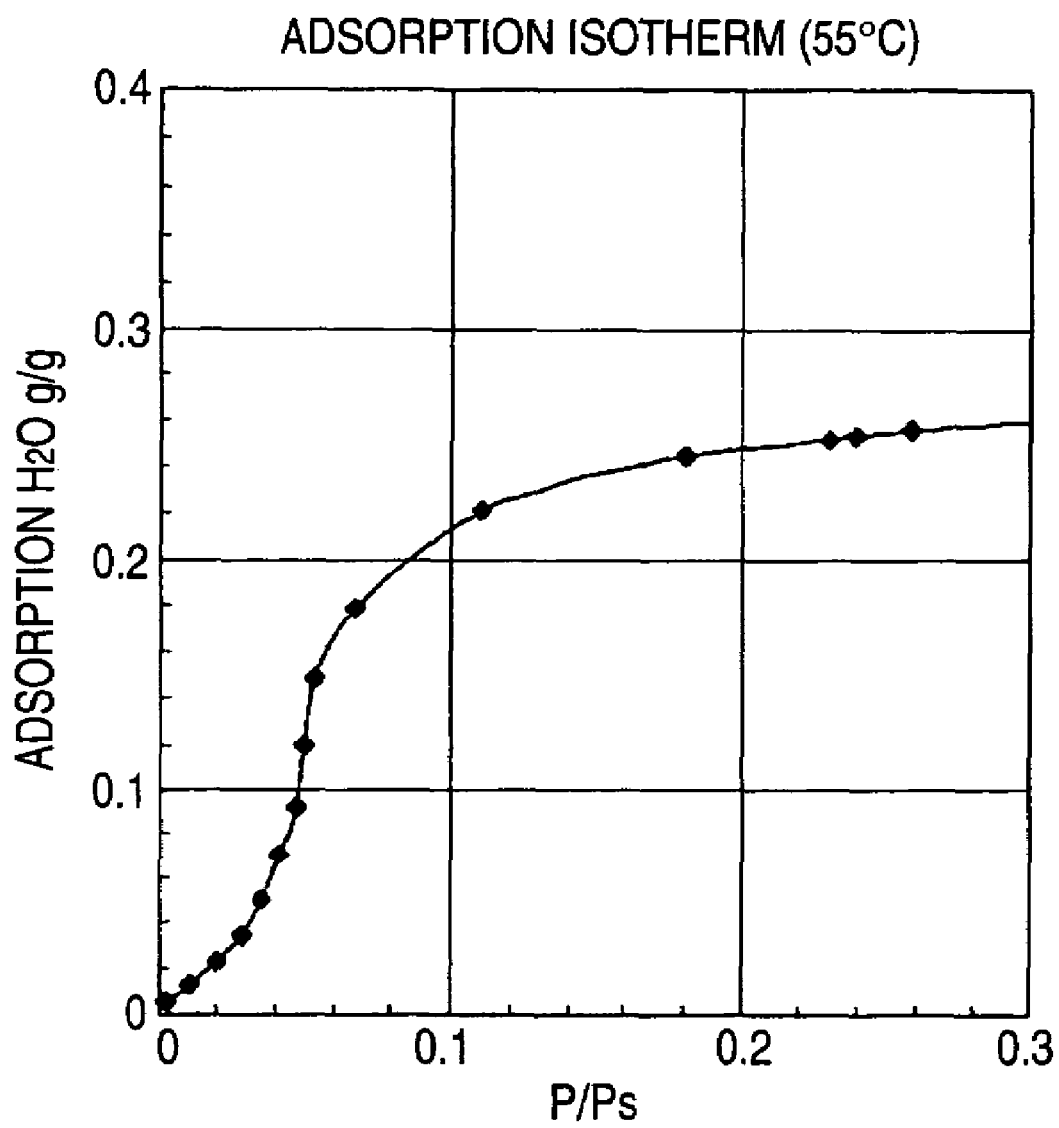
FIG. 21 is a water vapor adsorption isotherm at 55° C. of the burned product obtained in Example 2-2.
Figure 22:
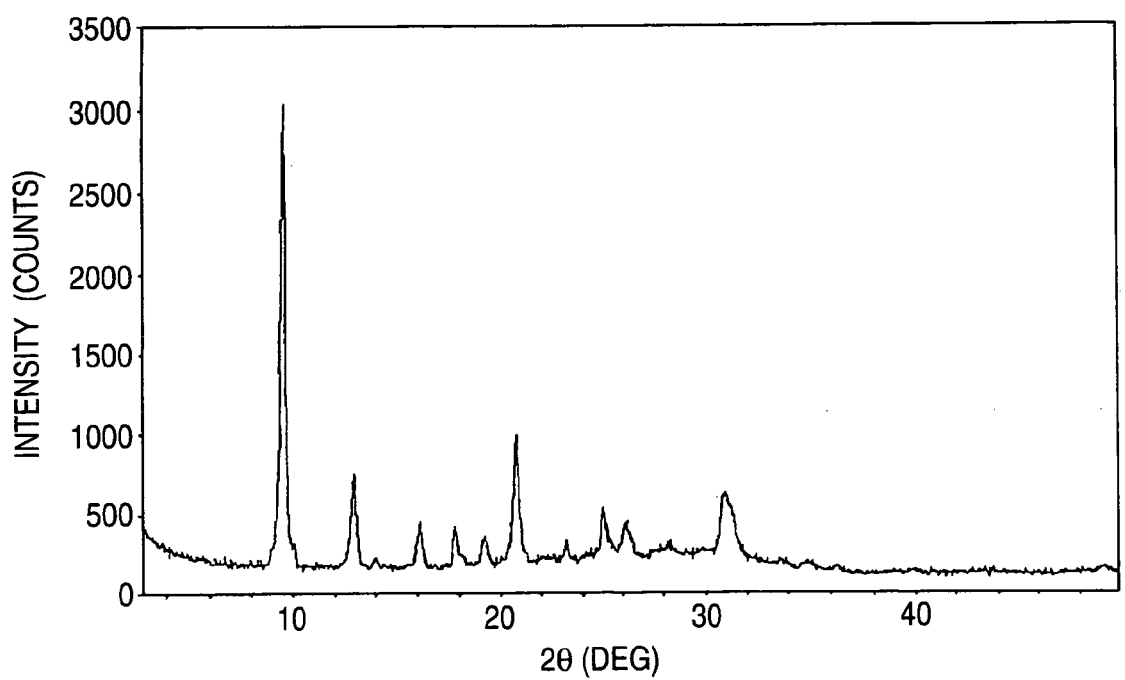
FIG. 22 is an XRD pattern for the burned product obtained in Example 2-2 which had undergone Durability Test 3.

XRD analysis of the burned product gave the XRD pattern shown in FIG. 20, which indicates a CHA structure (FD, 14.5 T/$nm^3$). The pore utilization factor 1 determined using equation 3 given hereinabove was 0.77, and the pore utilization factor 2 determined using equation 4 was 0.91. As a result of an adsorptive property (55° C.) examination of the burned product, the adsorption isotherm shown in FIG. 21 was obtained. It was ascertained through CN analysis of the burned product that it contained 3.2% by weight carbon and 1.1% by weight nitrogen. The burned product was found to have an effective water adsorption of 16.7% by weight. After Durability Test 3, XRD analysis of the burned product gave the XRD pattern shown in FIG. 22, which indicates a CHA structure. The burned product after Durability Test 3 had an effective water adsorption of 15.5% by weight. The burned product was further examined for the weight loss (g1) and weight loss (g2). The results thereof are shown in Table 2.

Example 2-3

Burning was conducted in the same manner as in Example 2-2, except that the burning gas was replaced by nitrogen and the burning temperature was changed to 450° C. Thus, a carbon-containing iron silicoaluminophosphate was obtained.

Figure 23:
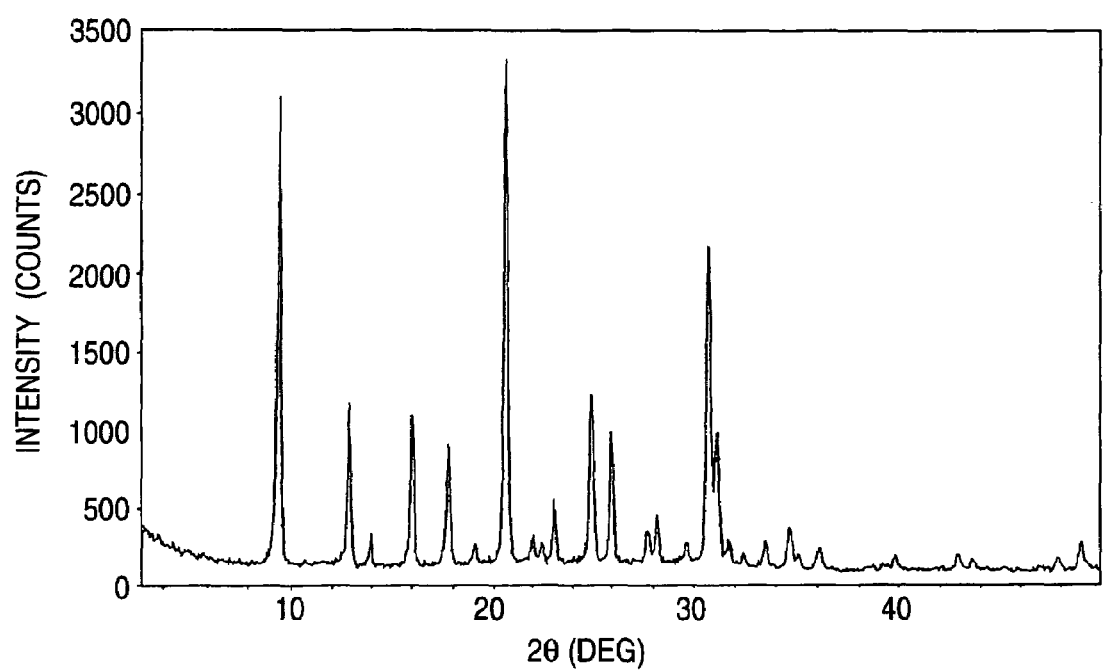
FIG. 23 is an XRD pattern for the burned product obtained in Example 2-3.
Figure 24:
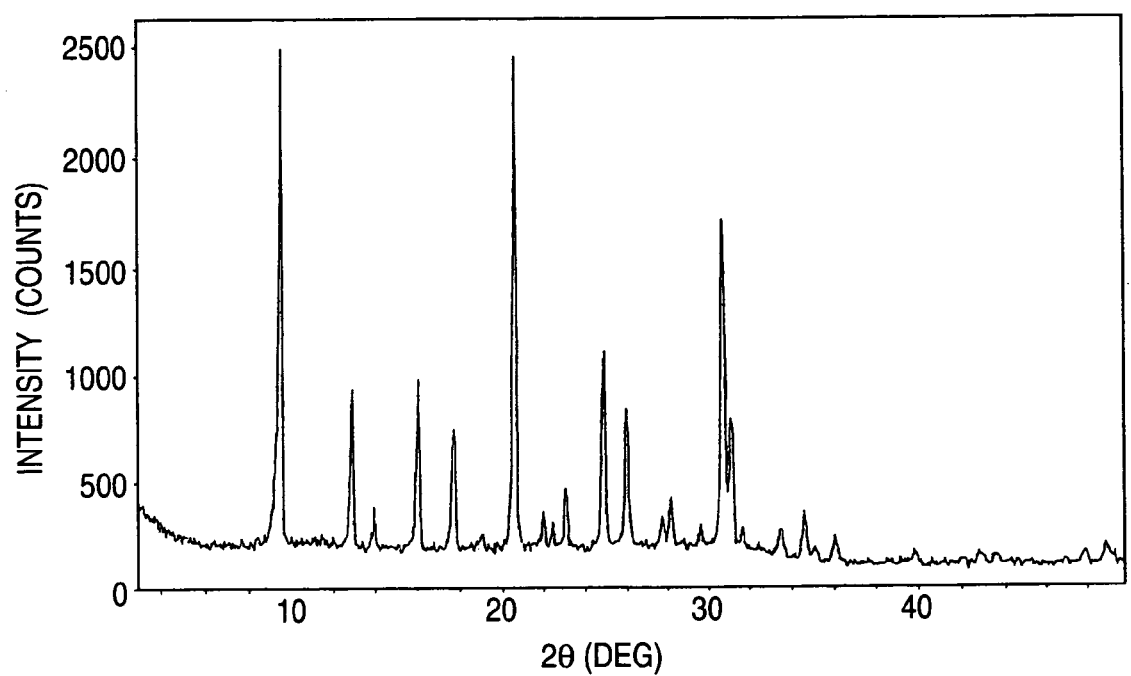
FIG. 24 is an XRD pattern for the burned product obtained in Example 2-3 which had undergone Durability Test 3.
Figure 25:
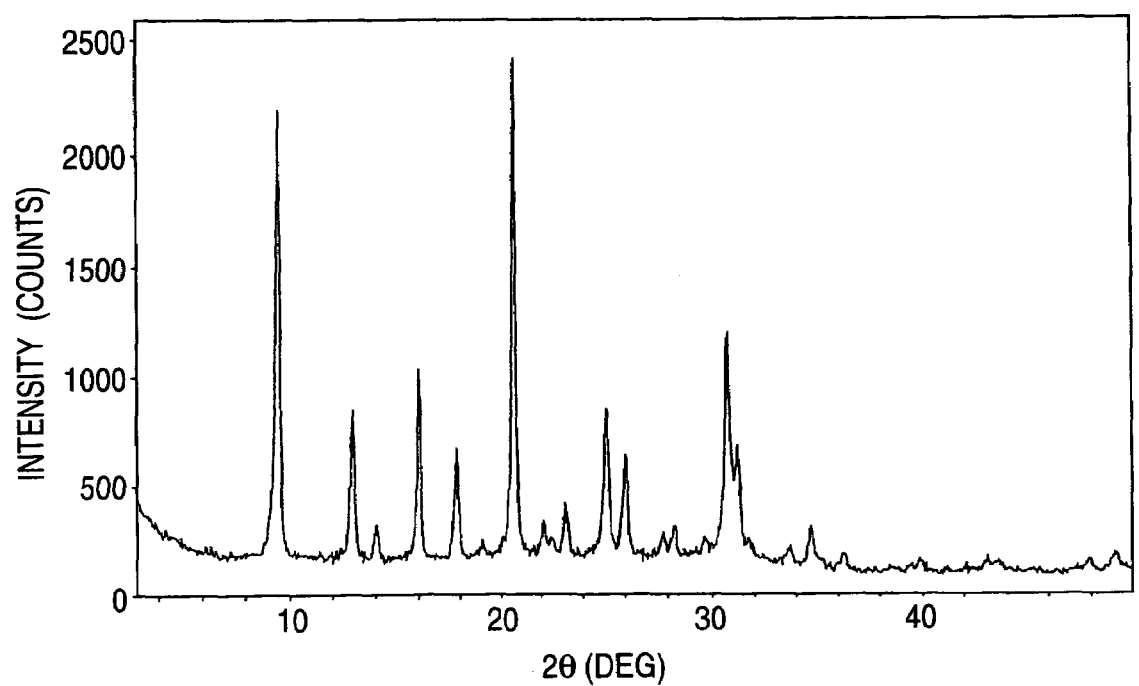
FIG. 25 is an XRD pattern for the burned product obtained in Example 2-3 which had undergone Durability Test 2.

XRD analysis of the burned product gave the XRD pattern shown in FIG. 23, which indicates a CHA structure (FD, 14.5 T/$nm^3$). The pore utilization factor 2 determined using equation 4 was 0.85. It was ascertained through CN analysis of the burned product that it contained 5.0% by weight carbon. However, the nitrogen content thereof was below the detection limit (0.3% by weight). The burned product was found to have an effective water adsorption of 15.7% by weight. After Durability Test 3, XRD analysis of the burned product gave the XRD pattern shown in FIG. 24, which indicates a CHA structure. The burned product after Durability Test 3 had an effective water adsorption of 15.7% by weight. After Durability Test 2, XRD analysis of the burned product gave the XRD pattern shown in FIG. 25, which indicates a CHA structure. The burned product was further examined for the weight loss (g1) and weight loss (g2). The results thereof are shown in Table 2.

Comparative Example 2-1

A solid obtained through hydrothermal synthesis and drying in the same manner as in Example 2-1 was burned in an air stream in the same manner as in Example 2-1, except that the burning temperature was changed to 550° C. Thus, a silicoaluminophosphate containing no carbon was obtained.

Figure 26:
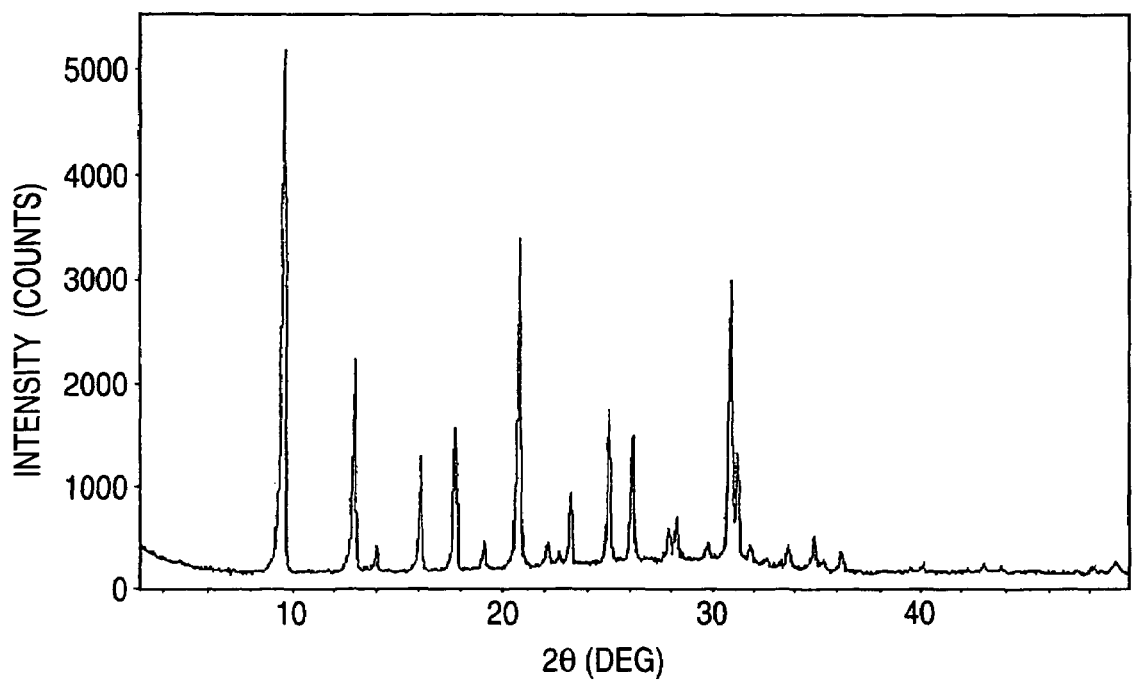
FIG. 26 is an XRD pattern for the burned product obtained in Comparative Example 2-1.
Figure 27:
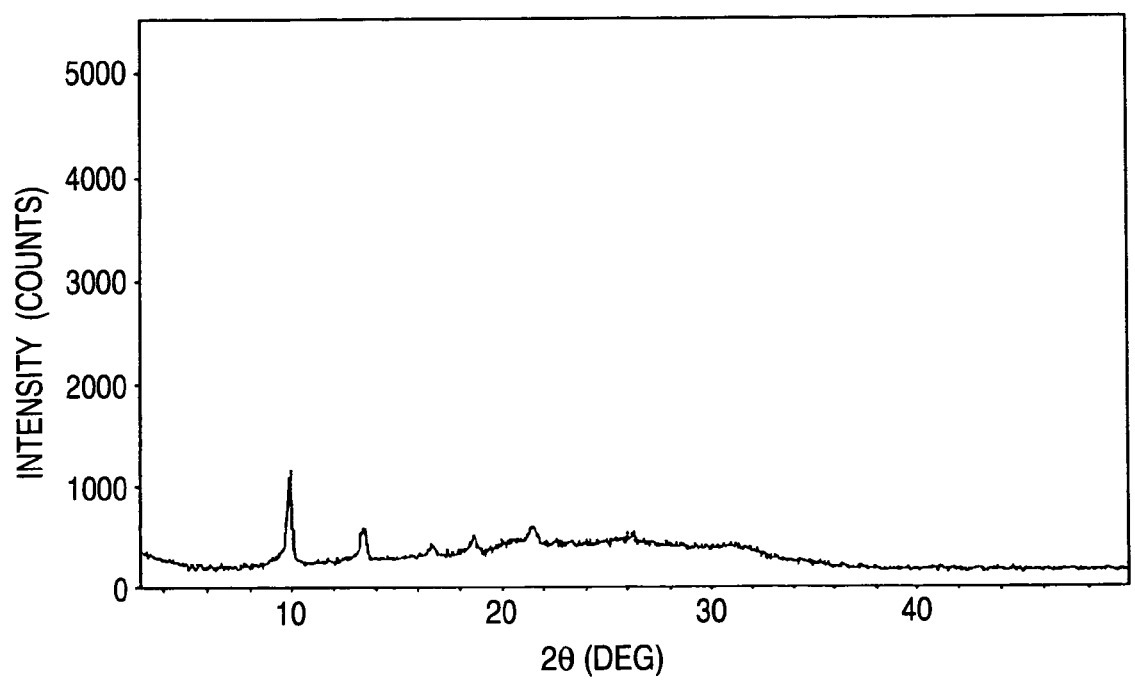
FIG. 27 is an XRD pattern for the burned product obtained in Comparative Example 2-1 which had undergone Durability Test 3.

XRD analysis of the burned product gave the XRD pattern shown in FIG. 26, which indicates a CHA structure (FD, 14.5 T/$nm^3$). The pore utilization factors 1 and 2 determined using equations 3 and 4 each were 1. CN analysis of the burned product revealed that the carbon content and nitrogen content thereof each were below the detection limit (0.3% by weight). The burned product was found to have an effective water adsorption of 22.8% by weight. After Durability Test 3, XRD analysis of the burned product gave the XRD pattern shown in FIG. 27, which indicates an amorphous state. It is thought from these results that the pore structure of the burned product had been destroyed and the adsorption capacity thereof had decreased considerably. The burned product was further examined for the weight loss (g2) and weight loss (g2). The results thereof are shown in Table 2.

Comparative Example 2-2

A solid obtained through hydrothermal synthesis and drying in the same manner as in Example 2-2 was burned in a nitrogen-diluted air stream (oxygen concentration, 7 vol %; GHSV, about 6,000 $hr^{-1}$) in the same manner as in Example 2-2, except that the burning temperature was changed to 550° C. Thus, an iron silicoaluminophosphate containing no carbon was obtained.

Figure 28:
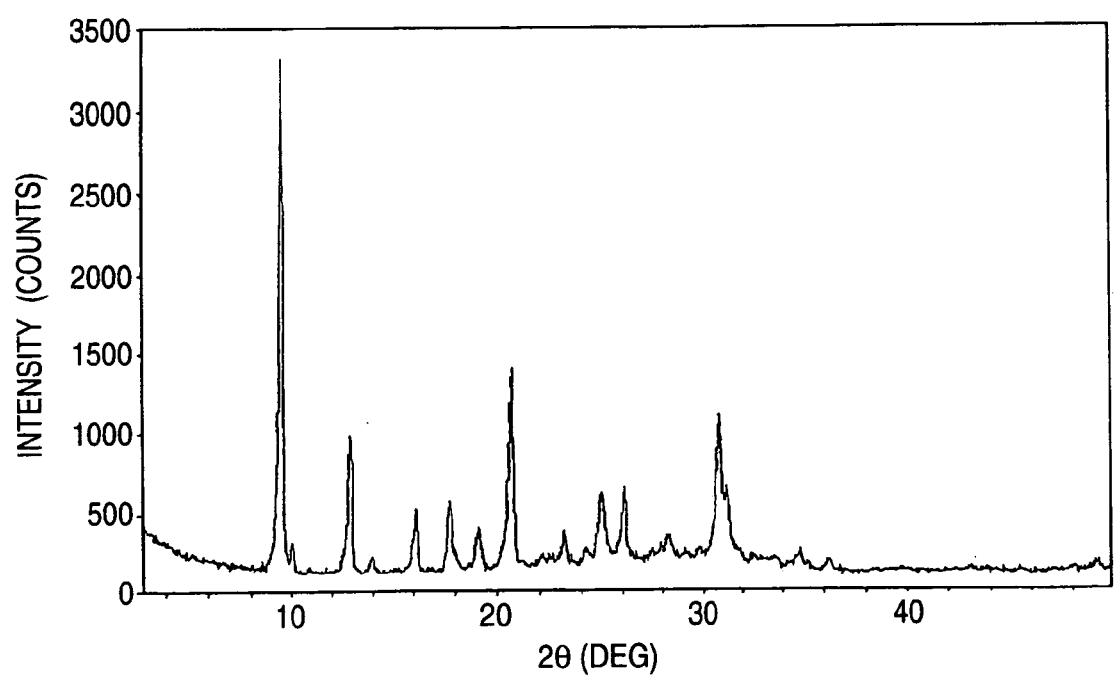
FIG. 28 is an XRD pattern for the burned product obtained in Comparative Example 2-2.
Figure 29:
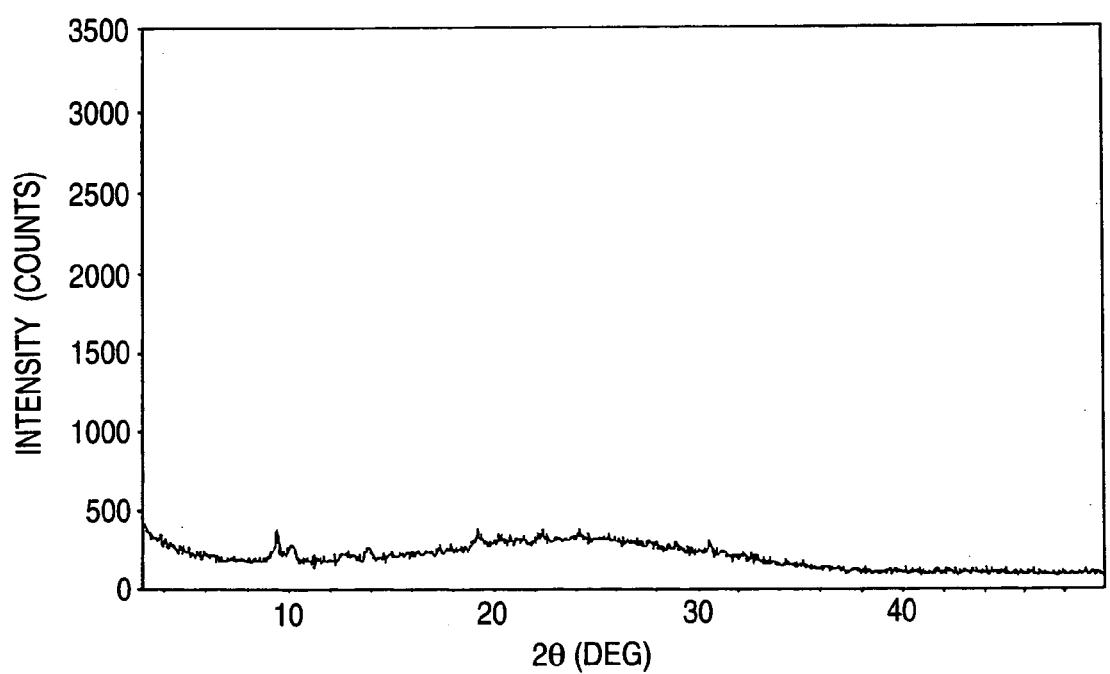
FIG. 29 is an XRD pattern for the burned product obtained in Comparative Example 2-2 which had undergone Durability Test 3.
Figure 30:
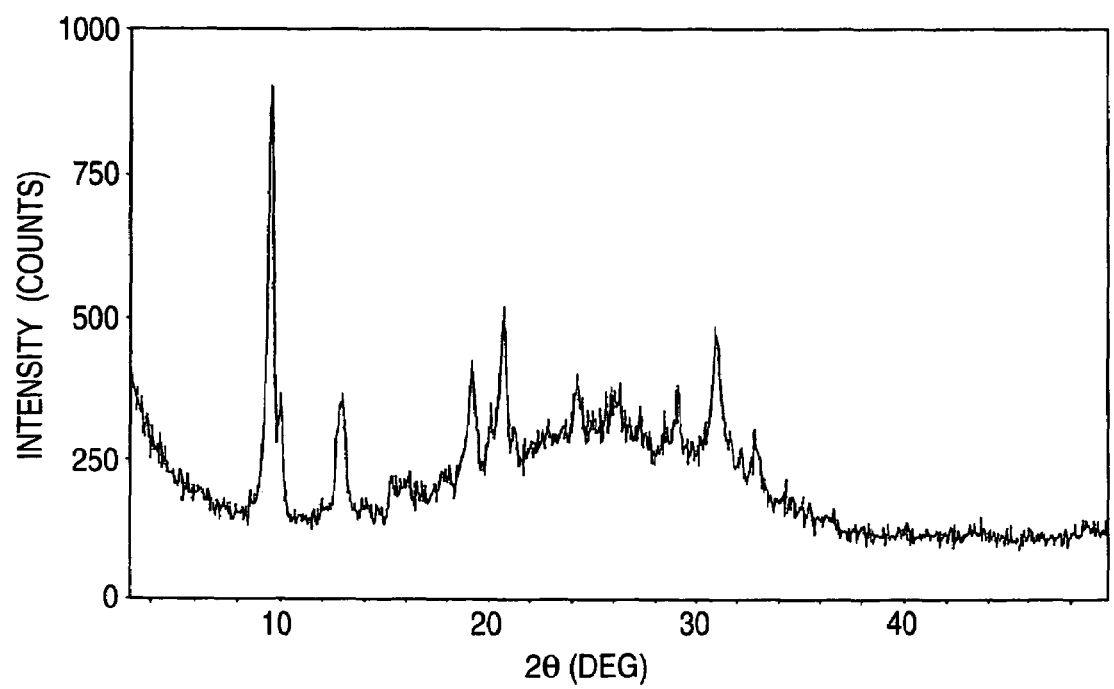
FIG. 30 is an XRD pattern for the burned product obtained in Comparative Example 2-2 which had undergone Durability Test 2.

XRD analysis of the burned product gave the XRD pattern shown in FIG. 28, which indicates a CHA structure (FD, 14.5 T/$nm^3$). The pore utilization factors 1 and 2 determined using equations 3 and 4 each were 1. CN analysis of the burned product revealed that the carbon content and nitrogen content thereof each were below the detection limit (0.3% by weight). The burned product was found to have an effective water adsorption of 18.3% by weight. After Durability Test 3, XRD analysis of the burned product gave the XRD pattern shown in FIG. 29, which indicates an amorphous state. After Durability Test 3, the burned product had an effective water adsorption of 6.8% by weight. After Durability Test 2, XRD analysis of the burned product gave the XRD pattern shown in FIG. 30, which indicates an amorphous state. It is thought from these results that the pore structure of the burned product had been destroyed and the adsorption capacity thereof had decreased considerably. The burned product was further examined for the weight loss (g1) and weight loss (g2). The results thereof are shown in Table 2.

Comparative Example 2-3

A solid obtained through hydrothermal synthesis and drying in the same manner as in Example 2-2 was burned in the same manner as in Example 2-2, except that the burning was conducted in a nitrogen stream at a temperature of 325° C. Thus, an iron silicoaluminophosphate containing carbon in an amount exceeding the upper limit of the range specified in the invention was obtained.

As a result of XRD analysis of the burned product, this product was ascertained to have a CHA structure (FD, 14.5 T/nm$^3$) The pore utilization factor 2 determined using equation 4 was 0.57. It was ascertained through CN analysis of the burned product that it contained 8.9% by weight carbon and 1.9% by weight nitrogen. The burned product was found to have an effective water adsorption of 10.5% by weight. The burned product was further examined for the weight loss (g1) and weight loss (g2). The results thereof are shown in Table 2. It is apparent from those results that the presence of carbon in an amount exceeding the upper limit of the range specified in the invention results in a small adsorption.

Comparative Example 2-4

A precursor of SAPO-34 was burned according to the Example 5 of U.S. Pat. No. 6,395,674 to obtain SAPO-34.

Namely, 15.4 g of 85% phosphoric acid and 9.2 g of pseudoboehmite (containing 25% by weight water) were gradually added to 18 g of water. The resultant mixture was stirred. Ten grams of water was further added thereto and this mixture was stirred for 1 hour. This mixture is referred to as liquid A. Separately from liquid A, a liquid was prepared by mixing 4.1 g of fumed silica (Aerosol 200), 11.6 g of morpholine, and 15 g of water. This liquid was gradually added to liquid A. Thereto was further added 24 g of water. The resultant mixture was stirred for 3 hours. The mixture obtained was introduced into a 200-mL stainless-steel autoclave equipped with a Teflon inner cylinder. The mixture was reacted at 200° C. for 24 hours. After the reaction, the reaction mixture was cooled and the supernatant was removed by decantation to recover the precipitate. The precipitate obtained was washed with water three times, recovered by filtration, and then dried at 120° C. for 12 hours. Through X-ray powder diffractometry, the solid obtained was ascertained to have a pure CHA structure (FD, 14.5 T/nm$^3$). This solid was burned in a helium stream at 450° C. for 1 hour in the manner described in the Example 5 of U.S. Pat. No. 6,395,674. Thus, SAPO-34 was obtained which had a carbon content of 8.5% by weight. The burned product was further examined for the weight loss (g1) and weight loss (g2). The results thereof are shown in Table 2.

Comparative Example 2-5

The SAPO-34 described in the Example 5 of U.S. Pat. No. 6,395,674 was obtained in the same manner as in Comparative Example 2-4, except that the temperature for the burning in a helium stream was changed to 625° C. The burned product was examined for the weight loss (g1) and weight loss (g2). The results thereof are shown in Table 2.

Comparative Example 2-6

A silicoaluminophosphate was synthesized according to the statement in R. T. Yang et al., *Langmuir*, 2003, 19, 2193-2200, which was cited hereinabove.

Namely, 5 g of 85% phosphoric acid was added to 52 g of water. Thereto was gradually added 8.9 g of aluminum isopropoxide with stirring. This mixture was stirred for 3 hours. Thereto was added 4.55 g of colloidal silica (LUDOX-AS; 40 wt % SiO$_2$). Furthermore, 25.6 g of isopropylamine was added drop wise thereto with stirring to obtain a starting mixture having the following composition.

$Al_2O_3:P_2O_5:0.7SiO_2:10i\text{-}PrNH_2:50H_2O$

The starting mixture thus obtained was introduced into a stainless-steel autoclave having a capacity of 150 mL and equipped with a Teflon inner cylinder. The mixture was reacted at 160° C. for 120 hours. After the reaction, the reaction mixture was cooled to room temperature. The precipitate was separated by decantation and the product was recovered after filtration and washing with water.

Figure 31:
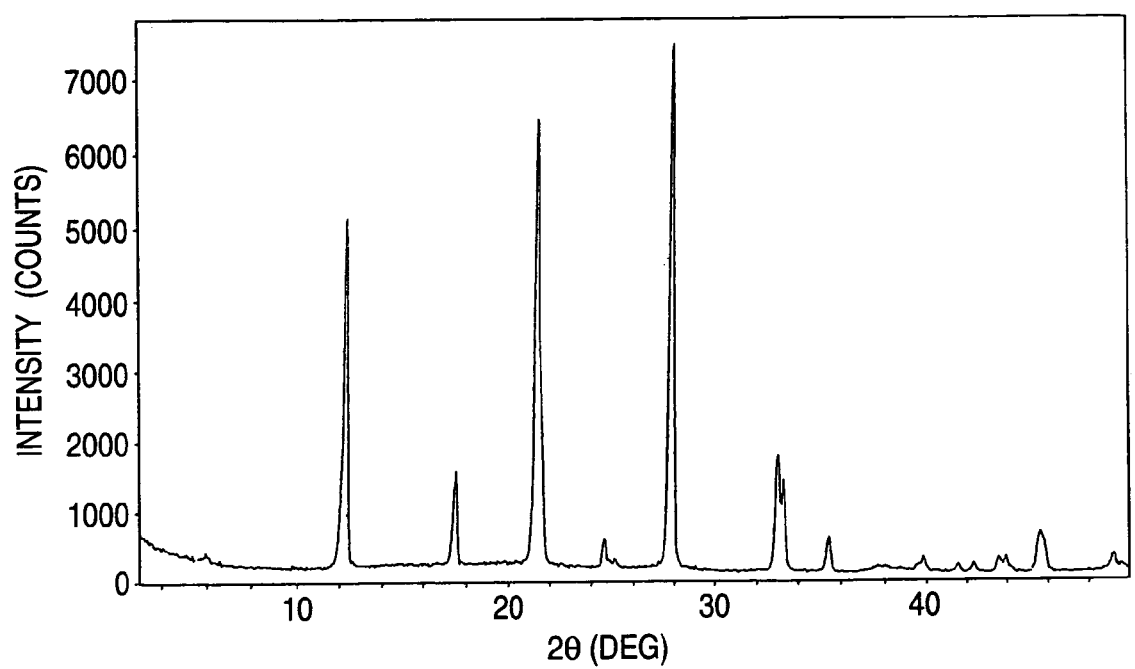
FIG. 31 is an XRD pattern for the product of hydrothermal synthesis obtained in Comparative Example 2-6.

The product obtained was subjected to X-ray powder diffractometry. As a result, a pure GIS structure (FD, 15.3 T/nm$^3$) was ascertained. The results thereof are shown in FIG. 31.

The product obtained was burned under the conditions shown in the Table 2 given in that document, and then subjected to thermogravimetric analysis. Namely, using a thermogravimetric analyzer (TGA-50, manufactured by Shimadzu Corp.), about 10 mg of the product obtained was heated to 325° C. at 5° C./min in a helium stream (30 cc/min), treated at 325° C. for 1 hour, and then cooled to room temperature. Thereafter, the helium stream was replaced by an air stream (30 cc/min) and the burned product was heated to 700° C. at 10° C./min to conduct thermogravimetric analysis thereof. The results obtained are shown in Table 2.

Comparative Example 2-7

According to the conditions shown in the Table 2 given in that document, burning in a helium stream was conducted in the same manner as in Comparative Example 2-6, except that the rate of heating in the helium stream was changed to 40° C./min. The burned product obtained was subjected to thermogravimetric analysis in an air stream. The results thereof are shown in Table 2.

Comparative Example 2-8

First, 16.1 g of 85% phosphoric acid and 9.52 g of pseudoboehmite (containing 25% water; manufactured by Condea) were gradually added to 30 g of water. The resultant mixture was stirred. This mixture is referred to as liquid B. Separately from liquid B, a liquid was prepared by mixing 2.52 g of fumed silica (Aerosol 200), 6.1 g of morpholine, 7.1 g of triethylamine, and 40 g of water. This liquid was gradually added to liquid B and the resultant mixture was stirred for 3 hours to obtain a starting reactant material having the following composition.

$0.6SiO_2:Al_2O_3:1P_2O_5:1$ morpholie:1 triethylamine: $60H_2O$

The starting reactant material obtained was introduced into a 200-cc stainless-steel autoclave equipped with a Teflon (trademark) inner cylinder. The starting material was reacted at 190° C. for 24 hours with rotation and then reacted at an elevated temperature of 200° C. for 24 hours. After the reaction, the reaction mixture was cooled and the supernatant was removed by decantation to recover the precipitate. This precipitate was washed with water three times, recovered by filtration, and then dried at 120° C. The solid dried (silicoaluminophosphate precursor) was subjected to elemental analysis. As a result, the proportion (molar ratio) of each of the aluminum, phosphorus, and silicon to the sum of these was found to be as follows: silicon, 11.6%; aluminum, 49.0%; phosphorus, 39.4%.

Subsequently, the solid obtained (silicoaluminophosphate precursor) was burned in the same manner as in Example 2-1, except that nitrogen was used as a burning gas and the burning temperature was changed to 450° C.

Through XRD analysis of the burned product, this product was ascertained to have a CHA structure (FD, 14.5 T/nm$^3$). The pore utilization factor 1 determined using equation 3 was 0.83, and the pore utilization factor 2 determined using equation 4 was 0.77. It was ascertained through CN analysis of the burned product that it contained 7.5% by weight carbon and 0.6% by weight nitrogen. The burned product was found to have an effective water adsorption of 14.0% by weight. From XRD analysis of the burned product conducted after Durability Test 3, the product was ascertained to have a CHA structure. The burned product after Durability Test 3 had an effective water adsorption of 12.0% by weight. The burned product was further examined for the weight loss (g1) and weight loss (g2). The results thereof are shown in Table 2.

Comparative Example 2-9

A silicoaluminophosphate having an AFI structure was synthesized according to U.S. Pat. No. 4,440,871.

Namely, 7.69 g of 85% by weight phosphoric acid was mixed with 33.29 g of water. Thereto was added 4.58 g of pseudoboehmite. The ingredients were mixed together until the mixture became homogeneous, and the stirring was continued for 3 hours. To this mixture was added 1.08 g of 37% by weight HCl, followed by 2.16 g of fumed silica (Aerosol 200). The ingredients were mixed together until the mixture became homogenous. Finally, 18.6 g of a 35% by weight aqueous solution of tetraethylammonium hydroxide (TEAOH) was added and the resultant mixture was stirred until it became homogeneous. A portion of this reaction mixture was placed in a stainless-steel autoclave lined with Teflon. The autoclave was closed and the mixture was heated in an oven at 150° C. for 168 hours. A solid reaction product was recovered through decantation, water washing, and filtration and then washed with water. The solid obtained was dried in air at room temperature. Through XRD analysis, the solid was ascertained to have an almost pure AFI structure (FD, 17.3 T/nm$^3$). The burned product obtained had a nitrogen content of 1.0% by weight, a carbon content of 7.2% by weight, and a C/N weight ratio of 7.20. The burned product was further examined for the weight loss (g1) and weight loss (g2). The results thereof are shown in Table 2.

TABLE 2

| | Kind of zeolite | Weight loss (g1) wt % | Weight loss (g2) wt % | Carbon content wt % | Nitrogen content wt % | Pore utilization factor 2 | Effective water adsorption (wt %) Before durability test | Effective water adsorption (wt %) After Durability Test 3 | XRD pattern After durability test |
|---|---|---|---|---|---|---|---|---|---|
| Example 2-1 | SAPO | <0.1 | 3.49 | 3.5 | 1.0 | 0.89 | 20.4 | 18.4 | CHA structure[a] |
| Example 2-2 | FAPSO | 1.55 | 5.49 | 3.2 | 1.1 | 0.91 | 16.7 | 15.5 | CHA structure[a] |
| Example 2-3 | FAPSO | 0.43 | 5.40 | 5.0 | <0.3 | 0.85 | — | 15.7 | CHA structure[b] |
| Comparative Example 2-1 | FAPSO | <0.1 | <0.1 | <0.3 | <0.3 | 1 | 22.8 | — | became amorphous[a] |
| Comparative Example 2-2 | FAPSO | <0.1 | <0.1 | <0.3 | <0.3 | 1 | 18.3 | 6.8 | became amorphous[b] |
| Comparative Example 2-3 | SAPO | 3.2 | 10.0 | 8.9 | 1.9 | 0.57 | 10.5 | — | — |
| Comparative Example 2-4 | SAPO | 0.36 | 10.86 | 8.5 | 0.77 | — | 13.2 | — | — |
| Comparative Example 2-5 | SAPO | 0.38 | 9.54 | 7.9 | 0.30 | — | 14.7 | — | — |
| Comparative Example 2-6 | SAPO | 0.82 | 13.07 | 6.09 (value in document[1]) | 5.01 (value in document[1]) | — | 8 | — | structure before burning was GIS destroyed by burning (shown in document[1]) |
| Comparative Example 2-7 | SAPO | 0.65 | 13.64 | 5.95 (value in document[1]) | 4.84 (value in document[1]) | — | 8 | — | structure before burning was GIS destroyed by burning (shown in document[1]) |
| Comparative Example 2-8 | SAPO | 0.61 | 6.38 | 7.5 | 0.6 | 0.77 | 14 | 12 | CHA structure[a] |
| Comparative Example 2-9 | SAPO | 3.4 | 9.2 | 7.2 | 1.0 | — | 3.2 | — | — |

*[a]after Durability Test 3, [b]after Durability Test 2 and after Durability Test 3
*In the table, SAPO means silicoaluminophosphate and FAPSO means iron silicoaluminophosphate.
*document[1]: R. T. Yang et al., Langmuir, 2003, 19, 2193–2200.

Incidentally, the iron-containing aluminophosphates obtained in Examples 1-1 to 1-3 and the carbon-containing silicoaluminophosphate and carbon-containing iron silicoaluminophosphates obtained in Examples 2-1 to 2-3 are zeolites which, when subjected to a cycle durability test by the following method, retain the respective crystal structures possessed before the test.

Cycle Durability Test:

A zeolite is held in a vacuum vessel kept at 90° C. and repeatedly subjected 500 times to an operation in which the zeolite is exposed to a vacuum and a 90° C. water-vapor-saturated atmosphere for 90 seconds each.

After the cycle durability test conducted by the method shown above, the water vapor adsorption as measured at 25° C. and a relative vapor pressure of 0.5 is at least 80% of the water vapor adsorption before the test.

While the invention has been described in detail and with reference to specific embodiments thereof, it will be apparent to one skilled in the art that various changes and modifications can be made therein without departing from the spirit and scope thereof.

This application is based on a Japanese patent application filed on Jun. 20, 2003 (Application No. 2003-176318) and a Japanese patent application filed on Jun. 20, 2003 (Application No. 2003-176319), the entire contents thereof being herein incorporated by reference.

INDUSTRIAL APPLICABILITY

The zeolite of the invention has an excellent effect that the zeolite, when used especially as an adsorbent, not only has high adsorption capacity but also suffers neither particle reduction to powder nor crystal structure destruction during repetitions of use and, hence, does not undergo a resultant decrease in adsorption capacity.

Furthermore, the heat utilization system employing an adsorbent comprising the zeolite of the invention has an effect that the system has excellent durability due to the use of the adsorbent comprising the zeolite of the invention.

The invention claimed is:

1. A zeolite which has a framework density of from 10 T/nm$^3$ to 16 T/nm$^3$ and a carbon content of from 1% by weight to 6% by weight and satisfies the following (1) or (2):
   (1) the zeolite is an aluminophosphate which has a nitrogen content of from 0.5% by weight to 12% by weight and in which the aluminum may be partly replaced by Me;
   (2) the zeolite is a silicoaluminophosphate in which the aluminum may be partly replaced by Me and which, when burned to a carbon content lower than 0.3% by weight, retains the framework structure possessed by the silicoaluminophosphate before the burning:
   (provided that Me in (1) and (2) above is at least one element selected from the elements in Groups 2A, 7A, 8, 1B, and 2B of the periodic table).

2. The zeolite according to claim 1, which has a framework structure selected from AEI, AFR, AFS, AFT, AFX, ATS, CHA, ERI, LEV, LTA, and VFI which are code designations defined by IZA.

3. The zeolite according to claim 1, wherein Me is at least one element selected from Fe, Ni, Co, Mg, and Zn.

4. The zeolite according to claim 1, wherein the molar ratios of the Me, Al, and P which are components of the framework structure of the aluminophosphate satisfy the following expressions 1-1 to 1-3:

$$0 \leq x \leq 0.3 \quad \quad 1\text{-}1$$

(x represents the molar ratio of Me to the sum of Me, Al, and P);

$$0.2 \leq y \leq 0.6 \quad \quad 1\text{-}2$$

(y represents the molar ratio of Al to the sum of Me, Al, and P); and $$0.3 \leq z \leq 0.6 \quad \quad 1\text{-}3$$

(z represents the molar ratio of P to the sum of Me, Al, and P).

5. The zeolite according to claim 4, wherein the molar ratio of Me satisfies the following expression 1-1':

$$0.001 \leq x \leq 0.3 \quad \quad 1\text{-}1'$$

(x represents the molar ratio of Me to the sum of Me, Al, and P).

6. The zeolite according to claim 1, wherein the C/N weight ratio in the aluminophosphate is from 1.0 to 4.0.

7. The zeolite according to claim 1, wherein the molar ratio of nitrogen to Me in the aluminophosphate is from 0.2 to 3.

8. The zeolite according to claim 1, characterized by being the silicoaluminophosphate wherein the molar ratios of the Me, Al, P, and Si which are components of the framework structure of the silicoaluminophosphate satisfy the following expressions 2-1 to 2-4:

$$0 \leq x \leq 0.3 \quad \quad 2\text{-}1$$

(x represents the molar ratio of Me to the sum of Me, Al, P, and Si);

$$0.2 \leq y \leq 0.6 \quad \quad 2\text{-}2$$

(y represents the molar ratio of Al to the sum of Me, Al, P, and Si);

$$0.3 \leq z \leq 0.6 \quad \quad 2\text{-}3$$

(z represents the molar ratio of P to the sum of Me, Al, P, and Si); and $$0.001 \leq w \leq 0.3 \quad \quad 2\text{-}4$$

(w represents the molar ratio of Si to the sum of Me, Al, P, and Si).

9. The zeolite according to claim 1, which is the aluminophosphate which has a nitrogen content of from 0.5% by weight to 12% by weight and in which the aluminum may be partly replaced by Me.

10. The zeolite according to claim 1, which is the silicoaluminophosphate in which the aluminum may be partly replaced by Me and which, when burned to a carbon content lower than 0.3% by weight, retains the framework structure possessed by the silicoaluminophosphate before the burning.

11. The zeolite according to claim 1, wherein when the zeolite is subjected to a cyclic durability test in the manner shown below, the crystal structure possessed by the zeolite before the test is retained:

Cycle Durability Test:
   The zeolite is held in a vacuum vessel kept at 90° C. and is repeatedly subjected 500 times to an operation in which the zeolite is exposed to a vacuum and a 90° C. water-vapor-saturated atmosphere for 90 seconds each:

Retention of Crystal Structure:
   When the zeolite is examined by XRD using the same apparatus, same examination conditions, same sample holder, and same sample weight, then the highest peak intensity after the test is at least 50% of the highest peak intensity before the test, provided that a peak intensity means a peak height and is a value obtained by subtracting the count for the background from the count for the peak top.

12. The zeolite according to claim 1, wherein when the zeolite is subjected to a cycle durability test in the manner shown below, then the water vapor adsorption of the zeolite after the test as determined at 25° C. and a relative vapor pressure of 0.5 is at least 80% of the water vapor adsorption thereof as determined before the test:

Cycle Durability Test:

The zeolite is held in a vacuum vessel kept at 90° C. and is repeatedly subjected 500 times to an operation in which the zeolite is exposed to a vacuum and a 90° C. water-vapor-saturated atmosphere for 90 seconds each.

13. A process for producing the zeolite according to claim 1, wherein at least compounds of the metallic elements serving as components of the zeolite are subjected to hydrothermal synthesis in the presence of at least one structure-directing agent and the zeolite precursor obtained is burned in an atmosphere having an oxygen concentration of 20 vol % or lower.

14. The process for producing the zeolite according to claim 13, wherein the zeolite precursor is burned in an atmosphere having an oxygen concentration of 0.1 vol % or higher.

15. The process for producing the zeolite according to claim 13, wherein the zeolite precursor is burned at a temperature of from 300° C. to 450° C.

16. The process for producing the zeolite according to claim 13, wherein the zeolite precursor is burned for a period of from 4 hours to 8 hours.

17. The process for producing the zeolite according to claim 13, wherein the zeolite precursor is one obtained through hydrothermal synthesis in the presence of two or more structure-directing agents, and the structure-directing agents are ones selected from two or more groups among (1) alicyclic heterocyclic compounds containing nitrogen, (2) amines having one or more cycloalkyl groups, and (3) amines having one or more alkyl groups.

18. The process for producing the zeolite according to claim 13, wherein the zeolite precursor is one synthesized in the presence of a structure-directing agent comprising at least one nitrogen-containing organic compound selected from morpholine, cyclohexylamine, triethylamine, isopropylamine, N,N-diisopropylethylamine, N-methyl-n-butylamine, isobutylamine, hexamethyleneimine, N,N-diethylethanolamine, and N,N-dimethylethanolamine.

19. The process for producing the zeolite according to claim 13, wherein the zeolite precursor is burned at a temperature of from 300° C. to 440° C. for a period of from 4 hours to 8 hours in an atmosphere having an oxygen concentration of from 0.1 vol % to 20 vol %.

20. An adsorbent comprising the zeolite according to claim 1.

21. The adsorbent according to claim 20, wherein the zeolite gives at 25° C. an adsorption isotherm which has a relative-vapor-pressure region in which when the relative vapor pressure changes by 0.15 in the range of from 0.01 to 0.5, then the resultant change in the adsorption of the adsorbable substance is 0.1 g/g or larger.

22. The adsorbent according to claim 20, which is used in a heat utilization system in which the heat of adsorption generated by the adsorption of an adsorbable substance onto an adsorbent and/or the latent heat of vaporization of the adsorbate is utilized.

23. The adsorbent according to claim 22, wherein the heat utilization system is an adsorption heat pump.

24. The adsorbent according to claim 22, wherein the heat utilization system is a cold/heat storage system having (a) a constitution for supplying waste heat to an adsorbent to desorb an adsorbate and (b-1) a constitution for supplying the heat of adsorption generated by the adsorption of the adsorbable substance onto the adsorbent to an appliance required to be operated in the heating mode and/or (b-2) a constitution for supplying the latent heat of adsorbate vaporization generated by the adsorption of the adsorbate onto the adsorbent to the cooling medium circulating through a refrigerating machine for cooling.

25. The adsorbent according to claim 24, which is an adsorbent for use in the cold/heat storage system, and wherein the zeolite contained in the adsorbent gives at 55° C. an adsorption isotherm which has a relative-vapor-pressure region in which when the relative vapor pressure changes by 0.05 in the range of from 0.02 to 0.1, then the resultant change in the adsorption of the adsorbable substance is 0.05 g/g or larger.

26. The adsorbent according to claim 25, wherein in the adsorption isotherm obtained at 55° C., the adsorption of the adsorbate at a relative vapor pressure of 0.02 is 0.12 g/g or smaller and the adsorption of the adsorbate at a relative vapor pressure of 0.1 is 0.13 g/g or larger.

27. A heat utilization system in which the heat of adsorption generated by the adsorption of an adsorbable substance onto an adsorbent and/or the latent heat of vaporization of the adsorbate is utilized, characterized in that the adsorbent is the adsorbent of claim 20.

28. A cold/heat storage system, which employs the adsorbent of claim 20.

29. An adsorption heat pump, which employs the adsorbent of claim 20.

30. An air-conditioning apparatus for humidity regulation, which employs the adsorbent of claim 20.

* * * * *